(12) United States Patent
Wilkins et al.

(10) Patent No.: US 8,658,043 B2
(45) Date of Patent: Feb. 25, 2014

(54) WATER TREATMENT SYSTEM AND METHOD

(75) Inventors: Frederick Wilkins, Pepperell, MA (US); Evgeniya Freydina, Acton, MA (US); Aytac Sezgi, Knoxville, TN (US); Reshma Madhusudan, Chicago, IL (US); Anil D. Jha, San Francisco, CA (US)

(73) Assignee: Siemens Water Technologies LLC, Alpharetta, GA (US)

( * ) Notice: Subject to any disclaimer, the term of this patent is extended or adjusted under 35 U.S.C. 154(b) by 0 days.

(21) Appl. No.: 12/962,064

(22) Filed: Dec. 7, 2010

(65) Prior Publication Data

US 2011/0120886 A1 May 26, 2011

Related U.S. Application Data

(60) Continuation of application No. 10/712,621, filed on Nov. 13, 2003, now abandoned, and a continuation of application No. 11/311,528, filed on Dec. 19, 2005, which is a division of application No. 10/712,248, filed on Nov. 13, 2003, now Pat. No. 7,083,733, application No. 12/962,064, which is a continuation of application No. 12/477,013, filed on Jun. 2, 2009, now Pat. No. 8,114,260, which is a division of application No. 10/712,163, filed on Nov. 13, 2003, now Pat. No. 7,563,351, application No. 12/962,064, which is a continuation of application No. 10/712,685, filed on Nov. 13, 2003, now Pat. No. 7,846,340, and a continuation of application No. 10/712,162, filed on Nov. 13, 2003, now Pat. No. 7,862,700, and a continuation of application No. 12/950,050, filed on Nov. 19, 2010, and a continuation of application No. 10/712,166, filed on Nov. 13, 2003, now Pat. No. 8,377,279.

(51) Int. Cl.
- B01D 61/42 (2006.01)
- B01D 61/54 (2006.01)
- C02F 1/46 (2006.01)
- C02F 1/469 (2006.01)

(52) U.S. Cl.
USPC ........... 210/739; 205/743; 205/744; 204/519; 204/556; 204/628; 204/661; 210/85; 210/96.1; 210/143; 210/194; 210/243; 210/257.1; 210/259; 210/650; 210/748.01; 210/805; 210/806

(58) Field of Classification Search
USPC ......... 204/518–547, 554–556, 627–643, 660, 204/661, 648, 263; 210/85, 87, 96.1, 143, 210/194, 195.1, 243, 257.1, 257.2, 259, 210/663, 669, 739, 746, 748.01, 767, 650, 210/805, 806; 205/743, 744
See application file for complete search history.

(56) References Cited

U.S. PATENT DOCUMENTS

| | | |
|---|---|---|
| 2,514,415 A | 7/1950 | Rasch |
| 2,535,035 A | 12/1950 | Briggs |
| 2,681,319 A | 6/1954 | Bodamer |
| 2,681,320 A | 6/1954 | Bodamer |
| 2,689,826 A | 9/1954 | Kollsman |
| 2,777,814 A | 1/1957 | Latham, Jr. |
| 2,788,319 A | 4/1957 | Pearson |
| 2,794,777 A | 6/1957 | Pearson |
| 2,815,320 A | 12/1957 | Kollsman |
| 2,854,394 A | 9/1958 | Kollsman |
| 2,906,684 A | 9/1959 | Stoddard |
| 2,912,372 A | 11/1959 | Stoddard |
| 2,923,674 A | 2/1960 | Kressman |
| 2,943,989 A | 7/1960 | Kollsman |
| 3,014,855 A | 12/1961 | Kressman |
| 3,074,864 A | 1/1963 | Gaysowski |
| 3,091,583 A | 5/1963 | Schufle |
| 3,099,615 A | 7/1963 | Kollsman |
| 3,148,687 A | 9/1964 | Dosch |
| 3,149,061 A | 9/1964 | Parsi |
| 3,149,062 A | 9/1964 | Gottschal et al. |
| 3,165,460 A | 1/1965 | Zang et al. |
| 3,291,713 A | 12/1966 | Parsi |
| 3,330,750 A | 7/1967 | McRae et al |
| 3,341,441 A | 9/1967 | Giuffrida et al. |
| 3,375,208 A | 3/1968 | Duddy |
| 3,627,703 A | 12/1971 | Kojima et al. |

| Patent | Date | Name |
|---|---|---|
| 3,630,378 A | 12/1971 | Bauman |
| 3,645,884 A | 2/1972 | Gilliland |
| 3,679,055 A | 7/1972 | Clark et al. |
| 3,686,089 A | 8/1972 | Korngold |
| 3,755,135 A | 8/1973 | Johnson |
| 3,786,924 A | 1/1974 | Huffman |
| 3,869,375 A | 3/1975 | Ono et al. |
| 3,869,376 A | 3/1975 | Tejeda |
| 3,870,033 A | 3/1975 | Faylor et al. |
| 3,876,565 A | 4/1975 | Takashima et al. |
| 3,989,615 A | 11/1976 | Kiga et al. |
| 4,032,452 A | 6/1977 | Davis |
| 4,033,850 A | 7/1977 | Kedem et al. |
| 4,089,758 A | 5/1978 | McAloon |
| 4,102,752 A | 7/1978 | Rugh, II |
| 4,116,889 A | 9/1978 | Chlanda et al. |
| 4,119,581 A | 10/1978 | Rembaum et al. |
| 4,130,473 A | 12/1978 | Eddleman |
| 4,153,761 A | 5/1979 | Marsh |
| 4,162,218 A | 7/1979 | McCormick |
| 4,167,551 A | 9/1979 | Tamura et al. |
| 4,191,811 A | 3/1980 | Hodgdon |
| 4,197,206 A | 4/1980 | Karn |
| 4,216,073 A | 8/1980 | Goldstein |
| 4,217,200 A | 8/1980 | Kedem et al. |
| 4,226,688 A | 10/1980 | Kedem et al. |
| 4,228,000 A | 10/1980 | Hoeschler |
| 4,294,933 A | 10/1981 | Kihara et al. |
| 4,298,442 A | 11/1981 | Giuffrida |
| 4,321,145 A | 3/1982 | Carlson |
| 4,330,654 A | 5/1982 | Ezzell et al. |
| 4,358,545 A | 11/1982 | Ezzell et al. |
| 4,359,789 A | 11/1982 | Roberts |
| 4,374,232 A | 2/1983 | Davis |
| 4,430,226 A | 2/1984 | Hedge et al. |
| 4,465,573 A | 8/1984 | O'Hare |
| 4,473,450 A | 9/1984 | Nayak et al. |
| 4,505,797 A | 3/1985 | Hodgdon et al. |
| 4,574,049 A | 3/1986 | Pittner |
| 4,610,790 A | 9/1986 | Reti et al. |
| 4,614,576 A | 9/1986 | Goldstein |
| 4,632,745 A | 12/1986 | Giuffrida et al. |
| 4,636,296 A | 1/1987 | Kunz |
| 4,655,909 A | 4/1987 | Furuno |
| 4,661,411 A | 4/1987 | Martin et al. |
| 4,671,863 A | 6/1987 | Tejeda |
| 4,687,561 A | 8/1987 | Kunz |
| 4,702,810 A | 10/1987 | Kunz |
| 4,707,240 A | 11/1987 | Parsi et al. |
| 4,747,929 A | 5/1988 | Siu et al. |
| 4,747,955 A | 5/1988 | Kunin |
| 4,751,153 A | 6/1988 | Roth |
| 4,753,681 A | 6/1988 | Giuffrida et al. |
| 4,770,793 A | 9/1988 | Treffry-Goatley et al. |
| 4,804,451 A | 2/1989 | Palmer |
| 4,808,287 A | 2/1989 | Hark |
| 4,830,721 A | 5/1989 | Bianchi et al. |
| 4,849,102 A | 7/1989 | Latour et al. |
| 4,871,431 A * | 10/1989 | Parsi .................. 204/524 |
| 4,872,958 A | 10/1989 | Suzuki et al. |
| 4,915,803 A | 4/1990 | Morris |
| 4,925,541 A | 5/1990 | Giuffrida et al. |
| 4,931,160 A | 6/1990 | Giuffrida |
| 4,956,071 A | 9/1990 | Giuffrida et al. |
| 4,964,970 A | 10/1990 | O'Hare |
| 4,969,983 A * | 11/1990 | Parsi .................. 204/524 |
| 4,983,267 A | 1/1991 | Moeglich et al. |
| 5,026,465 A | 6/1991 | Katz et al. |
| 5,030,672 A | 7/1991 | Hann et al. |
| 5,032,265 A | 7/1991 | Jha et al. |
| 5,059,330 A | 10/1991 | Burkhardt |
| 5,064,097 A | 11/1991 | Brog et al. |
| 5,066,375 A | 11/1991 | Parsi et al. |
| 5,066,402 A | 11/1991 | Anselme et al. |
| 5,073,268 A | 12/1991 | Saito et al. |
| 5,082,472 A | 1/1992 | Mallouk et al. |
| 5,084,148 A | 1/1992 | Kazcur et al. |
| 5,092,970 A | 3/1992 | Kaczur et al. |
| 5,106,465 A | 4/1992 | Kaczur et al. |
| 5,107,896 A | 4/1992 | Otto |
| 5,116,509 A | 5/1992 | White |
| 5,120,416 A | 6/1992 | Parsi et al. |
| 5,126,026 A | 6/1992 | Chlanda |
| 5,128,043 A | 7/1992 | Wildermuth |
| 5,154,809 A | 10/1992 | Oren et al. |
| 5,166,220 A | 11/1992 | McMahon |
| 5,176,828 A | 1/1993 | Proulx |
| 5,192,432 A | 3/1993 | Andelman |
| 5,196,115 A | 3/1993 | Andelman |
| 5,203,976 A | 4/1993 | Parsi et al. |
| 5,211,823 A | 5/1993 | Giuffrida et al. |
| 5,223,103 A | 6/1993 | Kazcur et al. |
| H1206 H | 7/1993 | Thibodeaux et al. |
| 5,240,579 A | 8/1993 | Kedem |
| 5,254,227 A | 10/1993 | Cawlfield et al. |
| 5,259,936 A | 11/1993 | Ganzi |
| 5,286,354 A | 2/1994 | Bard et al. |
| 5,292,422 A * | 3/1994 | Liang et al. .................. 204/632 |
| 5,308,466 A | 5/1994 | Ganzi et al. |
| 5,308,467 A | 5/1994 | Sugo et al. |
| 5,316,637 A | 5/1994 | Ganzi et al. |
| 5,342,521 A | 8/1994 | Bardot et al. |
| 5,346,624 A | 9/1994 | Libutti et al. |
| 5,346,924 A | 9/1994 | Giuffrida |
| 5,352,364 A | 10/1994 | Kruger et al. |
| 5,356,849 A | 10/1994 | Matviya et al. |
| 5,358,640 A | 10/1994 | Zeiher et al. |
| 5,376,253 A | 12/1994 | Rychen et al. |
| 5,411,641 A | 5/1995 | Trainham, III et al. |
| 5,415,786 A | 5/1995 | Martin et al. |
| 5,423,965 A | 6/1995 | Kunz |
| 5,425,858 A | 6/1995 | Farmer |
| 5,425,866 A | 6/1995 | Sugo et al. |
| 5,434,020 A | 7/1995 | Cooper |
| 5,444,031 A | 8/1995 | Hayden |
| 5,451,309 A | 9/1995 | Bell |
| 5,458,787 A | 10/1995 | Rosin et al. |
| 5,460,725 A | 10/1995 | Stringfield |
| 5,460,728 A | 10/1995 | Klomp et al. |
| 5,489,370 A | 2/1996 | Lomasney et al. |
| 5,503,729 A | 4/1996 | Elyanow et al. |
| 5,518,626 A | 5/1996 | Birbara et al. |
| 5,518,627 A | 5/1996 | Tomoi et al. |
| 5,536,387 A | 7/1996 | Hill et al. |
| 5,538,611 A | 7/1996 | Otowa |
| 5,538,655 A | 7/1996 | Fauteux et al. |
| 5,538,746 A | 7/1996 | Levy |
| 5,539,002 A | 7/1996 | Watanabe |
| 5,547,551 A | 8/1996 | Bahar et al. |
| 5,558,753 A | 9/1996 | Gallagher et al. |
| 5,580,437 A | 12/1996 | Trainham, III et al. |
| 5,584,981 A | 12/1996 | Turner et al. |
| 5,593,563 A | 1/1997 | Denoncourt et al. |
| 5,599,614 A | 2/1997 | Bahar et al. |
| 5,670,053 A | 9/1997 | Collentro et al. |
| 5,679,228 A | 10/1997 | Elyanow et al. |
| 5,679,229 A | 10/1997 | Goldstein et al. |
| 5,714,521 A | 2/1998 | Kedem et al. |
| RE35,741 E | 3/1998 | Oren et al. |
| 5,736,023 A | 4/1998 | Gallagher et al. |
| 5,759,373 A | 6/1998 | Terada et al. |
| 5,762,774 A | 6/1998 | Tessier |
| 5,766,479 A | 6/1998 | Collentro et al. |
| 5,788,826 A | 8/1998 | Nyberg |
| 5,804,055 A | 9/1998 | Coin et al. |
| 5,814,197 A | 9/1998 | Batchelder et al. |
| 5,837,124 A | 11/1998 | Su et al. |
| 5,858,191 A | 1/1999 | DiMascio et al. |
| 5,868,915 A | 2/1999 | Ganzi et al. |
| 5,868,937 A | 2/1999 | Back et al. |
| 5,891,328 A | 4/1999 | Goldstein |
| 5,925,240 A | 7/1999 | Wilkins et al. |
| 5,928,807 A | 7/1999 | Elias |
| 5,954,935 A | 9/1999 | Neumeister et al. |
| 5,961,805 A | 10/1999 | Terada et al. |
| 5,980,716 A | 11/1999 | Horinouchi et al. |
| 6,017,433 A | 1/2000 | Mani |
| 6,056,878 A | 5/2000 | Tessier et al. |

| | | | |
|---|---|---|---|
| 6,099,716 A | 8/2000 | Molter et al. | |
| 6,103,125 A | 8/2000 | Kuepper | |
| 6,126,805 A * | 10/2000 | Batchelder et al. | 204/630 |
| RE36,972 E | 11/2000 | Baker et al. | |
| 6,146,524 A | 11/2000 | Story | |
| 6,149,788 A | 11/2000 | Tessier et al. | |
| 6,156,180 A | 12/2000 | Tessier et al. | |
| 6,171,374 B1 | 1/2001 | Barton et al. | |
| 6,187,154 B1 | 2/2001 | Yamaguchi et al. | |
| 6,187,162 B1 | 2/2001 | Mir | |
| 6,190,528 B1 | 2/2001 | Li et al. | |
| 6,190,553 B1 | 2/2001 | Lee | |
| 6,190,558 B1 | 2/2001 | Robbins | |
| 6,193,869 B1 | 2/2001 | Towe et al. | |
| 6,197,174 B1 | 3/2001 | Barber et al. | |
| 6,197,189 B1 | 3/2001 | Schwartz et al. | |
| 6,214,204 B1 | 4/2001 | Gadkaree et al. | |
| 6,228,240 B1 | 5/2001 | Terada et al. | |
| 6,235,166 B1 | 5/2001 | Towe et al. | |
| 6,241,893 B1 | 6/2001 | Levy | |
| 6,248,226 B1 | 6/2001 | Shinmei et al. | |
| 6,254,741 B1 | 7/2001 | Stuart et al. | |
| 6,258,265 B1 | 7/2001 | Jones | |
| 6,258,278 B1 | 7/2001 | Tonelli et al. | |
| 6,267,891 B1 | 7/2001 | Tonelli et al. | |
| 6,274,019 B1 * | 8/2001 | Kuwata | 204/632 |
| 6,279,019 B1 | 8/2001 | Oh et al. | |
| 6,284,124 B1 | 9/2001 | DiMascio et al. | |
| 6,284,399 B1 | 9/2001 | Oko et al. | |
| 6,296,751 B1 | 10/2001 | Mir | |
| 6,303,037 B1 | 10/2001 | Tamura et al. | |
| 6,309,532 B1 | 10/2001 | Tran et al. | |
| 6,312,577 B1 | 11/2001 | Ganzi et al. | |
| 6,315,886 B1 * | 11/2001 | Zappi et al. | 205/701 |
| 6,344,122 B1 * | 2/2002 | Deguchi et al. | 204/632 |
| 6,365,023 B1 | 4/2002 | De Los Reyes et al. | |
| 6,375,812 B1 | 4/2002 | Leonida | |
| 6,391,178 B1 | 5/2002 | Garcia et al. | |
| 6,398,965 B1 | 6/2002 | Arba et al. | |
| 6,402,916 B1 | 6/2002 | Sampson et al. | |
| 6,402,917 B1 | 6/2002 | Emery et al. | |
| 6,428,689 B1 | 8/2002 | Kameyama et al. | |
| 6,458,257 B1 | 10/2002 | Andrews et al. | |
| 6,461,512 B1 | 10/2002 | Hirayama et al. | |
| 6,482,304 B1 | 11/2002 | Emery et al. | |
| 6,495,014 B1 | 12/2002 | Datta et al. | |
| 6,514,398 B2 | 2/2003 | DiMascio et al. | |
| 6,579,445 B2 | 6/2003 | Nachtman et al. | |
| 6,607,647 B2 | 8/2003 | Wilkins et al. | |
| 6,607,668 B2 * | 8/2003 | Rela | 210/321.6 |
| 6,627,073 B2 | 9/2003 | Hirota et al. | |
| 6,645,383 B1 | 11/2003 | Lee et al. | |
| 6,648,307 B2 | 11/2003 | Nelson et al. | |
| 6,649,037 B2 | 11/2003 | Liang et al. | |
| 6,726,822 B2 | 4/2004 | Garcia et al. | |
| 6,733,646 B2 | 5/2004 | Sato et al. | |
| 6,766,812 B1 | 7/2004 | Gadini | |
| 6,780,328 B1 * | 8/2004 | Zhang | 210/663 |
| 6,783,666 B2 | 8/2004 | Takeda et al. | |
| 6,808,608 B2 | 10/2004 | Srinivasan et al. | |
| 6,824,662 B2 | 11/2004 | Liang et al. | |
| 6,908,546 B2 | 6/2005 | Smith | |
| 6,929,748 B2 * | 8/2005 | Avijit et al. | 210/652 |
| 7,083,733 B2 | 8/2006 | Freydina et al. | |
| 7,329,358 B2 | 2/2008 | Wilkins et al. | |
| 7,563,351 B2 | 7/2009 | Wilkins et al. | |
| 7,572,359 B2 * | 8/2009 | Liang et al. | 204/632 |
| 7,582,198 B2 | 9/2009 | Wilkins et al. | |
| 7,604,725 B2 | 10/2009 | Ganzi et al. | |
| 7,846,340 B2 * | 12/2010 | Freydina et al. | 210/744 |
| 7,862,700 B2 | 1/2011 | Wilkins et al. | |
| 2001/0003329 A1 | 6/2001 | Sugaya et al. | |
| 2002/0092769 A1 | 7/2002 | Garcia et al. | |
| 2002/0103724 A1 | 8/2002 | Huxter | |
| 2002/0144954 A1 | 10/2002 | Arba et al. | |
| 2002/0189951 A1 | 12/2002 | Liang et al. | |
| 2003/0034292 A1 | 2/2003 | Rela | |
| 2003/0038089 A1 | 2/2003 | Levy | |
| 2003/0080467 A1 | 5/2003 | Andrews et al. | |
| 2003/0089609 A1 | 5/2003 | Liang et al. | |
| 2003/0098266 A1 | 5/2003 | Shiue et al. | |
| 2003/0106845 A1 | 6/2003 | Bernard et al. | |
| 2003/0155243 A1 | 8/2003 | Sferrazza | |
| 2003/0201235 A1 | 10/2003 | Chidambaran et al. | |
| 2004/0060823 A1 | 4/2004 | Carson et al. | |
| 2004/0079700 A1 | 4/2004 | Wood et al. | |
| 2004/0089551 A1 | 5/2004 | Liang et al. | |
| 2004/0118780 A1 | 6/2004 | Willman et al. | |
| 2005/0016932 A1 | 1/2005 | Arba et al. | |
| 2005/0103622 A1 | 5/2005 | Jha | |
| 2005/0103630 A1 | 5/2005 | Ganzi et al. | |
| 2005/0103631 A1 | 5/2005 | Freydina | |
| 2005/0103644 A1 | 5/2005 | Wilkins et al. | |
| 2005/0103717 A1 | 5/2005 | Jha | |
| 2005/0103722 A1 | 5/2005 | Freydina et al. | |
| 2005/0103723 A1 | 5/2005 | Wilkins | |
| 2005/0109703 A1 | 5/2005 | Newenhizen | |
| 2006/0060532 A1 | 3/2006 | Davis | |
| 2006/0231403 A1 | 10/2006 | Riviello | |

FOREIGN PATENT DOCUMENTS

| | | |
|---|---|---|
| AU | B-18629/92 | 10/1992 |
| CA | 2316012 A1 | 11/2001 |
| CN | 1044411 A | 8/1990 |
| DE | 1 201 055 | 9/1965 |
| DE | 3238280 A1 | 4/1984 |
| DE | 4016000 A1 | 11/1991 |
| DE | 44 18 812 A1 | 12/1995 |
| DE | 199 42 347 A1 | 3/2001 |
| EP | 0170895 A2 | 2/1986 |
| EP | 0 503 589 A1 | 9/1992 |
| EP | 0417506 B1 | 3/1993 |
| EP | 0 621 072 A2 | 10/1994 |
| EP | 0 621 072 B1 | 10/1994 |
| EP | 0 680 932 A2 | 11/1995 |
| EP | 0803474 A2 | 10/1997 |
| EP | 0 870 533 A1 | 10/1998 |
| EP | 1 068 901 A2 | 1/2001 |
| EP | 1075 868 A2 | 2/2001 |
| EP | 1 101 790 A1 | 5/2001 |
| EP | 1 106 241 A1 | 6/2001 |
| EP | 1129765 A1 | 9/2001 |
| EP | 1172145 A2 | 1/2002 |
| EP | 1222954 A1 | 7/2002 |
| EP | 1506941 A1 | 2/2005 |
| GB | 776469 | 6/1957 |
| GB | 877239 | 9/1961 |
| GB | 880344 | 10/1961 |
| GB | 893051 | 4/1962 |
| GB | 942762 | 11/1963 |
| GB | 1048026 | 11/1966 |
| GB | 1137679 | 12/1968 |
| GB | 1318036 A | 5/1973 |
| GB | 1 381 681 A | 1/1975 |
| GB | 1448533 | 9/1976 |
| GB | 2278069 B | 7/1997 |
| GB | 2303802 B | 12/1997 |
| JP | 52-047580 A | 4/1977 |
| JP | 54-5888 | 1/1979 |
| JP | 63-036893 A | 2/1988 |
| JP | 03-207487 A | 9/1991 |
| JP | 07-155750 | 6/1995 |
| JP | 07-265865 | 10/1995 |
| JP | 09-253643 | 9/1997 |
| JP | H10500617 A | 1/1998 |
| JP | 11-42483 | 2/1999 |
| JP | 2001-79358 | 3/2001 |
| JP | 2001-79553 | 3/2001 |
| JP | 2001-104960 | 4/2001 |
| JP | 2001-113137 | 4/2001 |
| JP | 2001-113279 | 4/2001 |
| JP | 2001-113280 | 4/2001 |
| JP | 2001-121152 | 5/2001 |
| JP | 2003094064 | 4/2003 |
| JP | 2005007347 | 1/2005 |
| JP | 2005007348 | 1/2005 |
| JP | 5-134094 B2 | 1/2013 |

| | | | |
|---|---|---|---|
| RO | 114 874 B | 8/1999 | |
| RU | 216622 | 11/1972 | |
| RU | 990256 | 1/1983 | |
| RU | 1118389 | 10/1984 | |
| WO | WO 92/11089 | 7/1992 | |
| WO | WO 95/32052 | 11/1995 | |
| WO | WO 95/32791 | 12/1995 | |
| WO | WO 96/22162 | 7/1996 | |
| WO | WO 97/25147 | 7/1997 | |
| WO | WO 97/46491 | 12/1997 | |
| WO | WO 97/46492 | 12/1997 | |
| WO | WO 98/11987 | 3/1998 | |
| WO | WO 98/17590 | 4/1998 | |
| WO | WO 98/20972 | 5/1998 | |
| WO | WO 98/58727 | A1 | 12/1998 |
| WO | WO 99/39810 | 8/1999 | |
| WO | WO 00/30749 | 6/2000 | |
| WO | WO 00/64325 | A2 | 11/2000 |
| WO | WO 00/75082 | A1 | 12/2000 |
| WO | 0130229 | A1 | 5/2001 |
| WO | WO 01/49397 | A1 | 7/2001 |
| WO | WO 02/04357 | A1 | 1/2002 |
| WO | WO 02/14224 | A1 | 2/2002 |
| WO | 0226629 | A2 | 4/2002 |
| WO | 02096807 | A2 | 12/2002 |
| WO | 03033122 | A2 | 4/2003 |
| WO | 03072229 | A1 | 9/2003 |
| WO | WO 03/086590 | A1 | 10/2003 |
| WO | 2004106243 | A1 | 12/2004 |

OTHER PUBLICATIONS

ASTM, "Standard Practice for Calculation and Adjustment of the Langelier Saturation Index for Reverse Osmosis," Designation: D3739-94 (Reapproved 1998), pp. 1-4, anonymous.
Calay, J.-C. et al., "The Use of EDI to Reduce the Ammonia Concentration in Steam Generators Blowdown of PWR Nuclear Power Plants," *PowerPlant Chemistry*, vol. 2, No. 8, 2000, pp. 467-470.
Dimascio et al., "Continuous Electrodeionization: Production of High-Purity Water without Regeneration Chemicals," The Electrochemical Society *Interface*, Fall 1998, pp. 26-29.
Dimascio et al., "Electrodiaresis Polishing (An Electrochemical Deionization Process)," date unknown, pp. 164-172.
Dow Chemical, "Dowex Marathon A Ion Exchange Resin," published Dec. 1999, Product Literature reprinted from www.dow.com, anonymous.
Dow Chemical, "Dowex Marathon A2 Ion Exchange Resin," published Nov. 1998, Product Literature reprinted from www.dow.com, anonymous.
Dupont Nafion PFSA Products, Technical Information, "Safe Handling and Use of Perfluorosulfonic Acid Products," Feb. 2004. 4 pages, anonymous.
Farmer et al., Capacitive Deionization of $NH_4ClO_4$ Solutions with Carbon Aerogel Electrodes, *J. Appl. Electro-Chemistry*, vol. 26, (1996), pp. 1007-1018.
FDA, "Guide to Inspections of High Purity Water Systems," printed from www.fda.gov. on Mar. 30, 2004, date unknown, anonymous.
Ganzi, G.C. et al., "Electrodeionization: Theory and Practice of Continuous Electrodeionization," *Ultrapure Water*, Jul./Aug. 1997, pp. 64-69.
G.J. Gittens et al., "The Application of Electrodialysis to Demineralisation," A.I.Ch.E.-I.Chem.E. Symposium Series No. 9, 1965 (London: Instn chem. Engrs), pp. 79-83.
Glueckauf, "Electro-Deionisation Through a Packed Bed," *British Chemical Engineering*, Dec. 1959, pp. 646-651.
Hobro et al., "Recycling of Chromium from Metal Finishing Waste Waters Using Electrochemical Ion Exchange (EIX)," 1994, pp. 173-183, publication and date unknown.
Jha, Anil D. et al., "CEDI: Selecting the Appropriate Configuration," reprinted from *Power Engineering*, Aug. 2000 edition.
Johnson et al., "Desalting by Means of Porous Carbon Electrodes," *Electrochemical Technology*, vol. 118, No. 3, Mar. 1971, pp. 510-517.
Kedem et al., "EDS—Sealed Cell Electrodialysis," *Desalination*, vol. 46, 1983, pp. 291-299.
Kedem et al., "Reduction of Polarization by Ion-Conduction Spacers: Theoretical Evaluation of a Model System," *Desalination*, vol. 27, 1978, pp. 143-156.
Korngold, "Electrodialysis Process Using Ion Exchange Resins Between Membranes," *Desalination*, vol. 16, 1975, pp. 225-233.
Laktionov, Evguenì Viktorovitch, "Déminéralisation De Solutions Electrolytiques Diluées. Analyse Comparative Des Performances De Differents Procédés D'Électrodialyse", Directeur de these, Université Montpellier II, Science Et Technique Du Languedoc, 17 Juillet 1998.
Matejka, "Continuous Production of High-Purity Water by Electro-Deionisation," *J. Appl. Chem., Biotechnol.*, vol. 21, Apr. 1971, pp. 117-120.
Pourcelly, Gerald, Conductivity and selectivity of ion exchange membranes: structure-correlations, *Desalination*, vol. 147 (2002) pp. 359-361.
Purolite Technical Bulletin, Hypersol-Macronet™ Sorbent Resins, 1995.
V. Shaposhnik et al., "Demineralization of water by electrodialysis with ion-exchange membranes, grains and nets," *Desalination*, vol. 133, (2001), pp. 211-214.
R. Simons, "Strong Electric Field Effects on Proton Transfer Between Membrane-Bound Amines and Water," *Nature*, vol. 280, Aug. 30, 1979, pp. 824-826.
R. Simons, "Electric Field Effects on Proton Transfer Between Ionizable Groups and Water in Ion Exchange Membranes," *Electrochimica Acta*, vol. 29, No. 2, 1984, pp. 151-158.
R. Simons, "Water Splitting In Ion Exchange Membranes," Pergamon Press Ltd., 1985, pp. 275-282.
R. Simons, "The Origin and Elimination of Water Splitting in Ion Exchange Membranes During Water Demineralisation by Electrodialysis," *Desalination*, vol. 28, Jan. 29, 1979, pp. 41-42.
USFilter, "H-Series Industrial CDI® Systems," product information, 1998, 4 pgs, anonymous.
Walters et al., "Concentration of Radioactive Aqueous Wastes," *Industrial and Engineering Chemistry*, Jan. 1955, pp. 61-67.
Warshawsky et al., "Thermally Regenerable Polymerable Polymeric Crown Ethers, II Synthesis and Application in Electrodialysis," pp. 579-584, publication and date unknown.
Yoran Oren et al., "Studies on Polarity Reversal with Continuous Deionization," *Desalination*, Elsevier Scientific Publishing Co., Amsterdam, NL, vol. 86, No. 2, Jun. 1, 1992, pp. 155-171.
Wood, J.H. et al., "Continuous Electrodeionisation: Module Design Considerations for the Production of High Purity Water," *Proc. of IEX at the Millenium*, Jul. 16, 2000, pp. 44-51.
Cowan, Donald A., et al., Effect of Turbulence on Limiting Current in Electrodialysis Cells, Industrial and Engineering Chemistry, vol. 51, pp. 1445-1448, Dec. 1959.
Buros "The ABCs of Desalting". Second Edition, published by the International Desalination Association, Topsfield, MA U.S.A. 2000.

\* cited by examiner

*Primary Examiner* — Joseph Drodge

(57) ABSTRACT

A water treatment system provides treated water to a point of use by removing at least a portion of any hardness-causing species contained in water from a water source, such as municipal water, well water, brackish water and water containing foulants. The water treatment system typically receives water from the water source or a point of entry and purifies the water containing at least some undesirable species before delivering the treated water to a point of use. The water treatment system has a pressurized reservoir system in line with an electrochemical device such as an electrodeionization device. The water treatment system can have a controller for adjusting or regulating at least one operating parameter of the treatment system or a component of the water treatment system. The electrochemical device can be operated at a low current and low flow rate to minimize water splitting or polarization, which minimizes scale formation.

23 Claims, 31 Drawing Sheets

WATER TREATMENT SYSTEM AND METHOD

CROSS-REFERENCE TO RELATED APPLICATIONS

This application is a continuation application of U.S. patent application Ser. No. 10/712,621; titled WATER TREATMENT SYSTEM AND METHOD, filed on Nov. 13, 2003, now abandoned; this application is also a continuation application of U.S. patent application Ser. No. 11/311,528, titled WATER TREATMENT SYSTEM AND METHOD, filed on Dec. 19, 2005, which is a divisional application of U.S. patent application Ser. No. 10/712,248, titled WATER TREATMENT SYSTEM AND METHOD, filed on Nov. 13, 2003, and granted as U.S. Pat. No. 7,083,733; this application is also a continuation application of U.S. patent application Ser. No. 12/477,013, titled WATER TREATMENT SYSTEM AND METHOD, filed on Jun. 2, 2009, now U.S. Pat. No. 8,114,260, which is a divisional application of U.S. patent application Ser. No. 10/712,163, titled WATER TREATMENT SYSTEM AND METHOD, filed on Nov. 13, 2003, and granted as U.S. Pat. No. 7,563,351; this application is also a continuation application of U.S. patent application Ser. No. 10/712,685, titled WATER TREATMENT SYSTEM AND METHOD, filed on Nov. 13, 2003, now U.S. Pat. No. 7,846,340; this application is also a continuation application of U.S. patent application Ser. No. 10/712,162, titled WATER TREATMENT SYSTEM AND METHOD, filed on Nov. 13, 2003, now U.S. Pat. No. 7,862,700; this application is also a continuation application of co-pending U.S. patent application Ser. No. 12/950,050, titled WATER TREATMENT SYSTEM AND METHOD, filed on Nov. 19, 2010; and this application is also a continuation application of U.S. patent application Ser. No. 10/712,166, titled WATER TREATMENT SYSTEM AND METHOD, filed on Nov. 13, 2003, now U.S. Pat. No. 8,377,279; each of which is hereby incorporated by reference in its entirety for all purposes.

BACKGROUND OF THE INVENTION

1. Field of the Invention

The present invention relates generally to systems and methods of treating or purifying water and, more particularly, to a water treatment system incorporating an electrochemical device with a reservoir system for delivering treated water to a point of use such as in a household.

2. Description of Related Art

Water that contains hardness species such as calcium and magnesium may be undesirable for some uses in industrial, commercial, and household applications. The typical guidelines for a classification of water hardness are: zero to 60 mg/L as calcium carbonate is classified as soft; 61 mg/L to 120 mg/L as moderately hard; 121 mg/L to 180 mg/L as hard; and more than 180 mg/L as very hard.

Hard water can be treated by removing the hardness ion species. Examples of systems that remove such species include those that use ion exchange beds. In such systems, the hardness ions become ionically bound to oppositely-charged ionic species that are mixed on the surface of the ion exchange resin. The ion exchange resin eventually becomes saturated with ionically bound hardness ion species and must be regenerated. Regeneration typically involves replacing the bound hardness species with more soluble ionic species, such as sodium chloride. The hardness species bound on the ion exchange resin are replaced by the sodium ions and the ion exchange resins are ready again for a subsequent water-softening step.

Other systems have been disclosed. For example, Dosch, in U.S. Pat. No. 3,148,687 teaches a washing machine including a water softening arrangement using ion exchange resins. Similarly, Gadini et al., in International Patent Application Publication No. WO00/64325, disclose a household appliance using water with an improved device for reducing the water hardness. Gadini et al. teach of a household appliance having a control system, a water supply system from an external source and a softening system with an electrochemical cell. McMahon, in U.S. Pat. No. 5,166,220, teaches of a regeneration of ion exchange resin with a brine solution in a water softening process.

Systems and techniques that utilize electrodeionization (EDI) can be used to demineralize, purify, or treat water. EDI is a process that removes ionizable species from liquids using electrically active media and an electrical potential to influence ion transport. The electrically active media may function to collect and discharge ionizable species, or to facilitate the transport of ions by ionic or electronic substitution mechanisms. EDI devices can include media having permanent or temporary charge and can be operated to cause electrochemical reactions designed to achieve or enhance performance. These devices may also include electrically active membranes such as semi-permeable ion exchange or bipolar membranes.

Continuous electrodeionization (CEDI) is a process that relies on ion transport through electrically active media or electroactive media. A typical CEDI device includes alternating electroactive semi-permeable anion and cation selective membranes. The spaces between the membranes are configured to create liquid flow compartments with inlets and outlets. A transverse DC electrical field is imposed by an external power source through electrodes at the bounds of the compartments. In some configurations, electrode compartments are provided so that reaction product from the electrodes can be separated from the other flow compartments. Upon imposition of the electric field, ions in the liquid to be treated in one compartment, the ion-depleting compartment, are attracted to their respective attracting electrodes. The ions migrate through the selectively permeable membranes into the adjoining compartments so that the liquid in the adjoining ion-concentrating compartments become ionically concentrated. The volume within the depleting compartments and, in some embodiments, within the concentrating compartments, includes electrically active media. In CEDI devices, the electroactive media may include intimately mixed anion and cation exchange resin beads. Such electroactive media typically enhances the transport of ions within the compartments and may participate as a substrate for controlled electrochemical reactions. Electrodeionization devices have been described by, for example, Giuffrida et al. in U.S. Pat. Nos. 4,632,745, 4,925,541, and 5,211,823, by Ganzi in U.S. Pat. Nos. 5,259,936 and 5,316,637, by Oren et al. in U.S. Pat. No. 5,154,809 and by Kedem in U.S. Pat. No. 5,240,579.

Other systems that can be used to demineralize water have been described. For example, Gaysowski, in U.S. Pat. No. 3,407,864, teaches of an apparatus that involves both ion exchange and electrodialysis. Johnson, in U.S. Pat. No. 3,755,135, teaches of a demineralizing apparatus using a DC potential.

SUMMARY OF THE INVENTION

The present invention is directed to a water purification or treatment system comprising a pressurized reservoir system fluidly connected to a point of entry, a water treatment device fluidly connected to the pressurized reservoir system, a water distribution system fluidly connected to the pressurized reservoir system and at least one point of use fluidly connected to the water distribution system.

The present invention provides a method and apparatus for providing purified or treated water from a variety of source types. Possible water sources include well water, surface water, municipal water and rain water. The treated product may be for general use or for human consumption or other domestic uses, for example, bathing, laundering, and dishwashing.

The treatment system can be operated to reduce the likelihood of formation of any scale or foulants that are typically generated while producing treated water. The formation of scale or foulants in the treatment system, including its components, such as any pumps, valves and lines, may be inhibited by reversing or substituting the flowing liquid from one having a high tendency to form scale to a liquid having a low no tendency to produce scale, such as a water having a low Langelier Saturation Index (LSI). LSI can be calculated according to, for example, ASTM D 3739.

In another aspect of the present invention, a treatment system is provided comprising a reservoir system fluidly connected to a point of entry, an electrochemical device fluidly connected to the reservoir system, a point of use fluidly connected to the reservoir system, and an auxiliary use fluidly connected downstream of the electrochemical device.

In another aspect of the present invention, a method is provided for treating water comprising introducing water to a pressurized reservoir system, transferring a portion of the water from the pressurized reservoir system to a water treatment device, removing at least a portion of any undesirable species from the water from the pressurized reservoir system in the water treatment device to produce a treated water, transferring the treated water from the water treatment device to the pressurized reservoir system and distributing a portion of the treated water from the pressurized reservoir system to a point of use.

In another aspect of the present invention, a method is provided for treating water comprising introducing water from a point of use to a reservoir system, removing at least a portion of any undesirable species from the water in the reservoir system in an electrochemical device to produce treated water and discharge water, transferring at least a portion of the treated water from the electrochemical device to the reservoir system, transferring a portion of the discharge water to an auxiliary use, and distributing a portion of the treated water from the reservoir system to a point of use.

In another aspect of the present invention, a water distribution system is provided comprising a first pretreatment system fluidly connected to a point of entry, a pressurized reservoir system fluidly connected downstream of the first pretreatment system, a second pretreatment system fluidly connected to the pressurized reservoir system and an electrochemical device fluidly connected downstream of the second pretreatment system and to the pressurized reservoir system.

In another aspect of the present invention, a water treatment system is provided comprising means for accumulating water from a water source at a pressure above atmospheric pressure and an electrochemical device fluidly connected to the means for accumulating water.

In another aspect of the present invention, a method is provided for treating water comprising mixing water from a point of entry with a treated water to produce a mixed water, removing a portion of any undesirable species from a portion of the mixed water in an electrochemical device to produce the treated water and distributing a portion of the mixed water to a point of use.

In another aspect of the present invention, a method is provided for treating water comprising accumulating water from a point of use, removing at least a portion of any undesirable species from the water in an electrochemical device to produce treated water, and supplying at least a portion of the treated water to a household.

In another aspect of the present invention, a method is provided for treating water comprising accumulating water from a point of use at a pressure that is above atmospheric pressure, providing an electrochemical device electrochemical device, transferring at least a portion of the accumulated water to the electrochemical device, removing at least a portion of any undesirable species from the water in the electrochemical device to produce a treated water, and adjusting at least one operating parameter of the electrochemical device.

In another embodiment, the present invention provides a system comprising a fluid reservoir in thermal communication with a heat exchanger and a fluid treatment device fluidly connected to the fluid reservoir.

In another embodiment, the present invention provides a method for facilitating water treatment. The method can comprises providing a system comprising a pressurizable reservoir system that is fluidly connectable to a point of entry and an electrochemical device fluidly connected to the pressurizable reservoir system and fluidly connectable to a water distribution system.

In one aspect, the present invention provides a water treatment system. The system can comprise a water reservoir fluidly connected to a point of entry, an electrochemical device fluidly connected to the water reservoir and comprising a compartment that is at least partially filled with electroactive media and bounded by anion-selective membranes on each side thereof and a water distribution system fluidly connected to at least one of the water reservoirs and the electrochemical device.

In another embodiment, the present invention provides an electrochemical device comprising an ion-trapping compartment comprising cation-exchange resin and anion-selective membranes.

In another embodiment, the present invention provides an electrochemical device comprising a compartment comprising electroactive media that is substantially free of cation-exchange resin and is bounded by anion-selective membranes on each side thereof.

In another embodiment, the present invention provides an electrochemical device comprising a compartment consisting essentially of cation-exchange resin and anion-selective membranes.

In another embodiment, the present invention provides an electrochemical device electrochemical device comprising a compartment that is constructed and arranged to inhibit the migration of cations while promoting the migration of anions to an adjacent compartment.

In another embodiment, the present invention provides an electrochemical device comprising a first depleting compartment, an ion-trapping compartment comprising cation-exchange resin adjacent the first depleting compartment, an alkaline-collecting compartment positioned adjacent the ion-trapping compartment and a second depleting compartment positioned adjacent the alkaline-collecting compartment.

In another embodiment, the present invention provides an electrochemical device comprising an ion-exchange fiber disposed between ion-selective membranes.

In another embodiment, the present invention provides an electrochemical device comprising a depleting compartment and a concentrating compartment. At least one of the depleting and concentrating compartments comprises electroactive fiber felt.

In another embodiment, the present invention provides a method of treating a liquid. The method can comprise providing an electrochemical device comprising a depleting compartment, a concentrating compartment and an ion-trapping compartment disposed between the depleting and concentrating compartments, passing the liquid to be treated through the depleting compartment and collecting hydrogen ions in the ion-trapping compartment.

In another embodiment, the present invention provides a method of treating water. The method can comprise providing an electrochemical device comprising a compartment bounded by an ion-selective membrane, introducing water into the compartment, dissociating water into hydrogen and hydroxyl ions in the compartment and transferring at least a portion of the hydrogen ions to an electrode compartment of the electrochemical device.

In another embodiment, the present invention provides a method of facilitating liquid treatment. The method can comprise providing an electrochemical device comprising at least one compartment that is at least partially filled with cation-exchange resin and bounded by anion-selective membranes on each side thereof.

In another embodiment, the present invention provides a method of facilitating liquid treatment. The method can comprise providing an electrochemical device comprising a compartment consisting essentially of cation-exchange resin and anion-selective membranes.

In one aspect, the present invention provides a storage system comprising a pressurized reservoir system having a first inlet fluidly connected to a point of entry and a second inlet fluidly connected to an electrochemical device, at least one conductivity sensor in the pressurized reservoir system and a distribution system fluidly connected to the pressurized reservoir system and to a point of use.

In another embodiment, the present invention provides a water treatment system comprising a reservoir system fluidly connected to a point of entry and having a first baffle plate, a water treatment device fluidly connected to the reservoir system and a water distribution system fluidly connected to the reservoir system and a point of use.

In another embodiment, the present invention provides a method for providing treated water. The method can comprise storing water from a point of entry, removing at least a portion of any undesired species from the water in an electrochemical device to produce treated water, measuring at least one water property of the treated water, and transferring at least a portion of the treated water to a point of use according to the measured property.

In another embodiment, the present invention provides an electrodeionization system comprising a reservoir system fluidly connected to a point of entry and having a water property sensor, an electrodeionization device fluidly connected to the reservoir system and a controller connected to the water property sensor for regulating a water flow from the reservoir system to a point of use.

In another aspect, the present invention provides a method for providing treated water. The method can comprise storing water from a point of entry under a pressure that is above atmospheric pressure, removing at least a portion of any undesired species from the water in a water treatment device to produce treated water, measuring a property of the treated water, determining a difference between the property of the treated water to a set point and controlling an operating parameter of the electrochemical device based on the difference between the property of the treated water and the set point.

In another embodiment, the present invention provides a method for facilitating water treatment. The method can comprise providing a water treatment system comprising an electrochemical device that is fluidly connected to a reservoir system having a water property sensor and a controller that is connected to the water property sensor for regulating a water flow from the reservoir system to a point of use. The treatment system is fluidly connectable to a point of entry and to the point of use.

In another embodiment, the present invention provides a method for facilitating water treatment. The method can comprise providing a water treatment system comprising a reservoir system having a baffle plate and an electrochemical device. The reservoir system is fluidly connectable to a point of entry and to a water distribution system.

In another embodiment, the present invention provides a water treatment system comprising means for storing water that is fluidly connected to a point of entry and an electrochemical device, means for determining a water property in the means for storing water and means for delivering the water to a point of use based on the water property.

In another aspect, the present invention provides a method for providing treated water. The method can comprise storing water from a point of entry, removing at least a portion of any undesirable species from the water to produce treated water, storing at least a portion of the treated water and minimizing any mixing of the water from the point of entry and the treated water.

In yet another embodiment, the present invention provides a method for providing treated water. The method can comprise storing water from a point of entry in a first zone of a reservoir system, removing at least a portion of any undesirable species from the water to produce treated water, and storing at least a portion of the treated water in a second zone of the reservoir system.

In another aspect, the present invention provides a method for purifying water. The method can comprise storing water from a point of use, releasing any volatilizable material from the stored water, removing at least a portion of any undesirable species from the water in water treatment device to produce treated water, and storing at least a portion of the treated water.

In another aspect, the present invention provides a method for purifying water. The method can comprise storing water from a point of use, aerating the stored water, removing at least a portion of any undesirable species from the water in an electrodeionization device to produce treated water, and storing at least a portion of the treated water.

In another aspect, the present invention provides a water treatment system comprising a reservoir system fluidly connected to a point of entry and comprising a ventilation system, an electrodeionization device fluidly connected to the reservoir system, and a point of use fluidly connected to the reservoir system.

In another aspect, the present invention provides a water treatment system comprising a reservoir system fluidly connected to a point of entry and comprising an aeration system, a water treatment device fluidly connected to the reservoir system, and a point of use fluidly connected to the reservoir system.

In one aspect, the present invention provides a storage system comprising a pressurized reservoir system having a first inlet fluidly connected to a point of entry and a second inlet fluidly connected to an electrochemical device, at least one conductivity sensor in the pressurized reservoir system and a distribution system fluidly connected to the pressurized reservoir system and to a point of use.

In another embodiment, the present invention provides a water treatment system comprising a reservoir system fluidly connected to a point of entry and having a first baffle plate, a water treatment device fluidly connected to the reservoir system and a water distribution system fluidly connected to the reservoir system and a point of use.

In another embodiment, the present invention provides a method for providing treated water. The method can comprise storing water from a point of entry, removing at least a portion of any undesired species from the water in an electrochemical device to produce treated water, measuring at least one water property of the treated water, and transferring at least a portion of the treated water to a point of use according to the measured property.

In another embodiment, the present invention provides an electrodeionization system comprising a reservoir system fluidly connected to a point of entry and having a water property sensor, an electrodeionization device fluidly connected to the reservoir system and a controller connected to the water property sensor for regulating a water flow from the reservoir system to a point of use.

In another aspect, the present invention provides a method for providing treated water. The method can comprise storing water from a point of entry under a pressure that is above atmospheric pressure, removing at least a portion of any undesired species from the water in a water treatment device to produce treated water, measuring a property of the treated water, determining a difference between the property of the treated water to a set point and controlling an operating parameter of the electrochemical device based on the difference between the property of the treated water and the set point.

In another embodiment, the present invention provides a method for facilitating water treatment. The method can comprise providing a water treatment system comprising an electrochemical device that is fluidly connected to a reservoir system having a water property sensor and a controller that is connected to the water property sensor for regulating a water flow from the reservoir system to a point of use. The treatment system is fluidly connectable to a point of entry and to the point of use.

In another embodiment, the present invention provides a method for facilitating water treatment. The method can comprise providing a water treatment system comprising a reservoir system having a baffle plate and an electrochemical device. The reservoir system is fluidly connectable to a point of entry and to a water distribution system.

In another embodiment, the present invention provides a water treatment system comprising means for storing water that is fluidly connected to a point of entry and an electrochemical device, means for determining a water property in the means for storing water and means for delivering the water to a point of use based on the water property.

In another aspect, the present invention provides a method for providing treated water. The method can comprise storing water from a point of entry, removing at least a portion of any undesirable species from the water to produce treated water, storing at least a portion of the treated water and minimizing any mixing of the water from the point of entry and the treated water.

In yet another embodiment, the present invention provides a method for providing treated water. The method can comprise storing water from a point of entry in a first zone of a reservoir system, removing at least a portion of any undesirable species from the water to produce treated water, and storing at least a portion of the treated water in a second zone of the reservoir system.

In another aspect, the present invention provides a method for purifying water. The method can comprise storing water from a point of use, releasing any volatilizable material from the stored water, removing at least a portion of any undesirable species from the water in water treatment device to produce treated water, and storing at least a portion of the treated water.

In another aspect, the present invention provides a method for purifying water. The method can comprise storing water from a point of use, aerating the stored water, removing at least a portion of any undesirable species from the water in an electrodeionization device to produce treated water, and storing at least a portion of the treated water.

In another aspect, the present invention provides a water treatment system comprising a reservoir system fluidly connected to a point of entry and comprising a ventilation system, an electrodeionization device fluidly connected to the reservoir system, and a point of use fluidly connected to the reservoir system.

In another aspect, the present invention provides a water treatment system comprising a reservoir system fluidly connected to a point of entry and comprising an aeration system, a water treatment device fluidly connected to the reservoir system, and a point of use fluidly connected to the reservoir system.

In one aspect, the present invention provides a method of treating water. The method can comprise introducing water into an electrochemical device to produce treated water and a concentrate stream, recirculating at least a portion of the concentrate stream in a concentrating compartment of the electrochemical device, and discharging a predetermined portion of the concentrate stream according to a predetermined discharge schedule.

In accordance with one or more embodiments, the present invention provides an electrochemical device comprising a concentrating compartment and a positively-charged flow regulator positioned downstream of the concentrating compartment.

In accordance with one or more embodiments, the present invention provides a method of facilitating water treatment. The method can comprise providing an electrochemical device comprising a concentrating compartment and a flow regulator positioned downstream of the concentrating compartment. The flow regulator constructed and arranged to have a positive charge during operation of the electrochemical device.

In accordance with one or more embodiments, the present invention provides a method of treating water. The method can comprise introducing water into an electrochemical device to produce treated water, storing at least a portion of the treated water, ceasing production of the treated water, and replacing any fluid in the electrochemical device with the treated water.

In accordance with one or more embodiments, the present invention provides a system comprising a point-of-entry, an electrochemical device comprising a depleting compartment and a concentrating compartment fluidly connected to the point-of-entry, a positively-charged flow regulator fluidly connected downstream of the concentrating compartment, a reservoir system fluidly connected to the depleting compartment, and a point of use fluidly connected to the reservoir system.

In accordance with one or more embodiments, the present invention provides an electrodeionization device comprising a concentrating compartment and a flow regulator regulated by a controller according to a predetermined discharge schedule and fluidly connected downstream of the concentrating compartment for regulating a flow of a waste stream to a drain.

In accordance with one or more embodiments, the present invention provides a method of softening water. The method can comprise introducing water to a depleting compartment of an electrochemical device to produce softened water, recirculating a concentrating stream in a concentrating compartment of the electrochemical device, and changing a pH of the concentrating stream proximate a flow regulator.

In accordance with one or more embodiments, the present invention provides an electrodeionization device comprising a concentrating compartment with a flowing waste stream and a diaphragm valve for regulating a portion of the flowing waste stream from the concentrating compartment to a drain.

In accordance with one or more embodiments, the present invention provides an electrodeionization device comprising a concentrating compartment with a flowing waste stream and means for discharging a portion of the waste stream from the concentrating compartment to a drain according to a predetermined schedule.

In accordance with one or more embodiments, the present invention provides an electrochemical device comprising a concentrating compartment with a waste system, means for discharging the waste stream to a drain, and means for applying a positive charge on the means for discharging the waste stream.

In accordance with one or more embodiments, the present invention provides a method of facilitating fluid treatment. The method can comprise providing a fluid treatment system comprising an electrochemical device comprising a depleting compartment and a flow regulator regulated by a controller according to a predetermined discharge schedule and fluidly connected downstream of the concentrating compartment for regulating a flow of a waste stream to a drain.

In one aspect, the present invention provides a method of producing treated water. The method can comprise introducing water from a point of entry into an electrochemical device, removing at least a portion of any undesirable species from the water in the electrochemical device while suppressing hydroxyl ion generation to produce treated water, and distributing at least a portion of the treated water to a point of use.

In accordance with one or more embodiments, the present invention provides a method of producing treated water. The method can comprise introducing water from a point of entry into an electrochemical device, applying an electrical current below a limiting current density through the electrochemical device to promote removal of any undesirable species from the water and produce treated water and maintaining the electrical current below the limiting current density.

In accordance with one or more embodiments, the present invention provides a water treatment system. The system comprises a reservoir system fluidly connected to a point of entry, an electrodeionization device fluidly connected to the point of entry and the reservoir system, a power supply for providing an electrical current to the electrochemical device and a controller for regulating the electrical current below a limiting current density.

In accordance with one or more embodiments, the present invention provides a method of facilitating water treatment. The method can comprise providing a reservoir system fluidly connectable to a point of entry, providing an electrochemical device fluidly connectable to the reservoir system, providing a power supply for providing an electrical current to the electrochemical device and providing a controller for regulating the electrical current below a limiting current density.

Other advantages, novel features, and objects of the invention should become apparent from the following detailed description of the invention, when considered in conjunction with the accompanying drawings, which are schematic and are not intended to be drawn to scale. In the figures, each identical or substantially similar component that is illustrated in various figures is represented by a single numeral or notation. For clarity, not every component is labeled in every figure, nor is every component of each embodiment of the invention shown, where illustration is not necessary to allow those of ordinary skill in the art to understand the invention.

In one aspect, the invention provides a method of providing water comprising passing a first water stream through a depleting compartment of an electrodeionization device to produce a second water stream having an LSI less than about 0, passing the second water stream through a cathode compartment of the electrodeionization device to produce a third water stream, the third water stream being less corrosive than the first water stream and having an LSI of less than about 0.

In another aspect, the invention provides a method of providing potable water comprising passing a first water stream through a cathode compartment of an electrochemical device to produce a second water stream passing the second water stream through a depleting compartment of an electrochemical device to produce a third water stream having an LSI less than about 0, the third water stream being less corrosive than the first water stream.

In another aspect, the invention provides a method of retaining a residual chlorine level in water comprising removing greater than 90% of active chlorine from a first water stream; passing the water stream through a depleting compartment of an electrochemical device; removing a portion of any ions dissolved in the water stream, introducing the water stream to a loop, the loop including a storage vessel; and introducing active chlorine in a second water stream into the loop at a rate adequate to maintain an effective average chlorine concentration in the loop.

In another aspect, the invention provides a method of selectively retaining ions in a water supply comprising passing a feed water through a depleting compartment of an electrochemical device, the feed water comprising monovalent and divalent ions; removing at least 30% of the divalent cations from the feed water and retaining at least about 80% of a species selected from silica, boron and fluoride, to produce a treated water; and supplying the treated water for household consumption.

In another aspect, the invention provides a method of producing a purified water comprising passing a water stream through a depleting compartment of an electrochemical device and adjusting a voltage applied to the electrochemical device to control the current passing through the electrochemical device at a level adequate to remove greater than about 25% of any calcium in the water stream and inadequate to remove greater than about 10% of any fluoride or silica species from the water stream.

In another aspect, the invention provides a method comprising softening a feed water through a bed of ion exchange material to remove greater than 30% of any hardness ions from the feed water to produce a softened water, supplying the softened water for household consumption, and discharging a concentrated solution comprising calcium, wherein the sum of the ionic content of the softened water and the ionic content of the concentrated solution is no greater than the total ionic content supplied by the feed water.

The present invention is directed to a treatment system. The treatment system can comprise an electrochemical device comprising a first compartment and a second compartment, a first liquid circuit fluidly a first compartment inlet and a first pump, a second liquid circuit fluidly connecting a second compartment outlet to a second compartment inlet and a second pump and a third liquid circuit fluidly connecting the second compartment inlet and the second pump.

In accordance with one or more embodiments, the present invention provides a treatment system. The treatment system can comprise an electrochemical device comprising a first compartment comprising a first compartment outlet and a first compartment inlet and a second compartment comprising a second compartment outlet and a second compartment inlet, a first pump fluidly connectable to the first compartment outlet and to the first compartment inlet, a second pump fluidly connectable to the second compartment outlet and to the second compartment inlet, and a circulation line fluidly connectable to at least one of the first or second compartment outlets. The electrochemical device fluidly is typically connected to a point of entry In accordance with one or more embodiments, the present invention provides a method of treating a liquid. The method can comprise establishing a first liquid circuit having liquid to be treated flowing therein from a reservoir to a first compartment inlet of an electrochemical device through a first pump, establishing a second liquid circuit having a concentrating liquid flowing therein from a second compartment outlet of the electrochemical device to a second compartment inlet through a second pump, and establishing a third liquid circuit having liquid to be treated flowing therein from the reservoir to the second compartment inlet through the second pump.

In accordance with one or more embodiments, the present provides a method of treating water. The method can comprise passing at least a portion of water to be treated through a depleting compartment of an electrochemical device through a first pump to produce the treated water, circulating the concentrated stream through a concentrating compartment of the electrochemical device through a second pump, and circulating the concentration stream through the concentrating compartment through the first pump.

In accordance with one or more embodiments, the present invention provides a method of treating water. The method can comprise passing water to be treated through an electrochemical device to produce treated water, storing at least a portion of the treated water in a water reservoir, and flushing a concentrating compartment of the electrochemical device with the treated water.

In accordance with one or more embodiments, the present invention provides the method of facilitating water purification. The method can comprise providing an electrochemical device comprising a first compartment and a second compartment; providing a first pump fluidly connectable to at least one of a water reservoir, a first compartment outlet and a first compartment inlet; providing a second pump fluidly connectable to at least one of the water reservoir, a second compartment outlet and a second compartment inlet; and providing a circulation line fluidly connectable to at least one of the first and second compartment outlets.

In accordance with one or more embodiments, the present invention provides a treatment system. The treatment system can comprise a electrochemical device comprising a first compartment and a second compartment, means for flowing a liquid to be treated from a water reservoir through the first compartment and circulating a concentrating liquid through the second compartment and means for flowing the liquid to be treated from the water reservoir through the second compartment and circulating the concentrating liquid through the first compartment.

BRIEF DESCRIPTION OF THE DRAWINGS

Preferred, non-limiting embodiments of the present invention will be described by way of example and with reference to the accompanying drawings, in which:

FIGS. 9A-9B are graphs showing water properties measured in the water treatment system schematically shown in FIG. 8 under an applied potential of about 40 volts, wherein FIG. 9A shows the conductivity of product and tank outlet streams and FIG. 9B shows the conductivity of a reject stream;

FIGS. 10A-10B are graphs showing water properties measured in the water treatment system schematically shown in FIG. 8 under an applied potential of about 52 volts, wherein FIG. 10A shows the conductivity of product and tank outlet streams and FIG. 10B shows the conductivity of a reject stream;

FIGS. 11A-11B are graphs showing measured water properties of the water treatment system schematically shown in FIG. 8, wherein FIG. 11A shows the conductivity of product and tank outlet streams and FIG. 11B shows the conductivity of a reject stream.

DETAILED DESCRIPTION OF THE INVENTION

The present invention is directed to a water treatment or purification system and method of providing treated water in industrial, commercial, and residential settings. The treatment system can provide treated water to a point of use by removing at least a portion of any hardness-causing species contained in water from a water source, such as municipal water, well water, brackish water and water containing foulants. Other applications of the system would be in the treatment and processing of foods and beverages, sugars, various industries, such as the chemical, pharmaceutical, food and beverage, wastewater treatments and power-generating industries. The present invention will be described using water as the fluid but should not be limited as such. For example, where reference is made to treated water, it is believed that other fluids can be treated according to the present invention. Moreover, where reference is made to a component of the system or to the method of the present invention that adjusts, modifies, measures or operates on water or water property, the present invention is believed to be applicable as well. Thus, the fluid to be treated may be a fluid that is a mixture comprising water. Accordingly, the fluid can be a liquid that can comprise water.

The water purification or treatment system in accordance with one or more embodiments of the present invention typically receives water from the water source or a point of entry and purifies the water containing at least some undesirable species before delivering the treated water to a point of use.

The treatment system typically has a reservoir system in line with a water purification or treatment apparatus such as, but not limited to, an electrodeionization device, a reverse osmosis device, an electrodialysis device, a capacitive deionization device, a microfiltration device, and/or an ultrafiltration device. The treatment system, in some embodiments of the present invention, further comprises a sensor for measuring at least one property of the water or an operating condition of the treatment system. In other embodiments, the treatment system also includes a controller for adjusting or regulating at least one operating parameter of the treatment system or a component of the treatment system.

Figure 1:
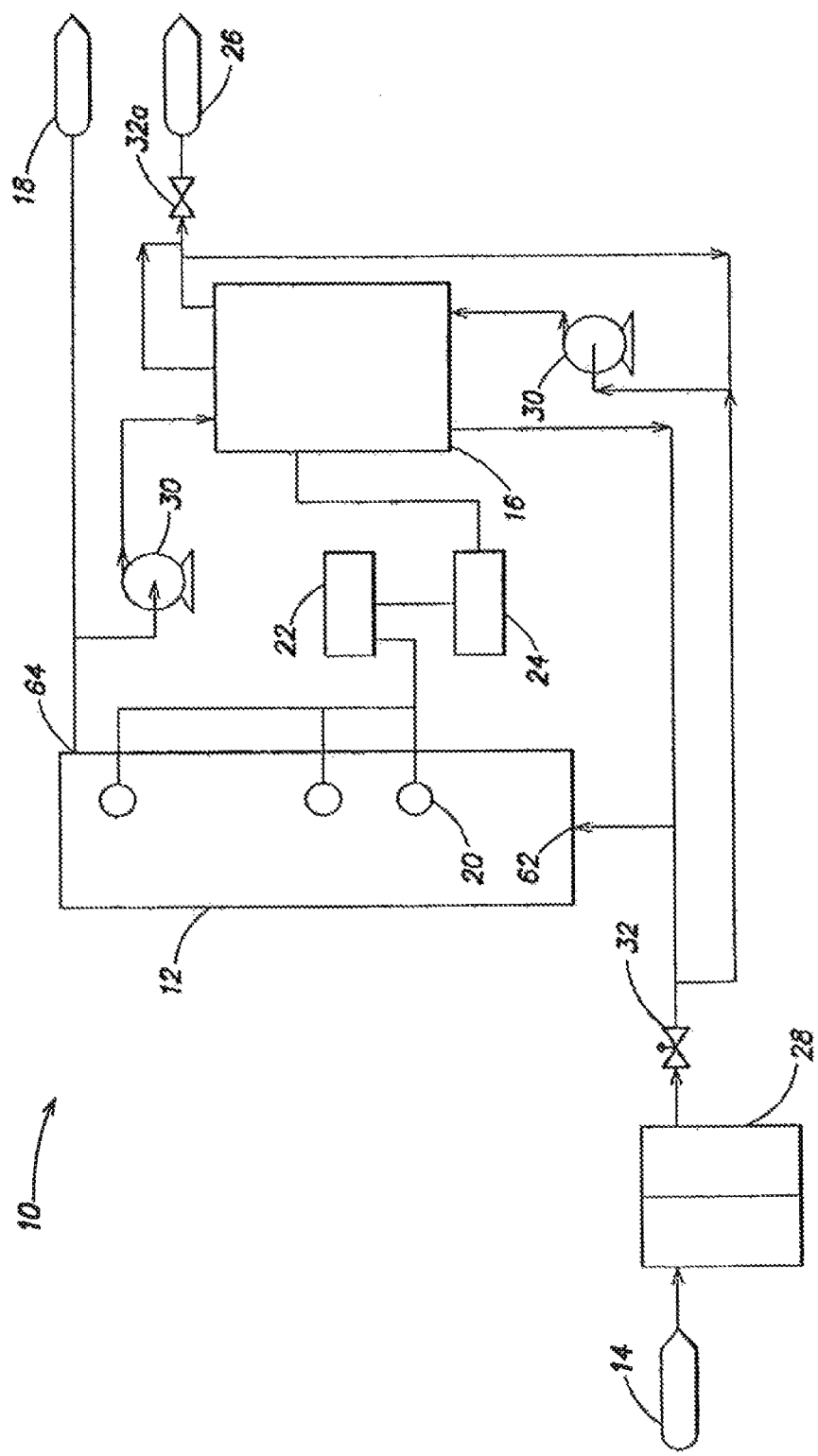
FIG. 1 is a process flow diagram of a water treatment system showing an in-line system with a pressurized reservoir system and a treatment device in accordance with one or more embodiments of the invention.

FIG. 1 shows a schematic flow diagram of a treatment system according to one embodiment of the present invention. Treatment system 10 includes a reservoir system 12 fluidly connected, typically, to a liquid source or a point of entry 14 and to a purification or treatment device 16, typically downstream of the point of entry. Treatment system 10 typically includes a point of use 18, which is typically fluidly connected downstream of reservoir system 12. In certain embodiments, treatment system 10 also has a sensor 20 and a controller 22 for controlling or regulating power source 24, which provides power to treatment device 16. Treatment device 16 typically removes at least a portion of any undesirable species from the liquid to be treated, flowing from point of entry 14, to produce treated liquid, such was treated water, for storage in reservoir system 12 and ultimate delivery to point of use 18. Undesirable species removed by treatment device 16 can be transferred to an auxiliary use or a drain 26.

One embodiment of a system of the invention is illustrated schematically in FIG. 1. FIG. 1 shows a water softening system 10 that may be used in a variety of installations, such as in a home. Feed water supplied at point of entry 14 may be, for example, well water or a municipal water supply.

The auxiliary use can be a utility or service that can utilize the stream containing the undesirable species. For example, the fluid stream carrying the undesirable species can be used in a lawn sprinkler system. However, an auxiliary use is not to be considered as limited to be a fluid stream that is secondary to the treated stream. Thus, in some cases, the concentrate stream may contain the desirable species that was retrieved from the feed stream.

In certain embodiments of the present invention, treatment system 10, as, for example, a water treatment system, further includes pretreatment system 28, which is typically fluidly connected upstream of reservoir system 12 or treatment device 16. Moreover, treatment system 10 typically also includes one or more fluid control components, such as pump 30 and valve 32.

The present invention will be further understood in light of the following definitions. As used herein, "pressurized" refers to a system or component that has a pressure, internal or applied, that is above atmospheric pressure. For example, pressurized reservoir system 12 has an internal pressure that is greater than atmospheric pressure. As used herein, pressurized refers to any unit operation that has a differential pressure that is greater than about 2 psi. Accordingly, a pressurized vessel is a vessel that has a differential pressure, for example, through its wall, that is greater than about 2 psi. Pressure in the pressurized reservoir system can be created by various methods and techniques, for example, by pressurizing the water with a water pump or by elevating the water source, thus creating head pressure. Furthermore, where reference is made to "treated" water or fluid, the treated water can be softened water, low Langelier Saturation Index (LSI) water or low conductivity water. As used herein, low LSI water has a LSI of less than about 2, preferably, less than about 1, and more preferably, less than about zero. As used herein, the phrase "treatment device" or "purification device" or apparatus pertains to any apparatus that can be used to remove or reduce the concentration any undesirable species from a fluid to be treated. Such treatment apparatus include, but are not limited to, those that rely on techniques such as ion-exchange resin reverse osmosis, electrodeionization, electrodialysis, ultrafiltration, microfiltration, capacitive deionization. Further, where reference is made to an electrochemical device, such as "electrodeionization device 16," such reference is meant to be exemplary and other electrochemical devices such as, but not limited to, electrodeionization devices, electrodialysis devices, and, in some cases, capacitive deionization devices, may be used in accordance with the principles of the present invention as long as such use is not inconsistent or contrary to operation of such devices and/or the techniques of the present invention. Although a number of apparatus may be used as a treatment device, the applicability of such apparatus is not intended to imply that each or all of the apparatus utilize the same principles but that such apparatus may be used, alone or in combination, as a treatment device in accordance with one or more systems and techniques of the present invention.

As used herein, "hardness" refers to a condition that results from the presence of polyvalent cations, typically calcium or magnesium or other metals, in water, that can adversely affects the cleansing capability of the water and the "feel" of the water and may increase the scaling potential of the water. Hardness is typically quantified by measuring the concentration of calcium and magnesium species. In certain embodiments, undesirable species can include hardness ion species.

As used herein, "polarization" refers to the process wherein in water is split to hydrogen or hydronium and to hydroxyl ion species. Water polarization can be effected by providing sufficient energy, for example, by applying an electrical current, specifically, by applying an electrical current above a "limiting current density," which is the current wherein water dissociates. The limiting current density depends on several factors including, among others, the conductivity of the water, the applied voltage, the type of electrodes used, the presence and type of any electroactive media and the ability of such electroactive media to conduct the applied current. Various embodiments in accordance with the present invention have been described in terms of an electrodeionization device. However, other types of electrochemical devices in systems may be utilized in accordance with the systems and techniques of the present invention. Examples of electrochemical devices that may be utilized in accordance with one or more embodiments of the present invention include, but not limited to, electrodeionization devices, electrodialysis devices, and, in some cases, capacitive deionization devices.

Figure 2:
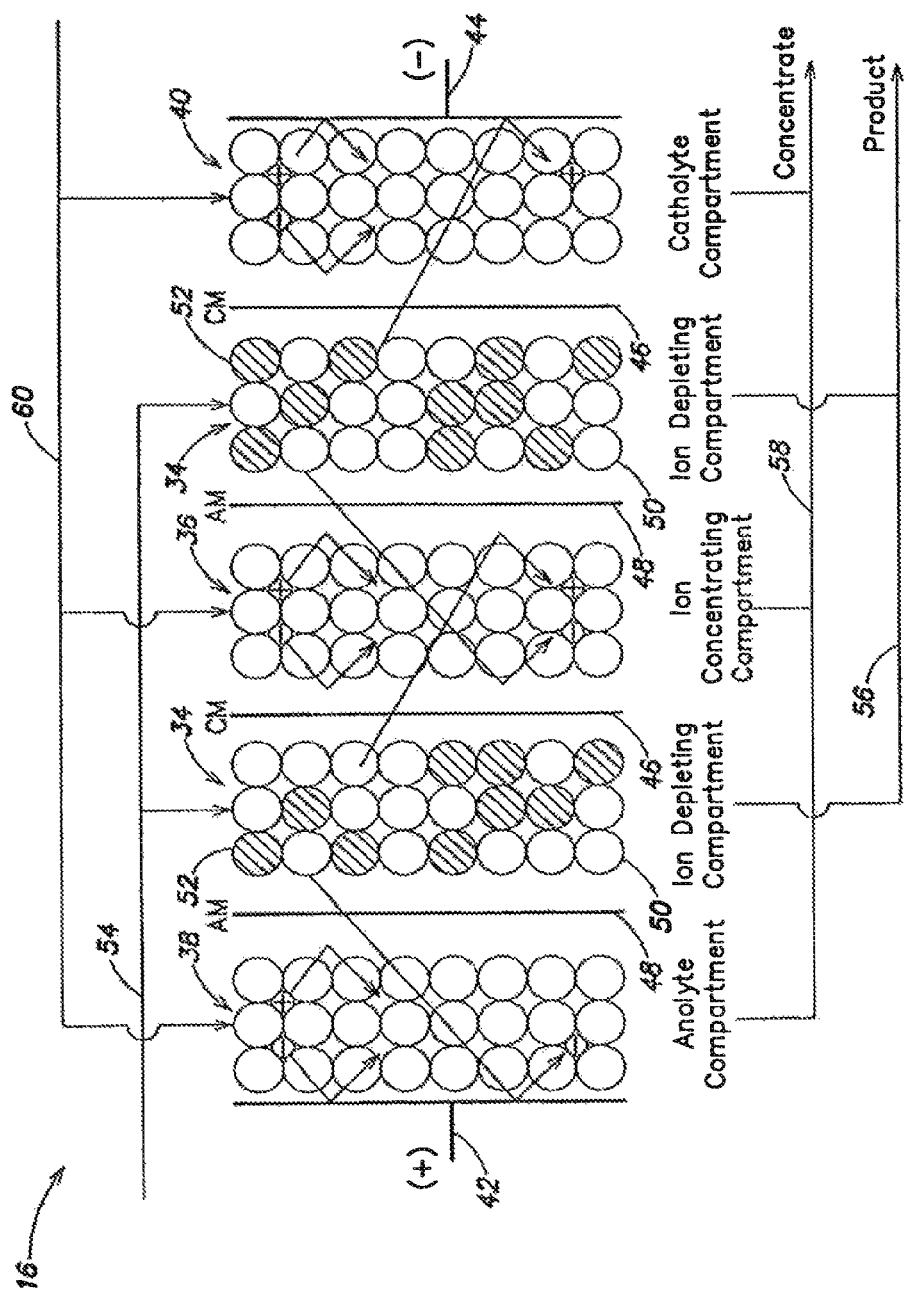
FIG. 2 is a schematic, sectional view through a typical electrochemical device in accordance with one or more embodiments of the present invention, illustrating the fluid and ion flow directions through depleting and concentrating compartments.

FIG. 2 schematically shows a cross-sectional view of fluid and ion flow paths through one embodiment of an electrodeionization module or device of the present invention. The electrodeionization module or device 16 includes ion-depleting (depleting) compartments 34 and ion-concentrating (concentrating) compartments 36, positioned between depleting compartments 34. Depleting compartments 34 are typically bordered by an anolyte compartment 38 and a catholyte compartment 40. Typically, end blocks (not shown) are positioned adjacent to end plates (not shown) to house an anode 42 and a cathode 44 in the respective compartments. In certain embodiments, the compartments include cation-selective membranes 46 and anion-selective membranes 48. The cation-selective membranes and anion-selective membranes typically comprise ion exchange powder, a polyethylene powder binder, and a glycerin lubricant.

The cation-selective and anion-selective membranes are typically heterogeneous polyolefin-based membranes, which are typically extruded by a thermoplastic process using heat and pressure to create a composite sheet. However, the present invention contemplates the use of the other types of membranes including homogeneous membranes. Representative suitable ion-selective membranes include, for example, web supported using styrene-divinyl benzene with sulfonic acid or quaternary ammonium functional groups, web supported using styrene-divinyl benzene in a polyvinylidene fluoride binder, and unsupported-sulfonated styrene and quarternized vinyl benzyl amine grafts on polyethylene sheet.

Concentrating compartments 36 are typically filled with electroactive media such as cation exchange resin beads 50 and depleting compartments 34 are typically filled with a mixture of cation exchange resin beads 50 and anion exchange resin beads 52. In some embodiments, the cation exchange and anion exchange resin beads can be arranged in layers within any of the depleting, concentrating and electrode compartments so that a number of layers in a variety of arrangements can be assembled. Other configurations and/or arrangements are believed to be within the scope of the invention including, for example, the use of mixed bed ion exchange resin beads in any of the depleting, concentrating and electrode compartments, the use of inert resin between layer beds of anionic and cationic exchange resin beads, the use of various types and arrangements of anionic and cationic resin beads including, but not limited to, those described by DiMascio et al., in U.S. Pat. No. 5,858,191, which is incorporated herein by reference in its entirety.

In operation, a liquid to be treated 54, typically from an upstream water source entering the treatment system at point of entry 14, having dissolved cationic and anionic components, including hardness ion species, can be introduced into depleting compartments 34 through manifold 60, wherein the cationic components are typically attracted to the cation exchange resin beads 50 and the anionic components are attracted to the anion exchange resin beads 52. An electric field applied across electrodeionization device 16, through anode 42 and cathode 44, which are typically positioned on opposite ends of electrodeionization device 16, typically passes perpendicularly relative to the fluid flow direction. Under the influence of the electric field, cationic and anionic components in the liquid tend to migrate in a direction corresponding to their attracting electrodes. Cationic components can migrate through cation-selective membrane 46 into adjacent concentrating compartment 36.

Anion-selective membrane 48, typically positioned on the opposite side of concentrating compartment 36, prevents migration into adjacent compartments, thereby trapping the cationic components in the concentrating compartment. Similarly, anionic components migrate through the ion-selective membranes, but in a direction that is opposite relative to the migration direction of the cationic components. Anionic components migrate through anion-selective membrane 48, from depleting compartment 34, into adjacent concentrating compartment 36. Cation-selective membrane 46, positioned on the other side of concentrating compartment 36, prevents further migration, thus trapping anionic components in the concentrating compartment. In net effect, ionic components are removed or depleted from the liquid 54 flowing in depleting compartments 34 and collected in concentrating compartments 36 resulting in a treated water product stream 56 and a concentrate or waste stream 58.

In accordance with some embodiments of the present invention, the applied electric field on electrodeionization device 16 creates a polarization phenomenon, which typically leads to the dissociation of water into hydrogen and hydroxyl ions. The hydrogen and hydroxyl ions regenerate the ion exchange resin beads 50 and 52 in depleting compartments 34 and in some embodiments, concentrating compartments 36, so that removal of dissolved ionic components can occur continuously and without a separate step for regenerating exhausted electroactive media.

The applied electric field on electrodeionization device 16 is typically a direct current. However, any applied electric current that creates a bias or a potential difference between one electrode and another can be used to promote migration of ionic species by, for example, ionic attraction. Therefore, an alternating current may be used, if there is a potential difference between electrodes that is sufficient to attract cationic and anionic species to the respective attracting electrodes. In yet another embodiment, an alternating current may be rectified, for example, by using a diode or a bridge rectifier, to convert an alternating current to a pulsating current with sufficient potential to attract the respective ionic species.

In accordance with some embodiments of the present invention, the applied electric field across electrodeionization device 16 can create a polarization phenomenon, which can lead to the dissociation of water into hydrogen and hydroxyl ions. The hydrogen and hydroxyl ions can regenerate the ion exchange resins 50 and 52 in ion-depleting compartments 34, so that removal of dissolved ionic components can occur continuously and without a separate step for regenerating exhausted ion exchange resins because of the ionic species migration. The applied electric field across electrodeionization device 16 is typically a direct current. However, any applied electric field that creates a bias or a potential difference between one electrode and another can be used to promote migration of ionic species. Therefore, an alternating current may be used, provided that there is a potential difference between electrodes that is sufficient to attract cationic and anionic species to the respective attracting electrodes. In yet another embodiment of the present invention, an alternating current may be rectified, for example, by using a diode or a bridge rectifier, to convert an alternating current to a pulsating direct current such that, when the current is applied across the electrodeionization device, a potential gradient is created that attracts the respective ionic species.

The electroactive media, for example, the ion exchange resin beads 50 and 52, typically utilized in depleting compartments 34, can have a variety of functional groups on their surface regions, such as tertiary, alkyl amino groups and dimethyl ethanolamine. These materials can also be used in combinations with ion exchange resin materials having various functional groups on their surface regions, such as quaternary ammonium groups. The electroactive media can comprise a fiber or felt material comprising functional groups on a surface thereof. The use of ion-exchange fiber can ease assembly and replacement of such spent electroactive media. In some embodiments, the ion-exchange fiber comprises positively-charged or negatively-charged, or both, species bound to a matrix. The matrix can be a fibrous felt comprising, for example, a polymeric material such as, but not limited to, a polyolefin like polypropylene, polyethylene, or polystyrene. Examples of fiber felt media include those available from the Smoptech Corporation or Johnson Matthey Inc., Wayne, Pa. In accordance with further embodiments of the present invention, the electrochemical device can comprise ion exchange membranes having surface textures or three-dimensional aspects that define projections, which may, in some cases, contact adjacent ion exchange membranes with or without three-dimensional aspects. Such features can promote mixing of fluid flowing adjacently, which may inhibit formation of deposits.

Reservoir system 12 can store or accumulate water from point of entry 14 or a water source and may also serve to store softened or treated water from product stream 56 from electrodeionization device 16 and provide water, typically treated water or treated water mixed with water from point of entry 14 to point of use 18 through a distribution system. In one embodiment, reservoir system 12 is a pressurized reservoir system. Pressure in the pressurized reservoir system can be created by various methods and techniques, for example, by pressurizing the water with a pump or by elevating the water source, thus creating head pressure.

In accordance with some embodiments of the present invention, reservoir system 12 comprises a pressurized vessel or a vessel that has inlets and outlets for fluid flow such as an inlet 62 and an outlet 64. Inlet 62 is typically fluidly connected to point of entry 14 and outlet 64 is typically fluidly connected to a water distribution system or a point of use 18. Reservoir system 12 can have several vessels, each vessel, in turn, can have several inlets positioned at various locations. Similarly, outlet 64 can be positioned on each vessel at various locations depending on, among other things, demand or flow rate to point of use 18, capacity or efficiency of electrodeionization device 16, and capacity or hold-up of reservoir system 12. Reservoir system 12 can further comprise various components or elements that perform desirable functions or avoid undesirable consequences. For example, reservoir system 12 can have vessels having internal components, such as baffles that are positioned to disrupt any internal flow currents within the vessels of reservoir system 12. In some embodiments, reservoir system 12 has a heat exchanger for heating or cooling the fluid. For example, reservoir system 12 can comprise a vessel with a heating coil, which can have a heating fluid at an elevated temperature relative to the temperature of the fluid in the vessel. The heating fluid can be hot water in closed-loop flow with a furnace or other heating generating unit operation so that the heating fluid temperature is raised in the furnace. The heating fluid, in turn, raises the vessel fluid temperature by heat transfer. Other examples of auxiliary or additional components include, but are not limited to, pressure relief valves designed to relieve internal pressure of any vessels and avoid or at least reduce the likelihood of vessel rupture and thermal expansion tanks that are suitable for maintaining a desired operating pressure. The size and capacity of the thermal expansion tank will depend on factors including, but not limited to, the total volume of water, the operating temperature, and pressure of the reservoir system.

In accordance with further embodiments of the invention, the treatment system can comprise at least two vessels or two zones in one or more vessels, each of which can be, at least partially, fluidly isolated from the other. For example, the treatment system can comprise two vessels fluidly connected to a point of entry and to one or more treatment devices. The two vessels can be fluidly isolated from each other by conduits and valves so that a first vessel can be placed in service with one or more treatment devices while a second vessel can be removed from service for, for example, maintenance or cleaning.

In accordance with one or more embodiments of the present invention, the reservoir system is connected in or in thermal communication with the heat exchanger and, optionally, to a fluid treatment device. The fluid treatment device can be an electrodeionization device, a reverse osmosis device, an ion-exchange resin bed, an electrodialysis device, a capacitive deionization device, or combinations thereof.

Accordingly, in accordance with one or more embodiment, the water treatment system stores water from point of entry 18, which is typically connected to a water source and typically at a pressure that is above atmospheric pressure, in a first zone of reservoir system 12. Reservoir system 12 can be fluidly connected to a water distribution system that supplies treated water to point of use 18. Water treatment system 10 can have an electrochemical device such as an electrodeionization device 16 that purifies or treats water from point of entry 14 by removing at least a portion of any undesirable species to produce treated water that is introduced into reservoir system 12 in a second zone of reservoir system 12. First and second zones of reservoir system 12 can be monitored by at least one water quality sensor, more preferably, a set of water quality sensors connected to controller 22, which, in turn, can adjust an operating parameter of the electrochemical device. In this way, controller 22 can monitor the first and second zones of reservoir system 12 and regulate the operation of the electrochemical device depending on any of the properties measured by a sensor or a set of sensors 20, which measures the water properties of the water in the first and second zones. As used herein, the term "zone" refers to a volume, typically a volume of liquid in the reservoir system. For example, a reservoir system can have one container or vessel having two or more zones defined as portions of the vessel containing corresponding volumes. However, in accordance with some embodiments of invention, the reservoir system can have two or more zones wherein each zone is defined by a corresponding, separate vessel.

In accordance with another embodiment of the present invention, controller 22, through sensor or set of sensors 20 or combinations thereof, can monitor or measure at least one water property of the water in the first and second zones of reservoir system 12 and also measure a flow rate flowing into at least one point of use 18 and can adjust an operating parameter of electrodeionization device 16 based on the measured properties. Thus, in one or more embodiments of the present invention, sensor 20 measures at least one property of at least one of the water from the point of entry and the treated water. For example, when an increased flow rate is measured to point of use 18, controller 22 can adjust an operating parameter, such as an applied voltage or current, of electrodeionization device 16 to treat water to compensate for any additional demand flowing into point of use 18. In another embodiment, controller 22 can adjust an operating parameter of electrodeionization device 16 depending on the volume in the first and second zones of reservoir system 12 and the historical demand, e.g. water demand, required by point of use 18.

In accordance with another embodiment of the present invention, reservoir system 12 has partitions that separate treated water from untreated water or mixtures of treated water with untreated water. Controller 22, through measurement sensors 20 and valves 32, can control the flow of treated, raw, or mixed water to a particular point of use, depending on specific needs of that point of use. For example, if point of use 18 requires softened water, then controller 22 can open one or more valves 32 in the water distribution system so that only treated water is provided to point of use 18. If point of use 18 does not require softened water, then controller 22 would isolate treated water in reservoir system 12 and allow raw water to flow through the water distribution system to point of use 18 by opening the appropriate valves.

In accordance with another embodiment of the present invention, reservoir system 12 is capable of isolating purified or treated water from raw water into zones by use of techniques or structures such as partitions or baffles or by utilizing separate vessels, which may be isolated from each other. In this way, controller 22 can control one or more valves 32 so that raw water can be introduced into electrodeionization device 16 and treated water from the electrodeionization device can be transferred to the zone or vessel of treated water. Moreover, controller 22 can supply water to point of use 18 depending on the requirements of point of use 18 in a similar fashion as described above. Thus, in another embodiment of the invention, the fluid volumes of the first and second zones can be adjusted depending on several factors including, for example, the demand by a point of use, the operating efficiency of the electrodeionization device and the water property of the water in the zones. The system can also comprise aeration devices, which can introduce a gas, such as air, and ventilation devices, to effect dissolution of air and/or to volatilize or purge undesirable species, such as compounds that can affect the taste of water. Any unit operation that permits mass transfer to and from the fluid, such as water, can be utilized in accordance with the techniques of the present invention. Examples of aerating device include, but are not limited to bubblers and perforated tubes or lines submerged in fluid to be aerated, such as treated water or water from a point of use. In accordance with another example, aeration can be performed by exposing the fluid to be aerated in an open air channel.

In operation, reservoir system 12 is typically connected downstream of point of entry 14 and fluidly connected in-line, such as in a circulation loop, with electrodeionization device 16. For example, water from point of entry 14 can flow into inlet 62 and can mix with the bulk water contained within reservoir system 12. Bulk water can exit reservoir system 12 through outlet 64 and can be directed to point of use 18 or through pump 30 into electrodeionization device 16 for treatment or removal of any undesirable species. Treated water leaving electrodeionization device 16 can mix with water from point of entry 14 and enter reservoir system 12 through inlet 62. In this way, a loop can be formed between reservoir system 12 and electrodeionization device 16 and feed water from point of entry 14 can replenish water demand created by and flowing to point of use 18.

In accordance with another embodiment of the present invention, treatment system 10 can include a circulation line that fluidly connects at least one outlet of electrodeionization device 16. For example, the circulation line may connect to a manifold outlet (not shown), which collects liquid exiting a compartments, typically similar service compartments, in particular, depleting or concentrating compartments. The circulation line can also be connected to an inlet of electrodeionization device 16 through, as illustrated in FIG. 1, pump 20*b* and valves 22*a* and 22*b*.

Point of entry 14 provides or connects water from a water source to the water treatment system. The water source can be a potable water source, such as municipal water source or well water or it can be a non-potable water source, such as a brackish or salt-water source. In some instances, an intermediate treatment or treatment system typically purifies the water for human consumption before it reaches point of entry 14. The water typically contains dissolved salts or ionic or ionizable species including sodium, chloride, chlorine, calcium ions, magnesium ions, carbonates, sulfates or other insoluble or semi-soluble species or dissolved gases, such as silica and carbon dioxide. Moreover, the water can contain additives, such as fluoride, chlorate, and bromate species. For example, point of entry 14 may be the point of entry for an industrial, commercial, or household setting.

In accordance with another embodiment of the present invention, treatment system 10 includes a fluid distribution system (not shown), which in turn connects to a point of use. The distribution system can comprise components that are fluidly connected to provide, for example, water, typically treated water, from reservoir system 12 to point of use 18. The distribution system can comprise any arrangement of pipes, valves, tees, pumps and manifolds to provide water from reservoir system 12 to one or several points of use 18 or to any component of treatment system 10. In one embodiment, the distribution system comprises a household or residential water distribution system including, but not limited to, connections to one or more points of use such, but not limited to, a sink faucet, a showerhead, a washing machine, and a dishwasher. For example, system 10 may be connected to the cold or hot, or both, water distribution system of a household.

Point of use 18 is typically any device or appliance that requires or demands water. For example, point of use 18 can be an appliance, such as a washing machine or a dishwasher, or can be a faucet serving to provide water to a kitchen sink or a showerhead. In another embodiment, point of use 18 comprises a system for providing water suitable for household or residential use.

In accordance with another embodiment of the present invention, water treatment system 10 also comprises a sensor, such as a water property sensor, which measures at least one physical property in treatment system 10. For example, sensor 20 can be a device that can measure water conductivity, pH, temperature, pressure, composition or flow rate. Sensor 20 can be installed or positioned within treatment system 10 to measure a particularly preferred water property. For example, sensor 20 can be a water conductivity sensor installed in reservoir system 12 so that sensor 20 measures the conductivity of the water, which can provide an indication of the quality of the water available for service in point of use 18. In another embodiment, sensor 20 can comprise a series or a set of sensors in any various configurations or arrangements in treatment system 10. The set of sensors can be constructed, arranged or connected to controller 22 so that controller 22 can monitor, intermittently or continuously, the quality of water in, for example, reservoir system 12. In such an arrangement, the performance of treatment system 10 can be optimized as described below. Other embodiments may comprise a combination of sets of sensors in various locations throughout treatment system 10. For example, sensor 20 can be a flow sensor measuring a flow rate to a point of use 18 and can further include any of a pH meter, a nephelometer, a composition analyzer, a temperature sensor, and a pressure sensor monitoring the operating condition of treatment system 10.

In accordance with another embodiment of the present invention, water treatment system 10 can further comprise a pretreatment system 28 designed to remove a portion of any undesirable species from the water before the water is introduced to, for example, reservoir system 12 or the electrodeionization device 16. Examples of pretreatment systems include, but are not limited to, reverse osmosis devices, which are typically used to desalinate brackish or salt water. A carbon or charcoal filter may be used to remove at least a portion of any chlorine, including active chlorine, or any species that may foul or interfere with the operation of electrodeionization device 16. Pretreatment system 28 can be positioned anywhere within water treatment system 10. For example, pretreatment system 28 can be positioned upstream of reservoir system 12 or downstream of system 12 but upstream of electrodeionization device 16 so that at least some chlorine species are retained in reservoir system 12 but are removed before water enters electrodeionization device 16.

In accordance with further embodiments of the present invention, disinfecting and/or cleaning apparatus or systems may be utilized with the treatment system. Such disinfecting or cleaning system can comprise any apparatus that destroys or renders inactive, at least partially, any microorganisms, such as bacteria, that can accumulate in any component of the treatment system. Examples of such cleaning or disinfecting systems include those that can introduce a disinfectant or disinfecting chemical compounds, such as halogens, halogen-donors, acids or bases, as well as systems that expose wetted components of the treatment system to hot water at a temperature capable of sanitization. In accordance with still further embodiments, of the present invention, the treatment system can include final stage or post treatment systems or subsystems that provide final purification of the fluid prior to delivery at a point of use. Examples of such post treatment systems include, but are not limited to those that expose the fluid to actinic radiation or ultraviolet radiation, and/or ozone or remove undesirable compounds by microfiltration or ultrafiltration. Thus, in accordance with one or more embodiments of the present invention, the treatment system may be utilized for household service and installed, for example, under a sink and provide treated water, which is treated by exposure to ultraviolet radiation, before being delivered to a point of use, such as a faucet.

In accordance with further embodiments of the invention, the treatment system can comprise systems and techniques that permit disinfection of any component of the treatment system. For example, the treatment system can be exposed to a disinfecting solution or a disinfectant. The disinfectant can be any material that can destroy or at least renders inactive a portion of any microorganisms, such as bacteria, present in any component or subsystem of the treatment system. Examples of a disinfectant can include any base, acid, or sanitizer, such as a halogen or halogen-donating compounds, peroxygen or peroxygen-donating compounds that destroy or render bacteria inactive. The disinfectant can be introduced into the treatment system by any suitable device or technique. For example, the disinfectant can be introduced into a water treatment system by introducing chlorine into the reservoir system. Introducing chlorine can be performed by injection of a hypochlorate species from a disinfectant reservoir fluidly connectable to any suitable portion of the treatment system. The chlorinated water can be further circulated through at least a portion of the treatment system thereby exposing wetted portions of the system to the disinfectant.

In accordance with other embodiments of the present invention, treatment system 10 can further comprise a controller 22 that is capable of monitoring and regulating the operating conditions of treatment system 10 and its components. Controller 22 typically comprises a microprocessor-based device, such as a programmable logic controller (PLC) or a distributed control system that receives or sends input and output signals to components of treatment system 10. In one embodiment, controller 22 can comprise a PLC that sends a signal to power source 24, which supplies power to electrodeionization device 16 or can provide a signal to a motor control center that provides power to pumps 30. In certain embodiments, controller 22 regulates the operating conditions of water treatment system 10 in open-loop or closed-loop control scheme. For example, controller 22, in open-loop control, can provide signals to the water treatment system such that water is treated without measuring any operating condition. Controller 22 can control the operating conditions in closed-loop control so that operating parameters can be adjusted depending on an operating condition measured by, for example, sensor 20. In yet another embodiment, controller 22 can further comprise a communication system such as a remote communication device for transmitting or sending the measured operating condition or operating parameter to a remote station.

In accordance with another embodiment of the present invention, controller 22 can provide a signal that actuates a valve 32 in treatment system 10 so that fluid flow in treatment system 10 is adjusted based on a variety of parameters including, but not limited to, the quality of water from point of entry 14, the quality of water to point of use 18, the demand or quantity of water to point of use 18, the operating efficiency or capacity of electrodeionization device 16, or any of a variety of operating conditions, such as the water conductivity, pH, turbidity, composition, temperature, pressure and flow rate. In one embodiment, controller 22 receives signals from sensor 20 so that controller 22 is capable of monitoring the operating parameters of treatment system 10. For example, sensor 20 can be a water conductivity sensor positioned within reservoir system 12 so that the water conductivity in reservoir system 12 is monitored by controller 22. Controller 22 can, based on, for example, the water quality measured by sensor 20, control power source 24, which provides an electric field to electrodeionization device 16. In operation, controller 22 can increase, decrease, or otherwise adjust the voltage and current or both supplied from power source 24 to electrodeionization device 16. Controller 22 typically includes algorithms that can change an operating parameter of treatment system 10 based on one or more measured properties of the liquid flowing in the system. Thus, in some embodiments of the present invention, controller 22 can increase or decrease or otherwise adjust the period between operating cycles of electrodeionization device 16, such as, but not limited to, cycles of reversing applied electric field and the associated fluid flow.

In another embodiment of the present invention, controller 22 may reverse the direction of the applied field from power source 24 to electrodeionization device 16 according to a predetermined schedule or according to an operating condition, such as the water quality or any other operating parameter measured by sensor 20. For example, controller 22 can be configured to reverse the polarity of the electric field applied to electrodeionization device 16 when a measured parameter reaches a set point. In another embodiment, the present invention provides a controller that is capable of increasing, decreasing or otherwise adjusting a cycle time based on, for example, the measured water properties, such as but not limited to, total dissolved solids, water quality, including conductivity. The cycle can include the period between reversals of the electric field, along with the associated changes, reversals, or substitution of fluid flows within electrodeionization device 16. Polarity reversal, which has been described by, for example, Giuffrida et al., in U.S. Pat. No. 4,956,071, and which is incorporated herein by reference in its entirety, is considered to be within the scope of the present invention. Controller 22 may be configured or configurable by programming or may be self-adjusting such that it is capable of maximizing any of the service life and the efficiency of or reducing the operating cost of water treatment system 10. For example, controller 22 can comprise a microprocessor having user-selectable set points or self-adjusting set points that adjusts the applied voltage and current or both to electrodeionization device 16, the flow rate through the ion-concentrating and ion-depleting compartments of the electrodeionization device or the flow rate to discharge to drain 26 from the electrodeionization device or the pretreatment system or both.

Controller 22 can be configured or configurable by programming or can be self-adjusting such that it is capable of maximizing, for example, any of the service life and the efficiency of or reducing the operating cost of treatment system 10. For example, controller 22 can comprise a microprocessor having user-selectable set points or self-adjusting set points that adjusts the applied voltage and current to electrodeionization device 16, the flow rate through the concentrating and depleting compartments of the electrodeionization device or the discharge flow rate to drain 26 from the electrodeionization device or the pretreatment system or both. Other modifications and equivalents of the controller, as part of the water treatment system disclosed, will occur to persons skilled in the art using no more than routine experimentation. For example, the use of adaptive, self-adjusting, or self-diagnosing controllers capable of changing the operating parameters based on a variety of input parameters such as rate of water use or time of water use, are believed to be within the scope and spirit of the invention.

In accordance with another embodiment of the present invention, controller 22 can calculate a control parameter that can be used to adjust or vary a control signal to a component of the water treatment system. In another embodiment of the present invention, controller 22 may be programmed to be capable of adjusting a change in a cycle of electrodeionization device 16. For example, controller 22 may control the period between plurality reversal of an applied electric field across the electrodeionization device based on a measured water property such as, but not limited to, the conductivity of the water being delivered to the point of use. In another embodiment, controller 22 can calculate a Langelier Saturation Index (LSI) of the water in reservoir system 12 and adjust an operating parameter of the system 10 based on the difference between the calculated LSI and a set point. LSI can be calculated according to, for example, ASTM D 3739. Thus, in one embodiment, the treatment system can treat a liquid to produce treated liquid, for example, treated water having a low LSI of less than about 2, preferably less than about 1 and more preferably less than about zero. In other cases, the treatment system can produce liquid that has a low conductivity of less than about 300 μS/cm, preferably less than about 220 μS/cm and more preferably, less than about 200 μS/cm.

Controller 22 can incorporate dead band control to reduce the likelihood of unstable on/off control or chattering. Dead band refers to the range of signal outputs that a sensor provides without necessarily triggering a responsive control signal. The dead band may reside, in some cases, intrinsically in the sensor or may be programmed as part of the control system, or both. Dead band control can avoid unnecessary intermittent operation by smoothing out measurement excursions. Such control techniques can prolong the operating life or mean time before failure of the components of treatment system 10. Other techniques that can be used include the use of voting, time-smoothing, or time-averaging measurements or combinations thereof.

In another embodiment of the present invention, controller 22 can be configured to regulate the applied electric field produced by the power supply such that the applied voltage and the applied current is maintained at a level that does not or at least minimizes water splitting in electrochemical device 16. Thus, for example, controller 22 can be configured to regulate the power supply to produce an applied voltage and current below the limiting current density based on, among other factors, the flow rate and conductivity of the water to be treated, the size, shape and configuration of the ion exchange compartments, the size, shape, arrangement and composition of the electrodes and the type and arrangement of the ion exchange resin used. Accordingly, according to some embodiments of the invention, the applied electric field can be regulated to be maintained at below the limiting current density by, for example, constructing the electrochemical device with pre-selected components in conjunction with the controller and a power supply. For example, the power supply may be configured to have a maximum voltage or current, which, in combination with the ion exchange compartment size and shape, the electrode composition, size and shape and the type of ion exchange resin, would not create conditions that split water.

In another embodiment of the present invention, reservoir system 12 can have partitions that can separate treated water from untreated water or mixtures of treated water with untreated water. Controller 22, through measurement sensors 20 and valves 32, can control the flow of treated, raw or mixed water to a particular point of use, depending on specific needs of that point of use. For example, if point of use 18 requires softened water, then controller 22 would open valves 32 in the water distribution system so that only treated water is provided to point of use 18. Or, if point of use 18 does not require softened water, then controller 22 would isolate the treated water in reservoir system 12 and allow raw water to flow through the water distribution system to point of use 18 by opening the appropriate valves.

In another embodiment of the present invention, reservoir system 12 has zones of predominantly treated water that can be isolated from zones of predominantly raw water by the use of partitions or baffles or by the use of separate vessels. In such arrangements, controller 22 can control valves 32 so that raw water is introduced into electrochemical device 16 and treated water from the electrochemical device can be transferred to the appropriate zone or vessel.

In accordance with another embodiment of the present invention, discharge water, typical from waste stream 58, to auxiliary use can serve or provide additional or secondary benefits. For example, waste stream 58, rather than going to drain 26, may be used to provide, for example, irrigating water to any residential, commercial, or industrial use, such as for irrigating, for recycling or for recovery of collected or concentrated salts. In yet another embodiment, the treatment system includes a mixing system that is fluidly connected to at least one of the distribution system and the reservoir system. The mixing or blending system can include a fluid connection in the distribution system as well as a fluid connection to the point of entry. The mixing system can provide fluid mixing of, for example, untreated water with treated water to produce service water that can be used at the point of use. The mixing system can include at least one a tee and a mixing tank, or both, that fluidly connects an outlet of the reservoir system and the point of entry. The mixing system, in some cases, can include a valve that regulates the flow of any of the untreated water stream and the treated water stream flowing to the point of use. In another embodiment, the valve can be a proportional valve that mixes the treated water with untreated water according to a predetermined ratio. In another embodiment, the valve can be actuated by the controller depending on any of the flow rate, the water property and the particular service associated with the point of use. For example, if a low hardness water is required by the point of use, then the controller can regulate the amount of untreated water, if any, that can be mixed with treated water by actuating a valve, which regulates the flow rate of the untreated water, in closed-loop control with a sensor measuring the conductivity of the mixed water stream. In another embodiment, the valve can regulate the flow rate of the treated water that would be mixed with the untreated water according to the requirements of the point of use. In another embodiment, the treatment device can be operated to reach a setpoint that is lower than any required by various points of use so that any mixing of treated water with untreated water can produce service water that satisfies the particular requirements of each point of use. Those of ordinary skill should recognize that the present the treatment system can be adjustable to accommodate fluctuations in demand as well as variations in water quality requirements. For example, the present invention can provide a water treatment system that can produce low LSI water, which would be available to the system as a whole, during extended idle periods. The low LSI water, in some embodiments, can be used to flush the wetted components of the treatment system, which can reduce the likelihood of scaling and should increase the service life of the components, individually, as well as the treatment system as a whole. In accordance with some embodiments, the present invention provides a system for producing treated liquids, such as water, having a low conductivity. The treatment system can comprise a fluid circuit that can provide treated or, in some cases, softened water or, in other cases, low conductivity water or low LSI water, to an electrode compartment of the treatment device such as an electrodeionization device. The fluid circuit can comprise fluid connections from a treated water source to the electrode compartments of the electrodeionization device. The fluid circuit can also comprise a pretreatment unit, such as a carbon filter that can remove any species, such as chlorine, which can interfere with the operation of the electrodeionization device. The fluid circuit can also include fluid connections to at least one of the depleting and the concentrating compartments of the electrodeionization device, for example, downstream of the pretreatment unit. The fluid circuit connections, in accordance with one or more embodiments of the present invention provides connections so that fluid exiting the electrode compartments can be, for example, mixed together or mixed with fluid to be treated in the depleting compartment. The fluid circuit can also comprise pumps and valves that can direct fluid flow to and from the electrodeionization device as well as to and from the reservoir system. In some cases, the fluid circuit is arranged to provide fluid connections that creates parallel flow paths through the electrode compartments of the electrodeionization device. Other arrangements and configurations are considered to be within the scope of the present invention including, for example, serial flow paths from one electrode compartment to the other, the use of single, multiple or dedicated pretreatment units as well as multiple or staged treatment units including, but not limited to, reverse osmosis, ion exchange and electrodeionization devices, or combinations thereof, in the fluid circuit.

The treatment system can comprise a fluid circuit that provides fluid connections from a depleting compartment to at least one electrode compartment of the electrodeionization device. Such an arrangement can provide treated water, preferably water having low LSI or low conductivity, or both, to the electrode compartment. The fluid circuit can be arranged so that the fluid flow paths can be in series or in parallel through the electrode compartments. The fluid circuit can also comprise fluid connections to allow the fluid that would exit the electrode compartment to be delivered to a point of use via, for example, a water distribution system, or to a reservoir system, or to both. In some arrangements, the fluid circuit can comprise fluid connections so that untreated fluid can be mixed with fluid that would exit any of electrode compartments; the mixture can be delivered to the point of use. In another embodiment, the fluid circuit can further comprise fluid connections to and from a reservoir system so that, for example, treated fluid that would exit the depleting compartment can be transferred to the reservoir system and mixed with untreated fluid from the point of entry and the mixture can be delivered to the point of use and, optionally, to the electrode compartments of the electrodeionization device in parallel or series flow paths.

In accordance with one or more embodiments of the present invention, the water treatment system stores water from point of entry 14, which is typically connected to a water source at a pressure above atmospheric pressure in a first zone of reservoir system 12. Reservoir system 12 is typically fluidly connected to a water distribution system that transfers treated water to point of use 18. Water treatment system 18 can also have an electrodeionization device 16 that purifies water from point of entry 14 by removing at least a portion of any undesirable species to produce treated water that is introduced into reservoir system 12 in a second zone of reservoir system 12. First and second zones of reservoir system 12 are monitored by at least one water quality sensor, more preferably, a set of water quality sensors connected to controller 22, which, in turn, adjusts an operating parameter of electrodeionization device 16. In this way, controller 22 can monitor the first and second zones of reservoir system 12 and regulate the operation of electrodeionization device 16 depending on any of the properties measured by a sensor or a set of sensors 20, which measures the water properties of the water in the first and second zones.

In yet another embodiment of the present invention, controller 22, through sensor or set of sensors 20, can monitor and/or measure a water property of the water in the first and second zones of reservoir system 12 and also monitor and/or measure a flow rate flowing into at least one point of use 18 and adjust an operating parameter of electrodeionization device 16 based on the measured properties. For example, when an increased flow rate is measured or determined to point of use 18, controller 22 can adjust an operating parameter of electrodeionization device 16 to treat water to compensate for additional demand flowing into point of use 18. In other cases, controller 22 can adjust an operating parameter of electrodeionization device 16 depending on the volume in the first and second zones of reservoir system 12 and a historical demand required by point of use 18. The historical demand of a point of use can be determined by monitoring the usage at such point of use of over a period of time.

In accordance with another embodiment of the present invention, controller 22 regulates the operation of the water treatment system by incorporating adaptive or predictive algorithms, which are capable of monitoring demand and water quality and adjusting the operation of the electrodeionization device, such as increasing or decreasing the applied voltage or the period between electric field reversals of electrodeionization device 16. For example, controller 22 may be predictive in anticipating higher demand for treated water during early morning hours in a residential application to supply point of use 18 serving as a showerhead.

In accordance with another embodiment of the present invention, electrodeionization device 16 includes a compartment that can accumulate hydrogen ions while treating water. The hydrogen ions can be generated, in one embodiment, when an electric field is applied that can create a polarization phenomenon so that water flowing within the compartment is, at least partially, dissociated into hydrogen and hydroxyl ions. Under the proper operating conditions, water splitting can be effected by applying an electric field so that a current can pass through the electrodeionization device at a level that is above the limiting current density.

Typically, operating voltages above about 1.5 volts per cell pair can effect water polarization. However, other factors may influence the limiting current density including, for example, the type of anion and cation exchange membranes, the type of ion exchange resins, the resin bed depth and the interfacial chemical makeup of the resins and the membranes as explained by Ganzi et al. in *Electrodeionization: Theory and Practice of Continuous Electrodeionization*, Ultrapure Water®, July/August 1997 pp. 64-69 and by Simons, R. in *Electric Field Effects on Proton Transfer Between Ionizable Groups and Water Ion Exchange Membranes*, Electrochimica Acta, vol. 29, no. 2, pp. 151-158 (1984), which are incorporated herein by reference in their entireties.

Water splitting has been discussed by, for example, Zang et al., in U.S. Pat. No. 3,165,460, Batchelder et al., in U.S. Pat. No. 5,503,729, Denoncourt et al., in U.S. Pat. No. 5,593,563, Ganzi et al., in U.S. Pat. No. 5,858,915, Batchelder et al., in U.S. Pat. No. 5,679,228, Goldstein et al., in U.S. Pat. No. 5,679,229, Su et al., in U.S. Pat. No. 5,837,124 and Mir, in U.S. Pat. No. 6,187,162, each of which are incorporated herein by reference in their entireties. In another embodiment, the present invention provides an electrodeionization device wherein, under an applied electric field, the limiting current density is applied only in the specific compartments so that water is split only in such compartments.

In accordance with another embodiment, the present invention provides an electrodeionization device comprising an ion-trapping (trapping) compartment. The trapping compartment can comprise selectively permeable membranes that preferentially allow specific ions to pass therethrough. The membrane can be an anion-selective membrane and the trapping compartment can be bounded by anion-selective membranes on both sides thereof. In another embodiment of the present invention, the trapping compartment further comprises electroactive media disposed with the region of the trapping compartment between anion-selective membranes. The electroactive media can be ion-exchange resin that can ionically bind a free ionic species. The ionic species can be positively-charged or negatively-charged and the resin can have a bound, charged species that attractively binds the free ionic species. The electroactive media can be anion exchange resin or cation exchange resin or a mixture thereof. If cation exchange resin predominates in the electroactive media, then there should higher relative retention, by ionic binding for example, of positively-charged cationic species. If anion-selective membranes surround the electroactive media that is predominantly cation exchange resin, then the migration of positively-charged cations is further inhibited. This should result in a higher relative concentration of retained cations in such a trapping compartment compared to negatively-charged anionic species. Thus, in one embodiment of the present invention, electrodeionization device 16 is operated to split water to hydrogen and hydroxyl ions in a compartment that comprises electroactive media that is predominantly comprised of cation-exchange resin and bounded by anion-selective membranes. In certain embodiments of the present invention, the trapping compartments have adjacent collecting compartments. Such collecting compartments can collect the migrating anionic species that can migrate from the trapping compartment. The collecting compartment similarly can have electroactive media, which can be anion exchange resin, cation exchange resin, or mixtures thereof.

In another embodiment of the present invention, treatment system 10 comprises a flow regulator 32a for regulating the flow of a discharge or waste stream to drain 26. Flow regulator 32a can adjust the amount or volume of the waste stream that flows to drain 26. In another aspect of the embodiment, flow regulator 32a is capable of creating a pulsating flow to drain 26 and can comprise any of a valve or an orifice plate or a combination thereof. In another embodiment of the invention, because flow regulator 32a is typically fluidly disposed downstream in the treatment system, the pulsating flow can create a pressure wave or front that can propagate throughout or a portion of the treatment system 10. In another aspect of one embodiment, the pressure wave is sufficient to dislodge any solids, precipitated material or gases trapped or accumulated in treatment system 10 so that the material or gas can be carried through and discharged to drain 26 or released through a vent (not shown) of treatment system 10.

According to another embodiment of the present invention, the flow regulator is a valve that can be intermittently opened and closed according to a predetermined schedule for a predetermined period of time to allow a predetermined volume to flow. The amount or volume of fluid flowing to drain can be adjusted or changed by, for example, changing the frequency the flow regulator is opened and closed or by changing the duration during which the flow regulator is open or closed. In one embodiment, the flow regulator can be controlled or regulated by controller 22 through, for example, an actuation signal. Thus, in one embodiment of the invention, controller 22 provides an actuation signal, such as a radio, current or a pneumatic signal, to an actuator, with, for example, a motor or diaphragm, that opens and closes the flow regulator.

Figure 3:
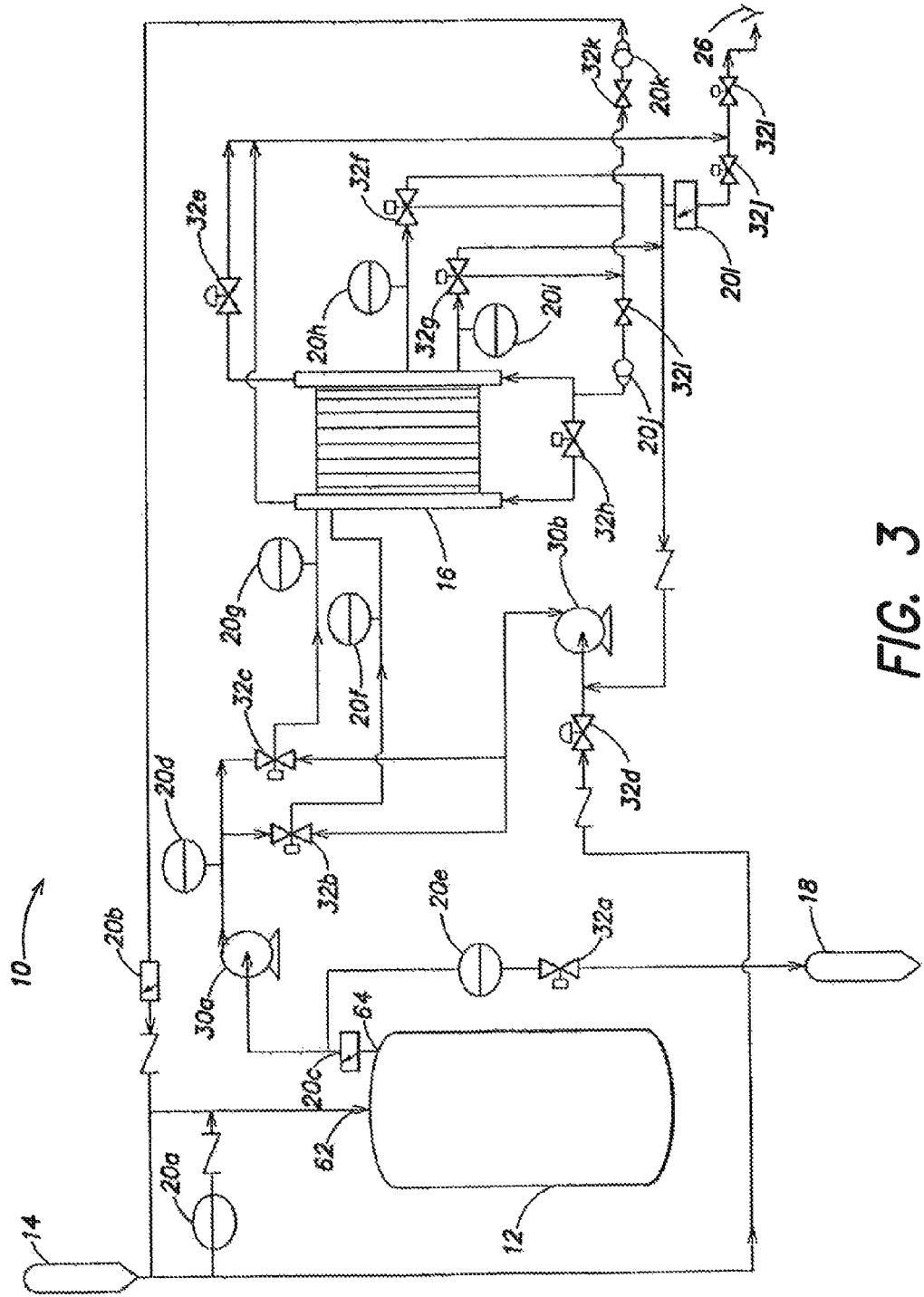
FIG. 3 is a schematic flow diagram of a water treatment system in accordance with one or more embodiments of the invention.

The fluid regulated by valve or flow regulator 32a can be any fluid in any stream to be discharged to waste such as waste stream 58 or a waste stream from a pretreatment device. Thus, in one embodiment, if the treatment system comprises a pretreatment system with a reverse osmosis apparatus, then the waste stream can include the discharge fluid from the electrodeionization device and the discharge fluid from the reverse osmosis apparatus. In yet another aspect of the present invention, with reference to FIG. 2, waste stream 58 can include any of the fluid from electrode compartments 38 and 40 or concentrating compartment 36 of the electrodeionization device. It can be seen that the fluid from electrode compartments or the concentrating compartments may be directly sent to drain 26 or may be recirculated, before discharge, to the electrode compartments, the concentrating compartment or both. In this way, the overall efficiency of the treatment system can be increased while decreasing operating costs because of less total discharge. In yet another embodiment, the present invention provides for adjusting an operating parameter, for example, the rate of discharge to drain or the period during discharge, as a function of at least one measured parameter such as the system operating pressure. For example, the period during which valve 32l, in FIG. 3, is actuated open to discharge can be adjusted based on the measured pressure of the liquid supplied to point of use 18. In some cases, the flow regulator may be actuated open to reduce the measured pressure or it may be actuated to a minimum, depending on the type of valve, when the measured pressure is below a predetermined value. Such a secondary control scheme can be incorporated or nested within any of the existing control loops actuating the flow regulator.

In accordance with one or more embodiments of the present invention, the flow regulator comprises a valve that is a fast-opening valve with minimal or no pressure drop therethrough. Examples of suitable valves include, but are limited to, diaphragm valves as well as ball, gate and butterfly valves, which are available from, for example, Bürkert USA (Irvine, Calif.) and South Bend Controls, Inc. (South Bend, Ind.). Other valves that can be used include pinch or flex valves or any valve that can shed or dislodge any precipitated scales during activation.

In another embodiment of the present invention, the flow regulator can serve as part of a pressure control loop as well as in part of a concentrate discharge control loop. For example, the flow regulator can be actuated by controller 22 when the measured conductivity of the concentrate stream reaches the set point. A separate pressure control loop can be juxtaposed to relieve pressure in system 10. In any of the above-mentioned control schemes, the control loops can incorporate feedback as well as any of proportional, derivative, integral or, preferably, a combination thereof.

In another embodiment, the flow regulator can have an applied electrical charge flowing therethrough. The applied charge is, in one embodiment, a voltage or a current that is sufficient to generate ionic species around the flow regulator. And, in a preferred embodiment, the applied charge is sufficient to generate positively-charged ionic species. In yet another embodiment, the applied charge creates ionic species that lowers the pH of the fluid surrounding the flow regulator. Thus, in one aspect of one embodiment, the applied charge is sufficient to generate positively-charged hydrogen ions. Preferably, the applied charge generates sufficient hydrogen ions that, in effect, changes the pH to less than about 7, preferably, to less than about 6, and more preferably, to less than about 5. Thus, according another aspect of one embodiment of the present invention, the flow regulator is any of a valve or a plate with a flow orifice or a combination thereof that can have an applied charge that generates sufficient ionic species to reduce the pH of the surrounding fluid. The flow regulator can be made from any suitable material that can tolerate prolonged water exposure. Examples of such materials include, but are not limited to, stainless steels, plastics, conductive composites like graphite.

In yet another aspect of one embodiment of the present invention, the charge is applied periodically or applied depending an operating condition of the treatment system. For example, the charge can be applied charge can be applied according to a predetermined periodic schedule or, the applied charge can be applied when an operating parameter, such as any of the water conductivity, the pressure drop across the electrodeionization device, the water pH, the change voltage or current on the electrodeionization device or any combination thereof.

In another embodiment of the present invention, water, typical from waste stream 58, to auxiliary use can serve or provide additional or secondary benefits. For example, waste stream 58, rather than going to drain 26, may be used to provide irrigating water to any residential, commercial, or industrial use, such as for irrigating, for recycling or for recovery of collected or concentrated salts.

Often, quality drinking water is associated with highly purified water. However, as long as the water is free of microbial contamination, the best drinking water may not necessarily be the most chemically pure. For example, water that has been purified to a high resistivity, for example, greater than about 1 megaOhm, may be so devoid of ionic content that it becomes "hungry" and corrosive to material such as copper, that may be used in water piping systems. Taste may also be affected by, for instance, the removal of bicarbonate species. Furthermore, beneficial or desirable chemicals that have been added to the water, for example, fluoride and chlorine species, may be removed along with undesirable species, resulting in a water that may need to be re-fortified.

If a household is supplied with hard water, i.e., water containing greater than about 60 ppm calcium carbonate, it is often treated prior to use by being passed through a water softener. Typically, the water softener is of the rechargeable ion exchange type and is charged with cation resin in the sodium form and anion resin in the chloride form. As water passes through the resin bed, major contributors to hardness, such as calcium and magnesium species, are exchanged for sodium. In this manner, the water can be softened as the concentration of divalent cations and, in particular, calcium and magnesium ions, decreases.

However, an equivalent of sodium is added to the treated water for every equivalent of calcium that is removed. Thus, although the water is softened, the hardness is replaced with sodium ions that some consumers may find undesirable. Furthermore, when these ion exchange beds are recharged by rinsing with sodium chloride solution, the resulting brine must be disposed of and is often discharged to a septic system where the brine becomes available to re-enter the ground water. In some jurisdictions, discharge of brine to a domestic septic system is regulated or prohibited.

Other methods of softening water include the use of reverse osmosis devices that can supply high purity water, but generally do so at a slow rate and require the use of a high pressure pump. Furthermore, many reverse osmosis membranes can be fouled by the presence of dissolved materials such as silica, which may often be found in well water.

Although the examples described herein use electrodeionization devices, other water treatment techniques, such as capacitive deionization, may be just as applicable.

Continuous electrodeionization can also be used to remove hardness components from a water supply. However, most CEDI systems have power, space and service requirements that make them impractical for domestic use. In addition, because chlorine may be undesirable in the presence of ion exchange resins, if a chlorinated water supply is to be softened, the chlorine often should first be removed from the water. This means that any water treated in this manner does not benefit from the residual bactericidal properties of the chlorinated water supply.

Frequently, CEDI systems are designed to remove as many ions as possible, and easily ionizable species such as calcium and sodium are efficiently removed so that less than 1% of the cations present in the feed water remains in the treated water. For many industrial and commercial uses, this highly purified water may be beneficial, however, this level of purity may be undesirable for a household water supply in which some level of cation content may be beneficial. Furthermore, this highly purified water may be corrosive and may be prone to attack copper pipes that are often present in domestic water distribution systems. Some domestic water distribution systems may include lead soldered joints, and heavy metals, such as lead, may also leach into water passing through the pipes.

In some jurisdictions, minimum levels of calcium may be necessary in order to comply with health and safety regulations. Thus, a high purity system that removes greater than, for example, 90% or 99% of the calcium from the water supply may be inappropriate in these locations.

The present invention in accordance with one or more embodiments, can utilize CEDI technology to produce purified or treated water with properties that may be ideal water for domestic consumption. For example, the apparatus can soften a hard or very hard water supply, yet retain some level of calcium, at a level below about 60 ppm calcium carbonate. In addition, chlorine can be retained in the water so that if the water, after treatment, is stored for any length of time, it retains at least some of its bactericidal qualities. Bicarbonate species may also be retained at levels that provide better tasting water. Fluoride may also be retained so that additional fluoride supplements may be unnecessary. In addition, compounds such as silica, boron and other less ionizable species may also be retained at desirable levels greater than other CEDI methods. By retaining some of these trace materials, such as boron and silica, the properties of the treated water may be improved over water which has had a greater amount of these materials removed. In some embodiments of the present invention, at least 80% or 90% of these compounds can be retained while more than 25%, 30% or 50% of hardness contributing compounds, such as calcium, are removed. In addition, the invention provides for the addition of hydrogen ($H_2$) to the water, which may contribute to reducing the corrosivity of the treated water. The addition of hydrogen to the water may manifest itself by a detectable increase in dissolved hydrogen or a resulting decrease in the concentration of oxidative species. This may provide for desirable anti-oxidant properties as well. The pH, if altered at all, is generally close to that of the supply water and thus will not have deleterious effects on equipment or systems that are designed to use un-softened tap water at approximately neutral pH.

The apparatus of the invention, while having a relatively small foot print and using less energy than many CEDI, or other, treatment systems, still can supply quantities of treated or softened water that satisfy peak domestic demand situations. It may be able to supply softened water continuously, as no recharging cycle is required and a reserve of treated water may be formed.

Furthermore, the method and apparatus of the present invention may provide treated water without increasing the ionic load discharged from the treatment system. Conventional chemical treatment systems may require recharging with, for example, sodium chloride, that in turn is substituted for hardness species that are removed from the water. This means that both the hardness species and the substituted species are present in either the softened water or in discharged brine. This may add to the ionic load of waste water discharged from the home and may result in, for example, harm to ground water. Some embodiments of the present invention, however, may discharge only that ionic material that enters the home via the feed water. Furthermore, the total amount of waste water discharged as a result of the softening process may be significantly less than that with conventionally softened waters, for example, less than 10% or 5% of the volume of water treated.

When demand for water exists downstream of the storage device, water exits through outlet 64, passes by pressure sensor 20B and enters either conduit 96, conduit 98 or both depending on the demand source. Conduit 98 leads past pressure sensor 20d and valves 32a and 32b to service point 18. Service point 18 may be fluidly connected to a plumbing system or may be selectively joined to a specific point of use, such as appliance or bath.

Water that passes through conduit 96 may enter either conduit 52 or conduit 54, or both. In one configuration, water entering conduit 52 is directed by valve 32c to conduit 70 and pump 30a. After passing through conduit 72 and optional pretreatment device 28a which may be, for example, a carbon filter, particulate filter, or aeration device, the water is directed to conduit 60 at which point it enters electrodeionization module 100. Water entering via conduit 60 is purified by passing through one or more ion-depleting (depleting) compartments and may also pass through an electrode compartment, for example, the cathode compartment.

By plumbing the depleting compartments (where treated, product water is produced) either upstream or downstream of the cathode compartment, the system can be grounded via the cathode. This may be particularly advantageous in a household setting, as it may reduce safety hazards for the consumer. Furthermore, hydrogen gas that may be formed at the cathode can be dissolved into the product water passing through, resulting in a product water that may be less corrosive than had the water bypassed the cathode compartment. Product water may feed (or receive water from) the cathode, the anode, or both. If the product water communicates with both electrodes, the system may be plumbed so that the depleting compartments are in series or parallel with the electrode compartments. After exiting electrodeionization module 100 via conduit 62 the purified water may be directed by valve 32e to conduit 92 and pressure reading device 20c. The water then proceeds to tee 22 and is directed to conduit 94 prior to entering storage vessel 12. Thus, storage vessel 12 may include purified water from conduit 92 as well as untreated, or minimally treated, water that is provided from point of entry 14. Storage vessel 12 may be configured so that these two water sources are mixed, or alternatively, that the two water sources are segregated, for example, one of the water sources may enter the bottom of storage vessel 12 and proceed in plug-flow manner upwardly to outlet 64. Performance of electrodeionization module 100 may be improved by pre-treatment that includes the removal of chlorine, a municipally treated water supply may be passed through a chlorine reducing filter such as carbon filter 28a or another pre-treatment device prior to entry into electrodeionization module 100.

Pre-treatment devices may also be placed elsewhere in the loop. Water that enters storage vessel 12 after being treated in electrodeionization module 100 may contain little or no chlorine (or alternative disinfectant) and to retain a residual chlorine level in storage tank 12 the water can be mixed with untreated water from point of entry 14. Preferably, the chlorinated water is added at a rate adequate to result in a mixed water that contains enough chlorine to inhibit bacteriologic activity. Active chlorine refers to those chlorine containing species that exhibit anti-microbial activity. An effective chlorine concentration is defined herein as a concentration of active chlorine compounds, for example, sodium hypochlorite, that inhibits the growth of bacteria, such as e-Coli, in storage vessel 12. Therefore, the ratio at which the feed water and treated water are mixed in storage vessel 12 may be dependent upon a number of factors including the efficiency of electrodeionization device 100, a desired effective chlorine concentration, the rate at which water contained in storage vessel 12 will be depleted, the temperature of storage vessel 12 and the source and quality of the feed water.

If well water or another source of untreated water is used, maintenance of an effective disinfectant level may be disregarded.

While water is being recycled through the purification loop, additional water may be supplied via conduit 54 to valve 32d where it is directed to conduit 88, pump 30b, conduit 90, pretreatment unit 28b and conduit 80 prior to entering electrodeionization module 100. From conduit 80, water may feed one or more ion-concentrating (concentrating) compartments which may also be plumbed in series with the anode compartment. The anode compartment may lie either upstream or downstream of the concentrating compartment. By passing through the anode compartment, the pH of the water can be lowered and may result in water having a lower LSI. The lower LSI, which may be reduced to less than 0 (non-scaling), decreases the scaling potential of the water and thus provides for a lower maintenance, higher water recovery, increased longevity and more reliable system. Concentrate exiting electrodeionization module 100 typically enters conduit 82 and can be directed by valve 32f to conduits 84 and 64 where a portion of the concentrate may be discharged to waste either constantly or intermittently via valve 32g and drain 26. An additional portion of the water may enter conduit 66 and can be recycled to the electrodeionization module 100 via conduit 86 and valve 32d. In this manner, a concentrate solution may accept ions until a specific level is reached, for example, a pre-chosen LSI, so that a minimal amount of water can be discharged while maintaining a non-scaling environment throughout the loop. Water conservation can be improved further by using the concentrate for applications such as irrigation, that do not require softened water.

If a polarity reversal system or technique is used, the previously described loops can be switched so that the purification loop operates as the concentrating loop and the concentrating loop operates as the purification loop. In accordance with one or more embodiments of the invention, when the polarity of the anode and cathode are switched, the function of the concentrating and depleting compartments are also switched and pump 30a, pre-treatment device 28a, conduit 60 and conduit 62, as well as valve 32e each become part of the concentrating loop. Likewise, pump 30b, pre-treatment device 28b, conduits 80 and 82 and valve 32f become part of the purified loop supplying water to storage vessel 12. Thus, not only are the electrodeionization module compartments switched but all of the associated parts such as pre-treatment devices, pumps, valves, gauges and tees possibly excepting valve 32g are alternated between carrying purified water and concentrate water, resulting in decreased opportunity for prolonged scaling and increased opportunity for the dissolution of any scale that may have formed. This has proved particularly advantageous in reducing scaling in components such as valves, orifices, filters or tees. Reverse polarity cycles may be based on a number of factors, including time, source water quality, temperature, purified water quality, desired water quality and water use rates.

In addition to providing for effective levels of chlorine in storage tank 12, the system can be operated to maintain levels of other components such as bicarbonate, fluoride, silica and boron. The electrodeionization module 100 may contain ion exchange material and may be operated at a current and flow rate designed to minimize the removal of some or all of those species. In addition, some of the calcium, magnesium, iron, manganese or other hardness components present in the water may be retained to provide a purified water containing, for example, about 200 ppm, 300 ppm, 400 ppm, or 500 ppm hardness. This may result in a water that is less corrosive, and exhibits better aesthetic qualities than does water which has been reduced to a lower level of hardness. By removing, for example, about 20%, 30%, 40%, 50%, or 60% of the divalent cations in a single pass through the electrodeionization device, the device may require less power and a smaller foot print than would a device designed to more completely remove divalent cations from the water in a single pass.

In yet another embodiment, the present invention provides for adjusting an operating parameter, for example, the rate of discharge to drain 30 or the period during discharge, as a function of at least one measured parameter such as the system operating pressure. For example, the period during which a valve (not shown) is actuated open to drain 30 can be adjusted based on the measured pressure of the liquid supplied to point of use 18. In some cases, the valve may be actuated open to reduce the measured pressure or it may be minimally actuated, depending on the type of valve, when the measured pressure is below a predetermined value. Such a secondary control scheme can be incorporated or nested within any of the existing control loops actuating the valve described above.

The treatment system can comprise a fluid circuit that can provide treated or, in some cases, softened water to an electrode compartment of the electrochemical device. The fluid circuit can comprise fluid connections from a treated water source to the electrode compartments of the electrochemical device. The fluid circuit can also comprise a pretreatment unit, such as a carbon filter that can remove any species, such as chlorine, which can interfere with the operation of the electrochemical device. The fluid circuit can also include fluid connections to at least one of the depleting and the concentrating compartments of, for example, the electrodeionization device, for example, downstream of the pretreatment unit. The fluid circuit connections, in one embodiment of the invention, provides connections so that fluid exiting the electrode compartments can be, for example, mixed together or mixed with fluid to be treated in the depleting compartment. The fluid circuit can also comprise pumps and valves that can direct fluid flow to and from the electrochemical device as well as to and from the reservoir system. In some cases, the fluid circuit is arranged to provide fluid connections that creates parallel flow paths through the electrode compartments of the electrodeionization device. Other arrangements and configurations are considered to be within the scope of the present invention including, for example, serial flow paths from one electrode compartment to the other, the use of single, multiple or dedicated pretreatment units as well as multiple or staged treatment units including, but not limited to, reverse osmosis, ion exchange and electrodeionization devices, or combinations thereof, in the fluid circuit.

The treatment system can comprise a fluid circuit that provides fluid connections from a depleting compartment to at least one electrode compartment of the electrodeionization device. Such an arrangement can provide treated water, preferably water having low LSI, to the electrode compartment. The fluid circuit can be arranged so that the fluid flow paths can be in series or in parallel through the electrode compartments. The fluid circuit can further comprise fluid connections to allow the fluid that would exit the electrode compartment to be delivered to a point of use via, for example, a water distribution system. In some arrangements according to the present invention, the fluid circuit can comprise fluid connections so that untreated fluid can be mixed with fluid that would exit any of electrode compartments; the mixture can be delivered to the point of use. In another embodiment of the invention, the fluid circuit can further comprise fluid connections to and from a reservoir system so that, for example, treated fluid that would exit the depleting compartment can be transferred to the reservoir system and mixed with untreated fluid from the point of entry and the mixture can be delivered to the point of use and, optionally, to the electrode compartments of the electrodeionization device in parallel or series flow paths. Other arrangements and combinations including, for example, the mixing of treated and untreated water to produce a mixed electrode compartment flushing fluid is considered to be within the scope of the present invention.

Other arrangements and combinations including, for example, the mixing of treated and untreated water to produce a mixed electrode compartment flushing fluid is considered to be within the scope of the present invention.

The electrodeionization device can also comprise one or more electrodeionization stages, as described by Ganzi et al., in U.S. Pat. No. 5,316,637, which is incorporated herein by reference in its entirety. In each stage, a stack of depleting and concentrating compartments is positioned between first and second electrodes. According to one embodiment of the invention, each stage of the electrodeionization device includes a plurality compartments, each compartment defined, in part, by exterior membranes at either end thereof. A membrane of at least one compartment can co-extensively contact a membrane of an adjacent compartment; and according to one embodiment, all the compartment in the stack can be arranged adjacent each other with membranes of adjacent compartment in co-extensive contact with each other. Such an arrangement is described by Gallagher et al., in U.S. Pat. No. 5,736,023, which is incorporated herein by reference in its entirety.

Figure 20:
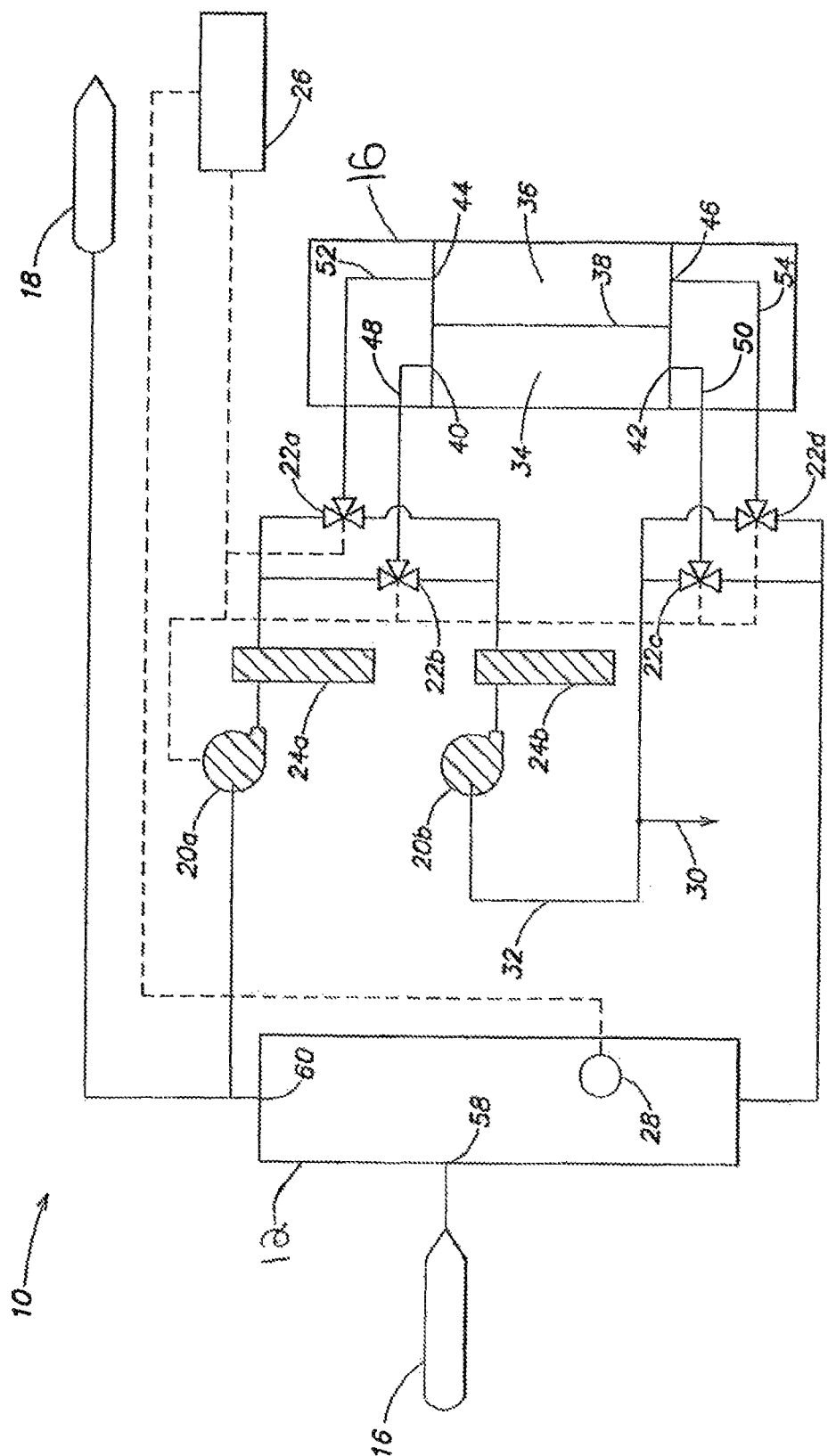
FIG. 20 is a schematic flow diagram of a treatment system showing a reservoir in line with an electrochemical device in accordance with one or more embodiments of the invention.

As illustrated in the embodiment of FIG. 20, electrodeionization device 16 typically includes a first compartment 34 and an adjacent compartment 36, the first and second compartment separated by an ion selective membrane 38 positioned therebetween. According to one embodiment of the invention, first compartment 34 can serve as a depleting compartment and second compartment 36 can serve as a concentrating compartment. Notably, electrodeionization device 16 is schematically illustrated with a single depleting compartment and a single concentrating compartment; it is shown as such for illustration only. Thus, according to one preferred embodiment of the invention, a plurality of depleting compartment and a single concentrating compartments, defining a stage, would be arranged between electrodes of the electrodeionization device.

First compartment 34 can include a first port 40 and a second port 42. Similarly, second compartment 36 can include a first port 44 and a second port 46. In accordance with one embodiment of the present invention, first port 40 and second port 42 can be positioned at opposite ends of first compartment 34 and first port 44 and second port 46 can be positioned at opposite ends of second compartment 36. First ports 40 and 44 may serve as liquid entrances into their respective compartments. Correspondingly, second ports 42 and 46 may serve as liquid exits of their respective compartments.

In accordance with another embodiment of the present invention, electrodeionization device 16 can comprise a plurality of first and second compartments. Each of the first compartments can comprise a first port and a second port. The plurality of first ports can be commonly fluidly connected to a first port manifold 48 and the plurality of second ports can be commonly fluidly connected to a second port manifold 50. Similarly, each of the second compartments can comprise a first port and a second port. The plurality of second compartment first ports can be commonly fluidly connected to a first port manifold 52 and the plurality of second compartment second ports can be commonly fluidly connected to a second port manifold 54.

First compartment 34 and second compartment 36 can be connected to a liquid circuit network having a plurality of fluid pathways or circuits defined by conduits, manifolds and valves. In one embodiment of the invention, shown in FIG. 20, a first liquid circuit can comprise fluid connections from reservoir system 12 to either of first compartment 34 or second compartment 36, through pump 20a, filter 24a, valves 22a and 22b and manifolds 48 and 52. The first fluid circuit can further comprise fluid connections from first compartment 34 and second compartment 36 to reservoir system 12, through manifolds 50 and 54 and valves 22c and 22d. In another embodiment of the invention, treatment system 10 can comprise a second liquid circuit through first compartment 34 or second compartment 36 and circulation line 32. In some cases, the second fluid circuit fluidly can connect circulation line 32 to first compartment 34 or second compartment 36 through pump 20b, filter 24b and any of valves 22a or 22b. The second fluid circuit can further comprise fluid connections through manifolds 48 and 52. Moreover, the second liquid circuit can further comprise fluid connections through manifold 50 or manifold 54 to any of valves 22c and 22d.

As used herein, the term liquid circuit is intended to define a particular connection and arrangement of valves and lines that allows a liquid stream to flow therein.

Other embodiments of the present invention will be described with reference to FIGS. 21A-21D. In the figures, darkened, bold lines represent pathways through which liquid can flow according to the described liquid circuit. For purposes of illustration, the various embodiments of the present invention will be described in terms of water purification. However, it is to be understood that the treatment of any liquid treatable by electrodeionization techniques can benefit for employment of the systems and methods of the present invention.

Figure 21A:
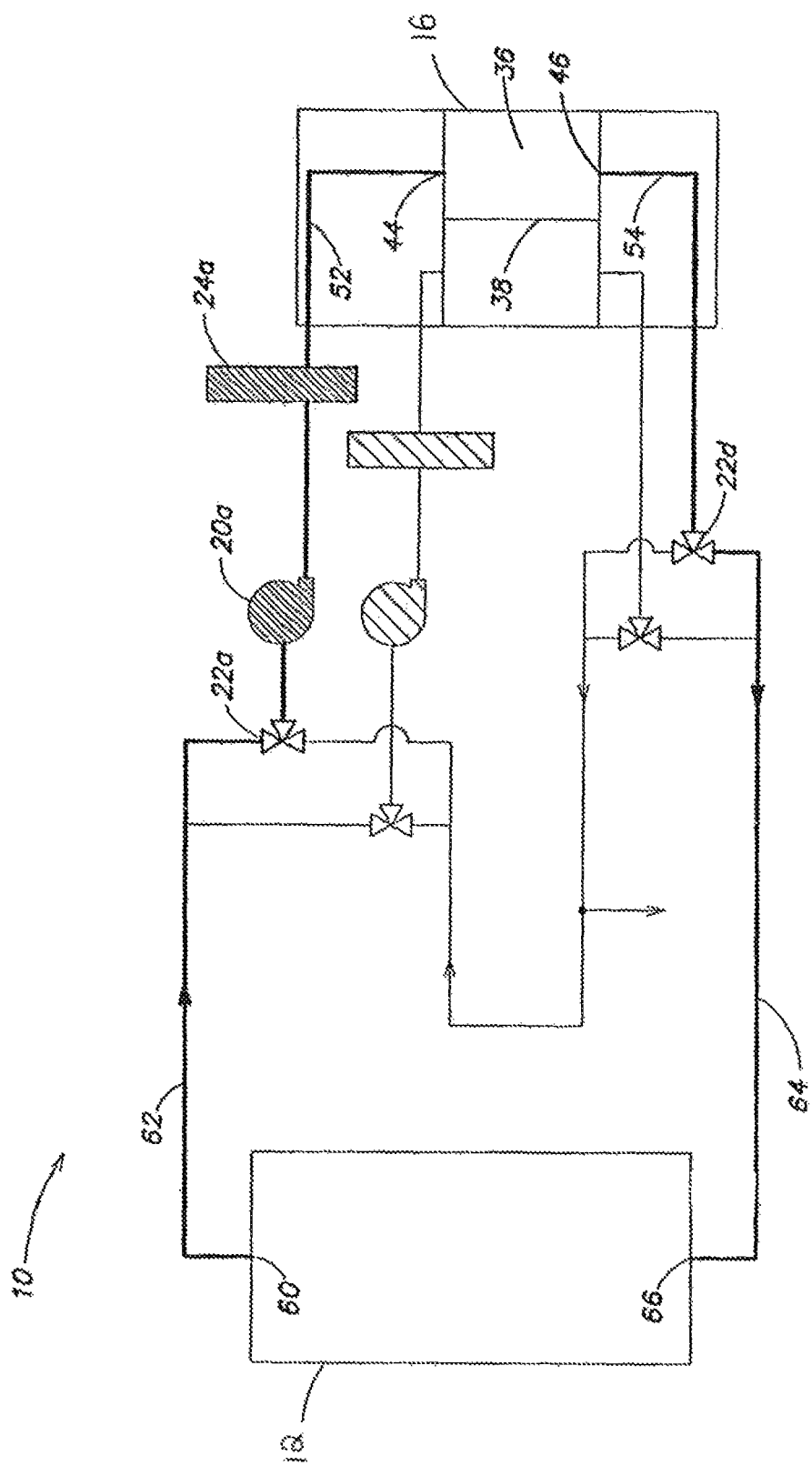
FIG. 21A is a schematic flow diagram for treatment system illustrating a first liquid circuit flowing therein in accordance with one or more embodiments of the invention.
Figure 21B:
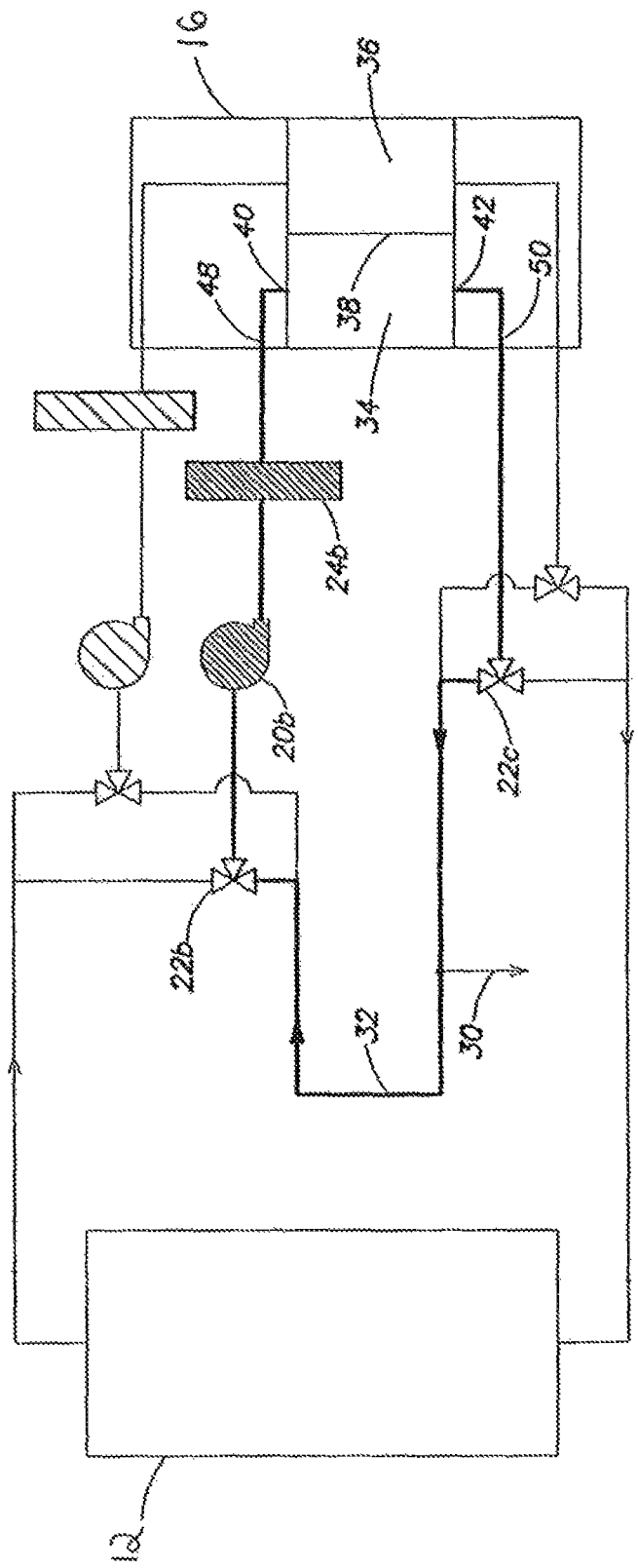
FIG. 21B is a schematic flow diagram of a treatment system illustrating a second fluid circuit flowing therein in accordance with one or more embodiments of the invention.

In FIG. 21A, a first liquid circuit is illustrated in which feed liquid, for example tap water, brackish water or pre-treated semi-pure water can enter treatment system 10 through a point of entry (not shown). Accordingly, in one embodiment of the invention, liquid to be treated can flow in a first liquid circuit from an outlet 60 of reservoir system 12 through conduit 62, valve 22a, pump 20a, optionally through filter 24a and manifold 52 into compartment 36 through port 44. The first liquid circuit can further comprise fluid connections to compartment 36 through port 46 to manifold 54, valve 22d, conduit 64 and to reservoir system 12 through inlet 66. Valves 22a and 22d can be actuated to allow flow through the above described first liquid circuit. Thus, the first liquid circuit can provide liquid to be treated from reservoir system 12 to electrodeionization device 16 and can transfer the treated liquid and store it in reservoir system 12.

The present invention provides a second liquid circuit in treatment system 10. According to one embodiment of the invention, the second liquid circuit can allow a concentrating stream to flow in a closed loop through one compartment of electrodeionization device 16. As illustrated in the schematic diagram of FIG. 21B, the second liquid circuit can comprise a connection to and from circulation line 32 and to and from compartment 34 through valve 22b, pump 20b, optionally through filter 24b, into manifold 48 and can enter compartment 34 through port 40. The second liquid circuit can allow a liquid to exit compartment 34 through port 42 and manifold 50 and return to compartment 34 through circulation line 32 and manifold 48. According to one embodiment of the invention, the concentrating stream flowing in the second liquid circuit can comprise ionic species, which have migrated from compartment 36 through ion selective membrane 38 into compartment 34. In some cases, the concentrating stream flowing in the second liquid circuit may be discharged or transferred to drain 30 according to a predetermined schedule. Transfer to drain 30 may be accomplished by, for example, opening a drain valve (not shown) as necessary.

Figure 21C:
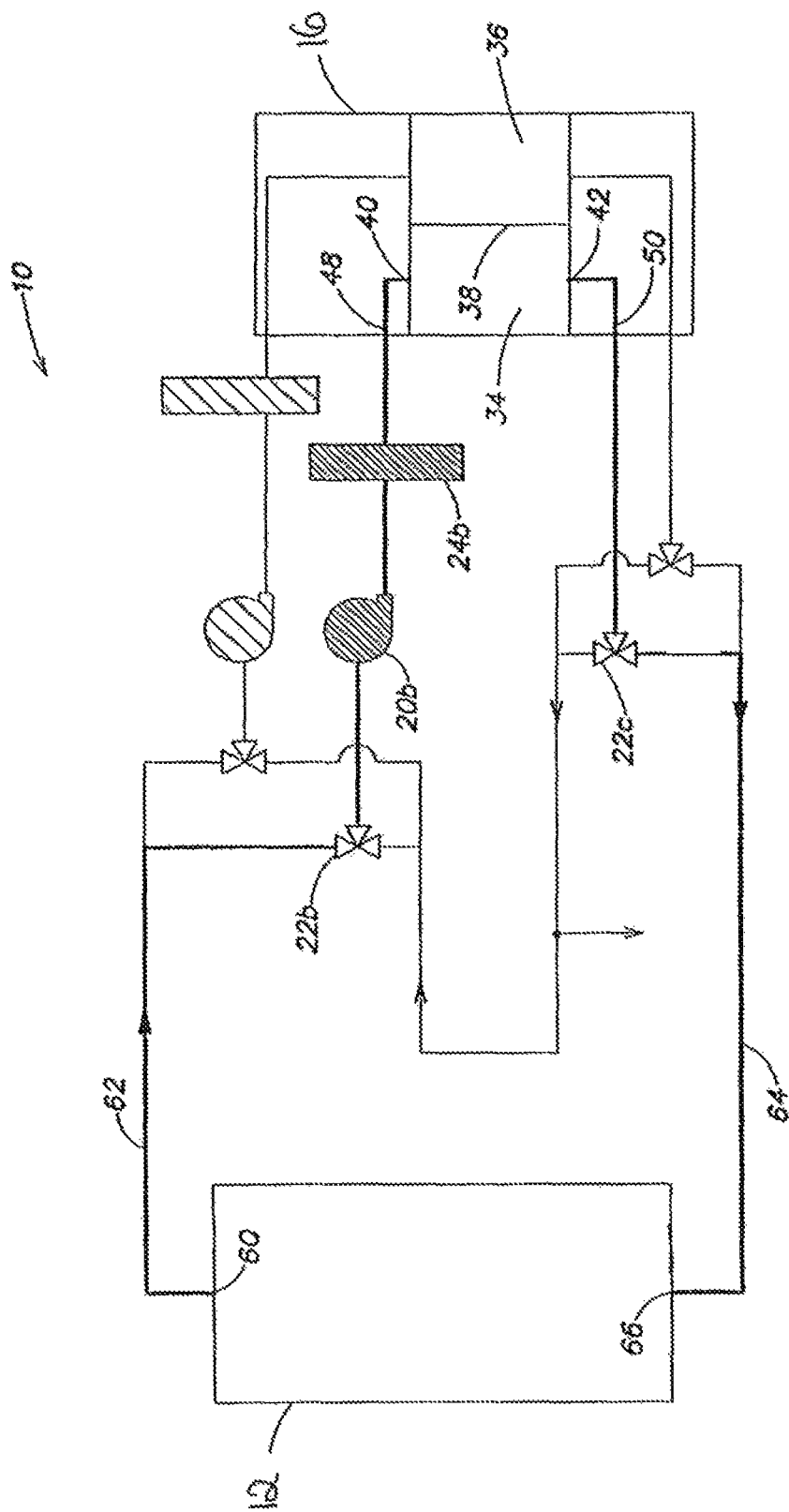
FIG. 21C is a schematic flow diagram of a treatment system illustrating a third fluid circuit flowing therein in accordance with one or more embodiments of the invention.
Figure 21D:
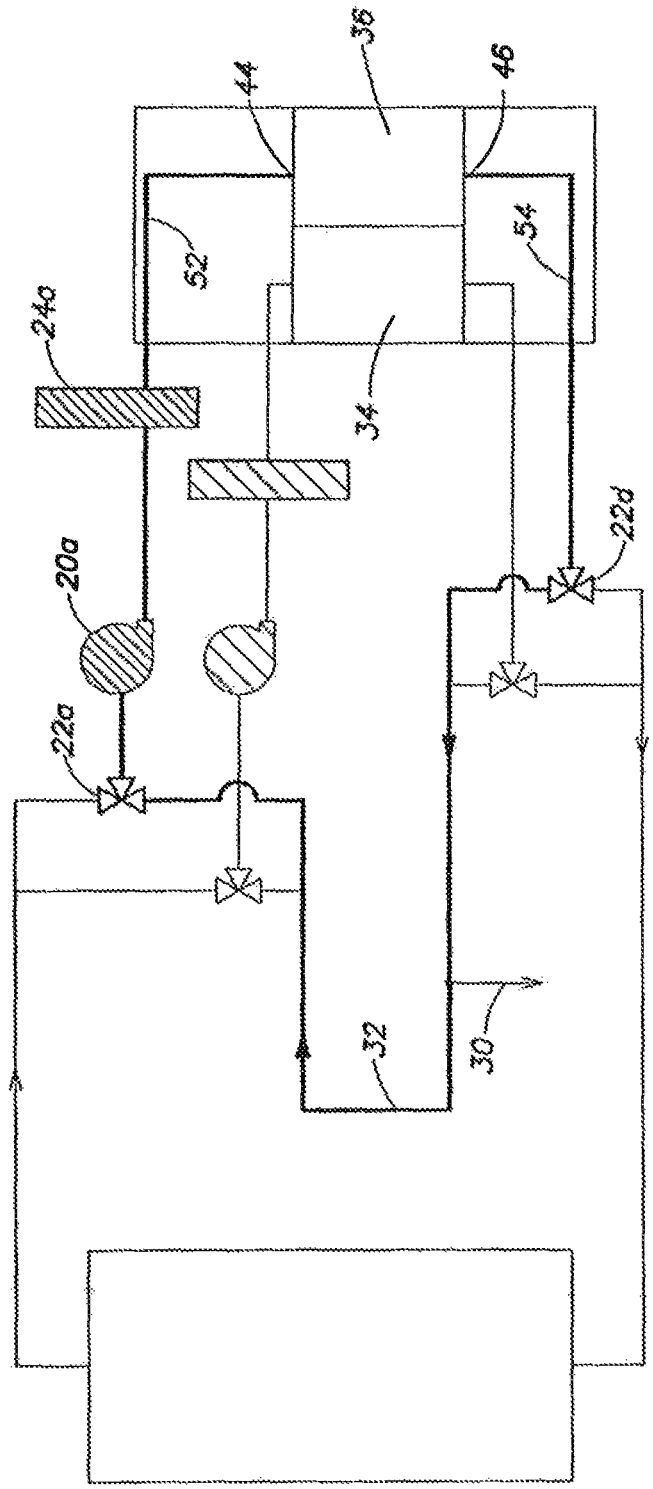
FIG. 21D is a schematic flow diagram of a treatment system illustrating a fourth liquid circuit flowing therein in accordance with one or more embodiments of the invention.

In another embodiment, illustrated in FIG. 21C, the present invention provides a third liquid circuit fluidly connecting reservoir system 12 to compartment 34 of electrodeionization device 16. The third liquid circuit can include connections to and from filter 24b. Typically, the third liquid circuit can comprise connections from outlet 60 of reservoir system 12 to conduit 62 to valve 22b to pump 20b to manifold 48 and to port 40 of compartment 34. The third fluid circuit can further comprise connections from port 42 to manifold 50 to valve 22c to conduit 64 and to inlet 66 of reservoir system 12. In the third liquid circuit, fluids to be treated from reservoir system 12 typically flows into compartment 34. Produced treated water can be transferred to reservoir system 12.

In another embodiment, the present invention can provide a fourth liquid circuit that provides a connection from an outlet of a concentrating compartment further to an inlet of the same concentrating compartment of electrodeionization device 16. As illustrated in the schematic diagram of FIG. 21D, the fourth liquid circuit can connect outlet 46 of compartment 36 to manifold 54 to valve 22d which, in turn, can connect to circulating line 32. The fourth liquid circuit also can provide a connection from circulating line 32 to valve 22a to pump 20a and to port 44 of compartment 36 through manifold 52. This liquid circuit can include a connection to drain 30 so that a concentrating stream that typically flows in the fourth liquid circuit can be discharged.

Figure 22A:
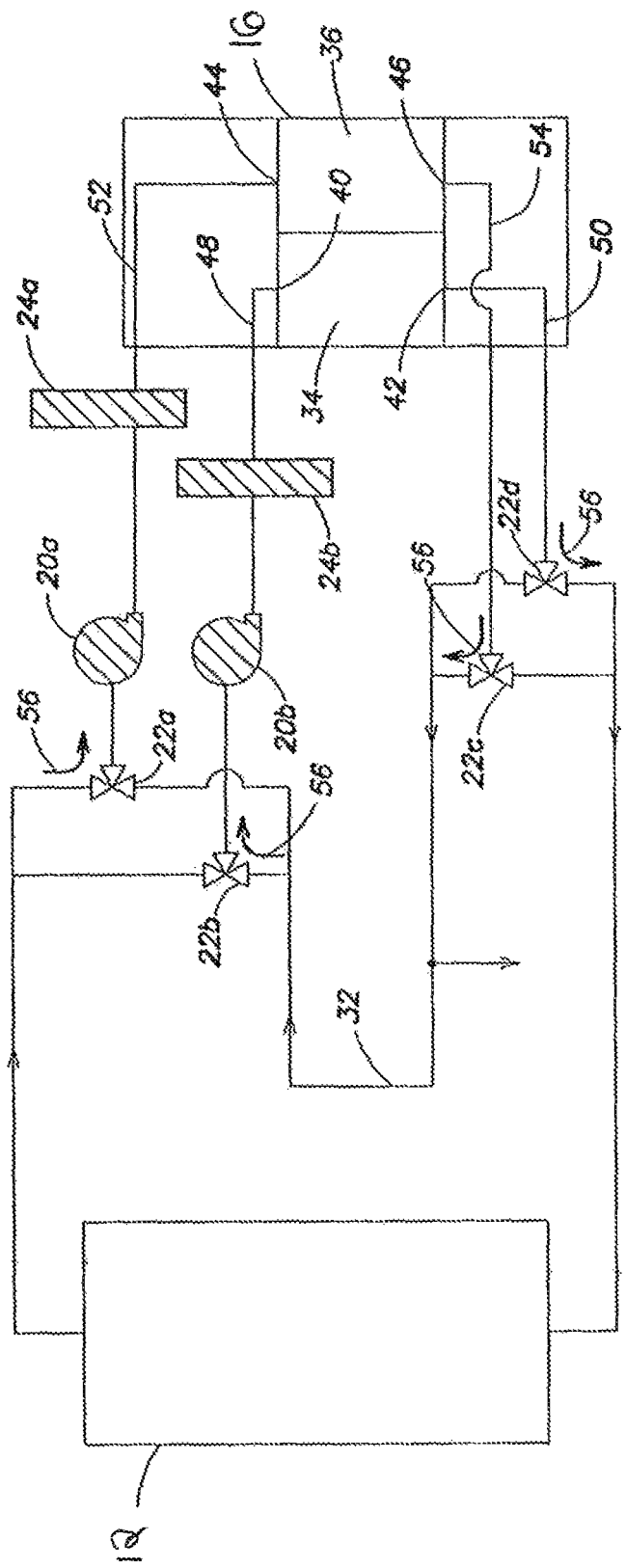
FIG. 22A is a schematic flow diagram of a treatment system illustrating the flow of flushing fluid flowing therein in accordance with one or more embodiments of the invention.

In another embodiment, as illustrated in FIG. 22A, the present invention provides for flushing of electrodeionization device 16 using treated water or at least partially treated water. Flushing of electrodeionization device 16 can be performed by transferring treated water using pumps 20a and 20b through valves 22a and 22b and, optionally, through filters 24a and 24b into compartments 34 and 36. This first flushing circuit can be performed sequentially so that compartment 36 is flushed with treated water before compartment 34 is flushed with the treated water that flows out of compartment 36. The fluid direction arrows 56 show that treated water, from reservoir 12, can be directed by valve 22a to flow through pump 20a to manifold 52 before entering port 44 of compartment 36. In this way, treated water may be used to replace or flush out any liquid accumulated in compartment 36. Continued operation of pump 20a, transferring treated liquid from reservoir 12, can force any liquid upstream of the treated flushing liquid to exit through port 46 and flow into manifold 54, which, eventually, can be redirected by valve 22c into recirculation line 32. Valve 22b can connect circulation line 32 pump 20b, which, in turn, can allow the treated liquid to flow through manifold 48 and enter compartment 34 through port 40. Continued flow of the treated water, by the use of any of pumps 20a and 20b, or optionally, the coordinated use of both pumps, as well as properly oriented valves 22a, 22b, 22c and 22d can allow substantially all or most of the process lines, especially the wetted parts of treatment system 10, to be flushed with treated water from reservoir 12. In some cases, the treated water used to flush electrodeionization device 16 has a low LSI or is sufficiently pure to accommodate and meet the requirements of point of use 18 after being mixed with any liquid having undesirable ionic species. The present invention further provides a flushing system which replaces the liquid contents of electrodeionization device 16 with a liquid having a low LSI and, it is believed, provides inhibition of any scale formation. The liquid can be returned to reservoir system 12. As used herein, low LSI water has a LSI of less than about 2, preferably, less than about 1, and more preferably, less than about zero. In some embodiments, the present invention provides treated liquids, such as water, having a low conductivity. As used herein, a low conductivity liquid has a conductivity of less than about 300 µS/cm, preferably less than about 220 µS/cm and more preferably, less than about 200 µS/cm.

Figure 22B:
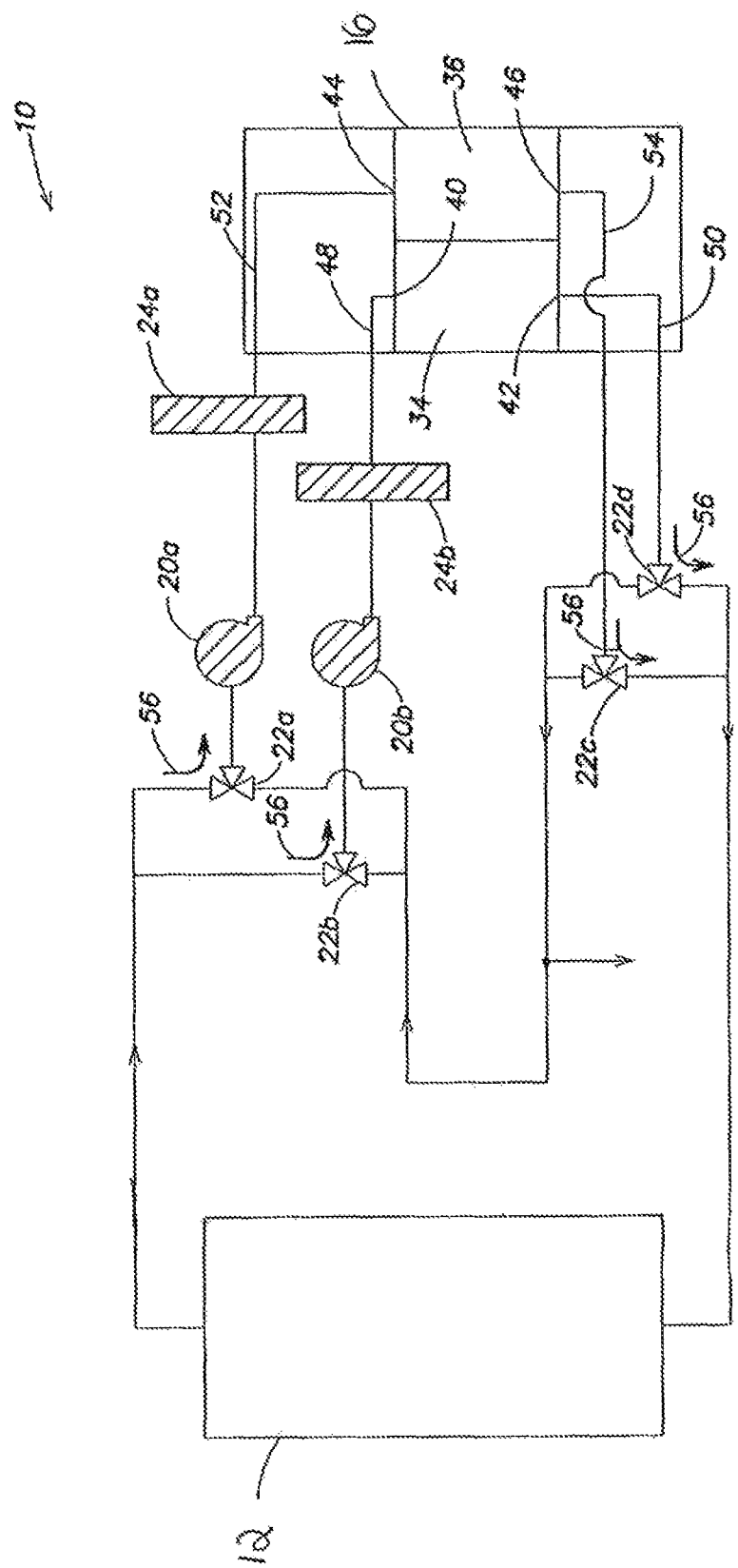
FIG. 22B is a schematic flow diagram of a treatment system illustrating the flow of flushing fluid flowing therein in accordance with one or more embodiments of the invention.
Figure 23:
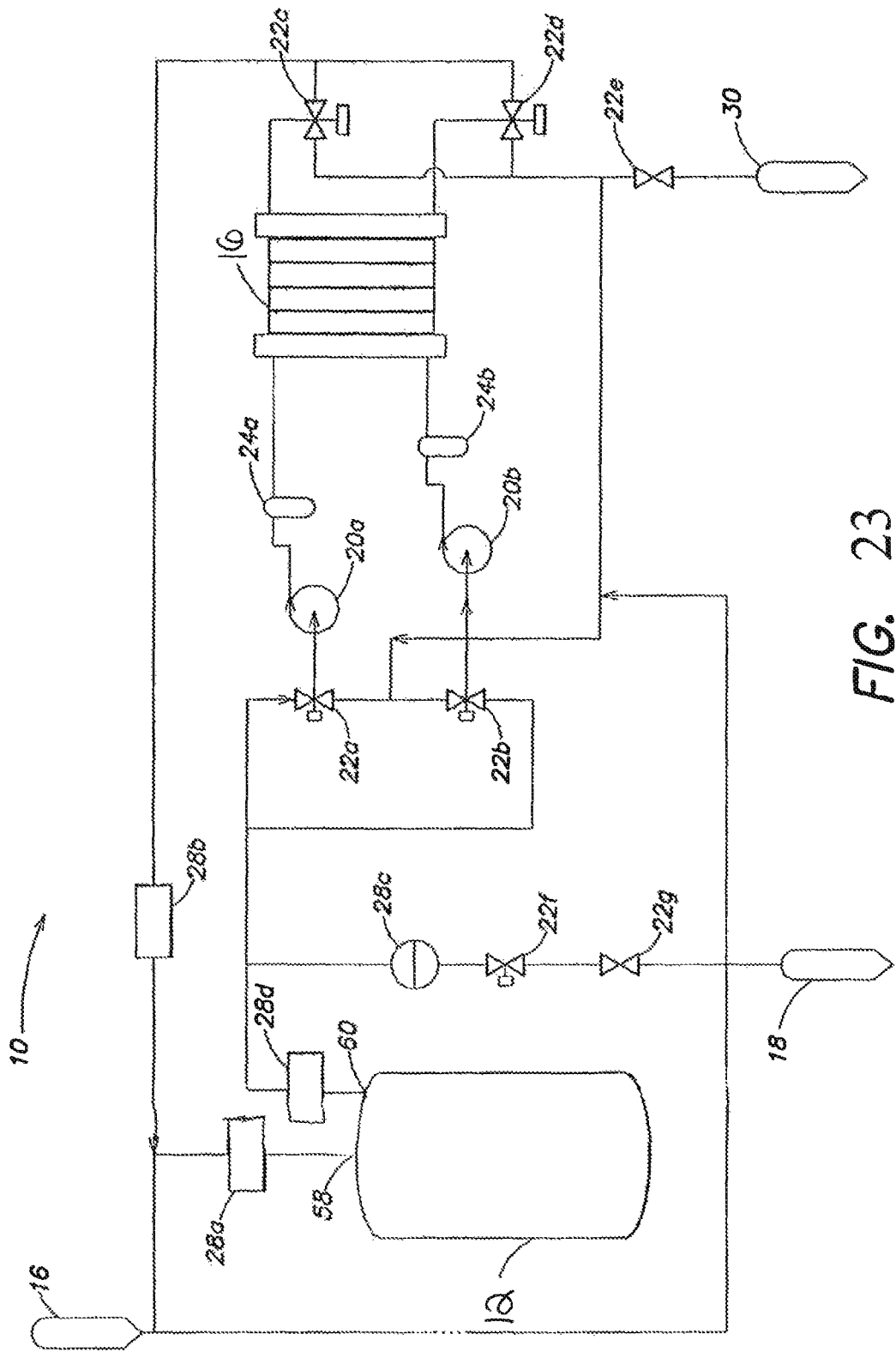
FIG. 23 is a schematic flow diagram of a treatment system according to another embodiment of the present invention.
Figure 24:
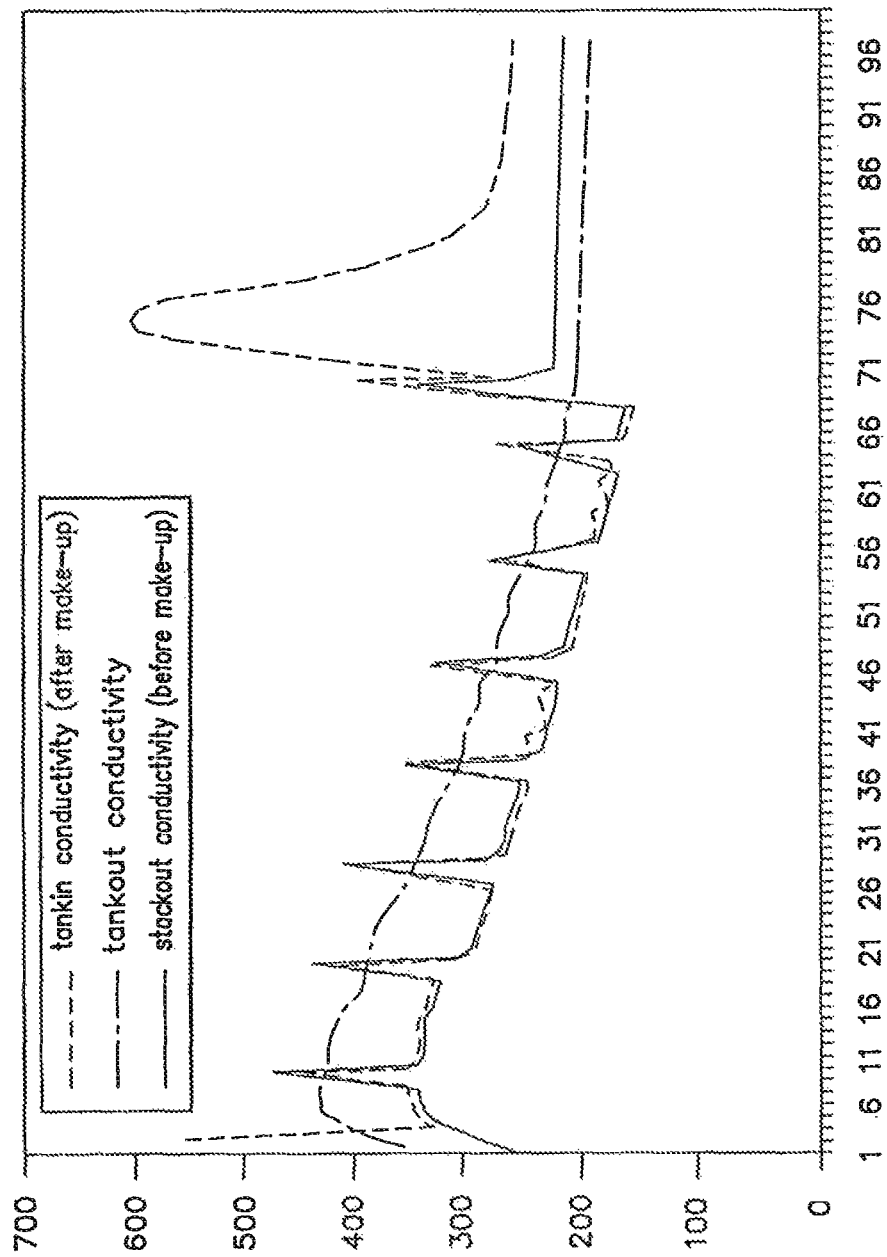
FIG. 24 is a graph showing the measured conductivity of the treatment system in accordance with one or more embodiments of the invention.

In another embodiment, the present invention can provide a second flushing circuit that can replace any liquid having a tendency to scale that may be present in treatment system 10. In the embodiment schematically illustrated in FIG. 22B, liquid, which may be treated water, from reservoir 12 flows in parallel through valves 22a and 22b through pump 20a and 20b into first and second compartments 34 and 36. Treated water can flow into manifolds 48 and 52 and enter the compartments through 40 and 44, respectively. Continued flow of the treated water can displace any liquid that may tend to form scale in compartments 34 and 36. Flushing can be continued by operating pumps 20a and 20b so that treated water can flow out through ports 42 and 46 and into manifold 50 and 54, respectively, and eventually be directed by valves 22c and 22d to return to reservoir 12. In this arrangement or technique, flushing fluid, such as treated water, can replace any liquid that may have accumulated in treatment system 10. As with the earlier described embodiments, the flushing arrangements or techniques can replace any liquid that may tend to form scale with a liquid that has a low LSI or a liquid that has little or no tendency to form scale. Similarly, the flushing liquid may be returned to reservoir system 12.

EXAMPLES

The present invention will be further illustrated through the following examples, which are illustrative in nature and are not intended to limit the scope of the invention.

Example 1

An in-line pressurized water treatment system in accordance with one or more embodiments of the systems and techniques of the present invention, schematically shown in FIG. 3, was evaluated for performance. The water treatment system 10 had an electrodeionization module 16 with a pretreatment system (not shown) and a pressurized storage vessel 12. Water, from point of entry 14, was introduced into pressurized vessel 12 and was circulated through electrodeionization module 16. The water treatment system was controlled by a programmable controller (not shown) based on a measured water conductivity, as measured by sensors 20b and 20c, upstream of an inlet 62 and downstream of an outlet 64 of pressurized vessel 12.

Electrodeionization device 16 comprised of a 10-cell pair stack with 13 inch flow paths. Each cell was filled with about 40% AMBERLITE® SF 120 resin and about 60% AMBERLITE® IRA 458 resin, both available from Rohm & Haas Company, Philadelphia, Pa. The electrodeionization device had an expanded titanium electrode, which was coated with ruthenium oxide. The pretreatment system comprised of an aeration type iron-filter with a 25-micron rating, a 20 inch×4 inch sediment filter, and a 20 inch×4 inch carbon block filter. Pressurized vessel 12 was about a 10 inch diameter fiberglass vessel with about a 17 gallon capacity. The pressurized vessel was fitted with a valve head and a center manifold pipe.

The concentrate stream leaving the electrodeionization device was partially circulated and partially rejected to a drain 26 by regulating valves 32b, 32c, 32e, 32f, 32g, 32h, 32j, and 32l. Make-up water, from point of entry 14, was fed into the circulating stream to compensate for any water that was rejected to drain 26 by actuating valves 32b, 32c, and 32d, in proper sequence. Treated water exited electrodeionization device 16 and was returned to vessel 12 through a return fluid circuit having a liquid conduit and valves 32i and 32k.

The flow rate of treated water to a point of use 18 from outlet 64 of pressurized vessel 12 was regulated by adjusting valve 32a. Several sensors measuring operating conditions and water properties were installed throughout water treatment system 10 including pressure indicators 20d, 20f, 20g, 20h and 20i, flow rate indicators 20a, 20e, 20j and 20k and conductivity sensors 20b, 20c and 20l.

The controller was a MICROLOGIX™ 1000 programmable controller available from Allen-Bradley Company, Inc., Milwaukee, Wis., which was used to control the valve sequencing as well as to monitor and record the operating conditions of the system. The controller fluidly isolated the electrodeionization device when a setpoint was reached. The controller started the electrodeionization device depending on whether a flow switch signal triggered operation or when the water conductivity of the outlet stream leaving the pressurized vessel was higher than the set point. The feed from the electrodeionization device was circulated from the pressurized vessel via a second feed pump. The polarity of the electric field applied to the electrodeionization device was reversed by the controller every 15 minutes.

The water treatment system was operated until a set point was reached. The applied voltage to the electrodeionization device was about 50 volts. The flow rate through the electrodeionization device was maintained at about 2000 mL/min. Tables 1 and 2 summarize the measured properties of the various streams of the water treatment system at the start and end of the test, respectively. Notably, the data presented in Table 1 showed that the initial feed stream into electrodeionization device 16, with a conductivity of about 462 µS/cm, was treated to produce an initial dilute stream having a conductivity of about 374 µS/cm without a substantial pH change. At the end of the run, feed water was treated from a conductivity of about 255 µS/cm to produce a dilute stream with a conductivity of about 158 µS/cm. Notably, the lower conductivity of the feed stream at the end of the test run reflected the effect of circulation, which effectively removed undesirable species over several passes.

TABLE 1

Stream properties at the start of the test run.

| | Feed Stream | Reject Stream | Dilute Stream |
|---|---|---|---|
| pH | 7.23 | 7.51 | 7.41 |
| Conductivity (µS/cm) | 462 | 1394 | 374 |

TABLE 2

Stream properties at the end of the test run.

| | Feed Stream | Reject Stream | Dilute Stream |
|---|---|---|---|
| pH | 6.79 | 7.77 | 6.62 |
| Conductivity (µS/cm) | 255 | 1024 | 158 |

Figure 4:
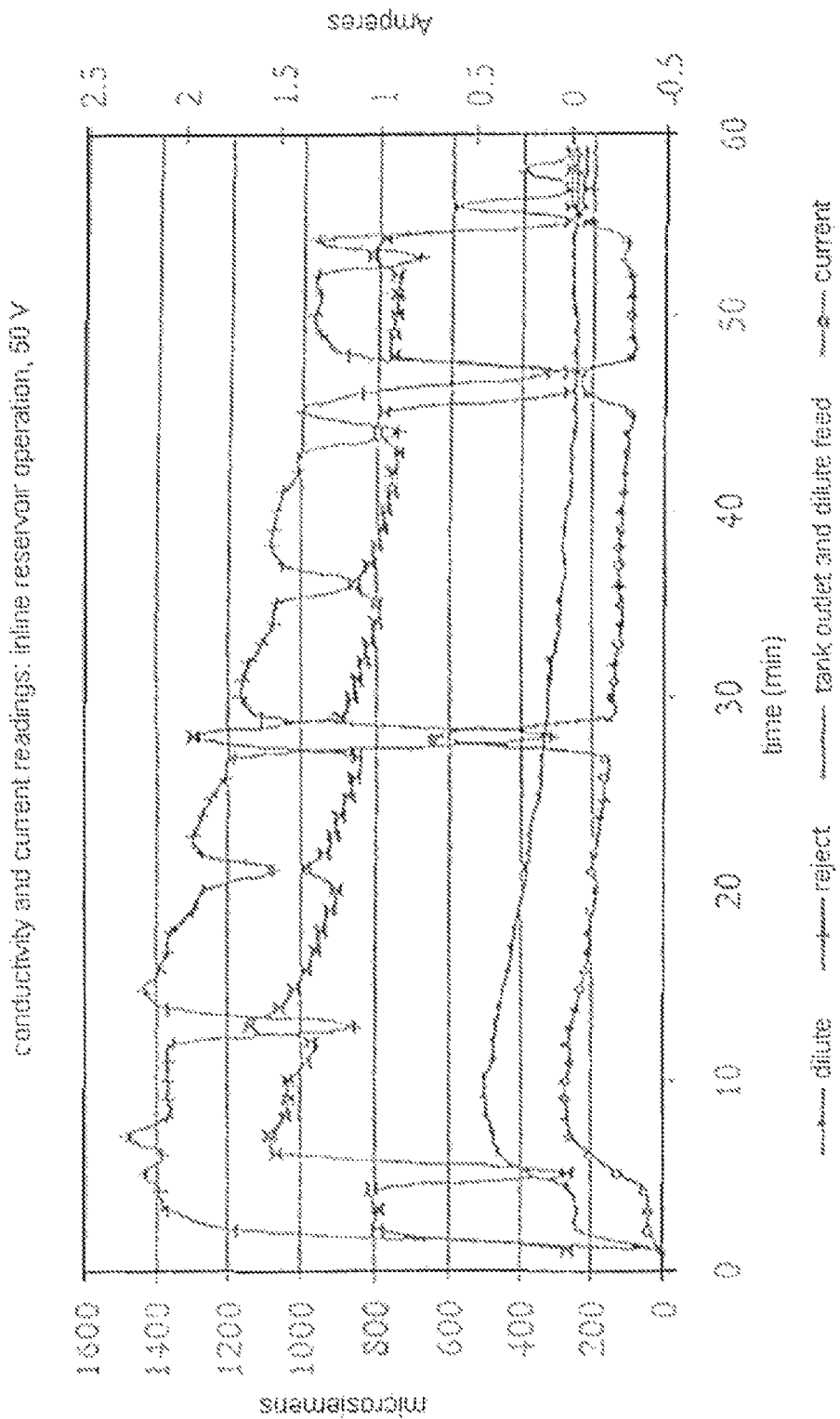
FIG. 4 is a graph showing conductivity of water treated in the water treatment system exemplarily illustrated in FIG. 3.

FIG. 4 shows the conductivity of the water along with the applied current through the electrodeionization device during the test run. The conductivity of the treated water from the electrodeionization device, labeled as dilute, was reduced to less than about 175 µS/cm in less than about 45 minutes. FIG. 4 also shows that the conductivity of the product stream, to service such as a point of use and labeled as tank outlet and dilute feed, was reduced to less than about 300 µS/cm. Furthermore, FIG. 4 shows that the applied current was reduced, as expected, with decreasing concentration of hardness species. Thus, the water treatment system of the present invention reduced the hardness, as measured by conductivity, by about 70% while delivering about 80 gallons per day.

Example 2

Figure 5:
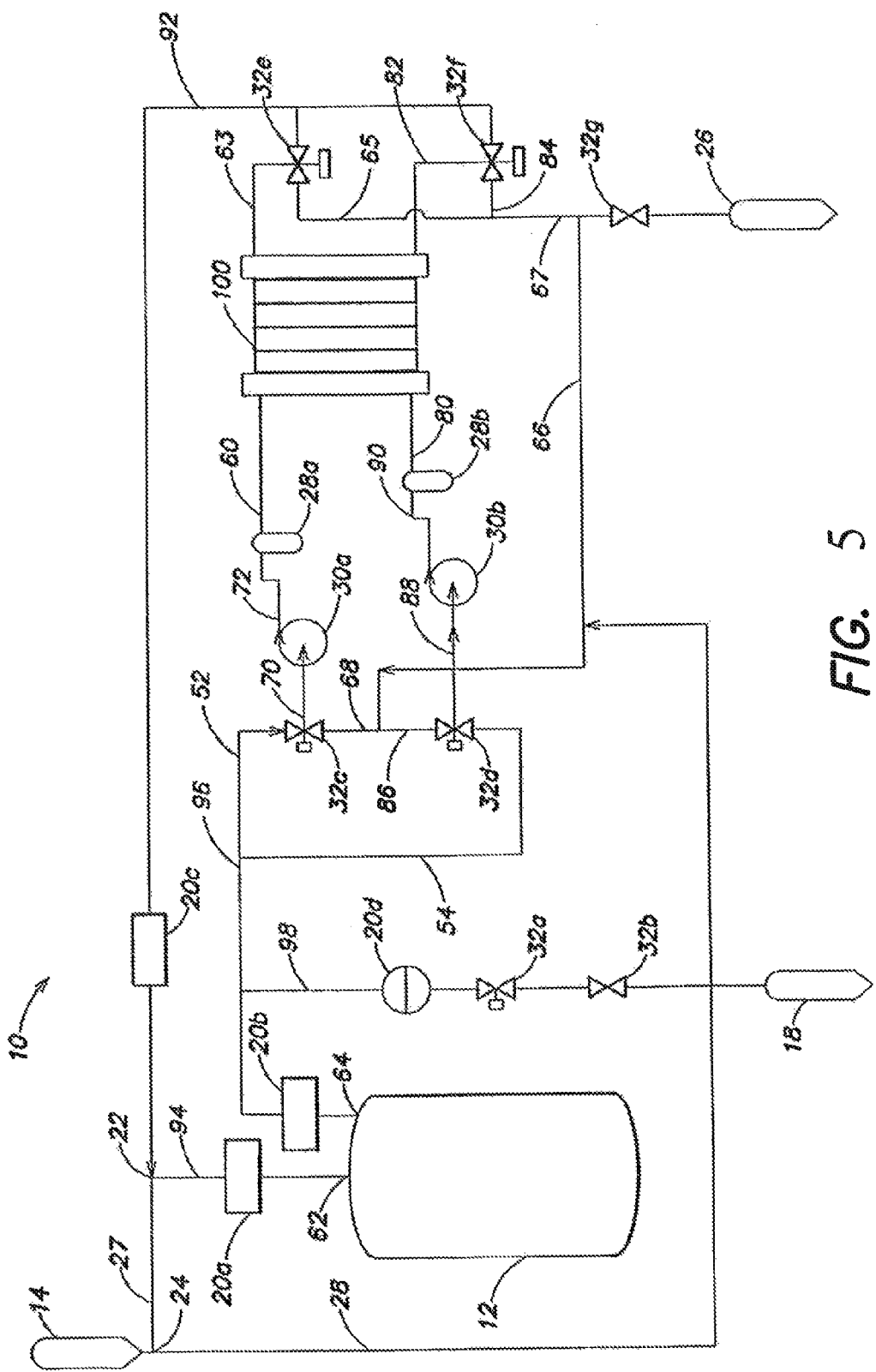
FIG. 5 is a schematic flow diagram of a water treatment system in accordance with one or more embodiments of the invention.

An in-line pressurized water treatment system in accordance with one or more embodiments of the present invention, schematically shown in FIG. 5, was evaluated for performance. The water treatment system 10 had an electrodeionization module 16 and a pressurized storage vessel 12. Water, from point of entry 14, was introduced into pressurized storage vessel 12 through inlet 62, circulated using pumps 30a and 30b, and treated through pretreatment units 28a and 28b and electrodeionization module 16. The water treatment system was controlled by a programmable controller (not shown) based on the measured water conductivity, as measured by sensors any of 20a, 20b, and 20c.

Electrodeionization device 16 comprised of a 10-cell pair stack with flow paths that were about 7.5 inches long and about 2.5 inches wide. Each cell was filled with about 40% AMBERLITE® SF 120 resin and about 60% AMBERLITE® IRA 458 resin, both available from Rohm & Haas Company, Philadelphia, Pa. The electrodeionization device had an expanded titanium electrode coated with ruthenium oxide.

The controller was a MICROLOGIX™ 1000 programmable controller available from Allen-Bradley Company, Inc., Milwaukee, Wis. The electrodeionization device was configured to start up either by a flow switch signal or when the water conductivity of the outlet stream leaving the pressurized vessel was higher than a setpoint. The electrodeionization device operated until the conductivity reached the set point. The feed from the electrodeionization device was circulated from the pressurized vessel via a second feed pump. The polarity of the electric field applied to the electrodeionization device was reversed about every 15 minutes. In addition to controlling the components of electrodeionization device 16, the PLC collected, stored, and transmitted measured data from sensors 20a, 20b, 20c, and 20d.

Pressurized vessel 12 was a 10 inch diameter fiberglass vessel with a 30 gallon capacity. Pressurized vessel 12 was fitted with a valve head and a center manifold pipe. The concentrate stream leaving the electrodeionization device was partially circulated and partially rejected to a drain 26 by regulating valves 32c, 32d, 32e, 32f and 32g. Make-up water, from point of entry 14, was fed into the circulating stream to compensate for any water that was rejected to drain 26. The pretreatment system comprised of an aeration iron-filter with a 25 micron rating, a 20 inch×4 inch sediment filter, and a 20 inch×4 inch carbon block filter.

In the one flow direction, water from pressure vessel 12 was pumped by pump 30a, from pressure vessel 12 through valve 32c, to pretreatment unit 28a before being introduced to the depleting compartments (not shown) of electrodeionization device 16. Treated water from electrodeionization device 16 was directed by valve 32f to storage in pressure vessel 12. Fluid collecting removed ionic species was circulated by pump 30b through pretreatment unit 28b, the concentrating and electrode compartments (not shown) of electrodeionization device 16 and valve 32e. When the direction of the applied electric field was reversed, the flow directions were correspondingly adjusted so that pump 30a, pretreatment unit 28a, and valves 32c and 32f circulated the concentrate stream, which was accumulating ionic species, while flowing through the concentrating and electrode compartments of electrodeionization device 16. Similarly, water to be treated was pumped from pressurized vessel 12 using pump 30b through valve 32d to pretreatment unit 28b before being introduced and treated in the depleting compartments of electrodeionization device 16. From electrodeionization device 16, treated water was directed by valve 32e to flow into pressure vessel 12.

The flow rate of treated water, as measured by flow indicator 20d, to a point of use 18 from outlet 64 of pressurized vessel 12 was regulated by adjusting valves 32a and 32b. To discharge the concentrate stream, valve 32g was operated as necessary. Water from point of entry 14 was used to replace fluid that was discharged to drain 26. The water treatment system was operated until a target set point of about 220 µS/cm was reached and stable for about one minute. The applied voltage to the electrodeionization device was about 46 volts. The flow rates into the depleting and concentrating compartments were maintained at about 4.4 liters per minute. The reject flow rate was controlled to discharge about 270 mL of the concentrate stream about every 30 seconds. The pressure in the vessel was about 15 psig to about 20 psig.

Figure 6:
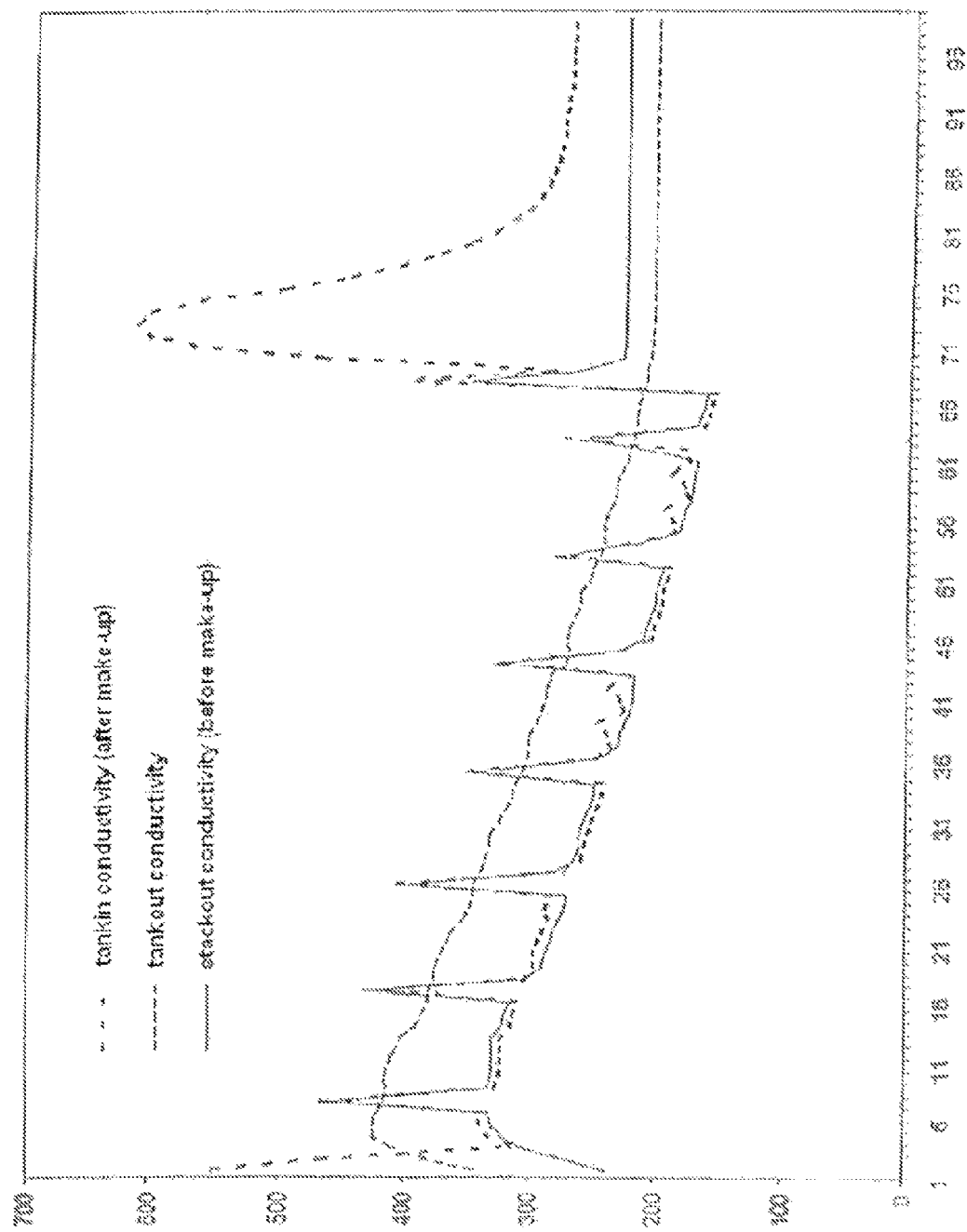
FIG. 6 is a graph showing conductivity of water treated in the water treatment system exemplarily illustrated in FIG. 5.

FIG. 6 shows the measured conductivity of the various streams in the water treatment system, against run time. Tables 3 and 4 summarize the measured properties of the various streams of the water treatment system at the start and end of the test, respectively. The data presented in Table 3 showed that the initial feed stream, labeled as tankout conductivity in FIG. 6, into electrodeionization device 16 with a conductivity of about 412 µS/cm was treated to produce an initial dilute stream, labeled as stackout conductivity in FIG. 6, having a conductivity of about 312 µS/cm, without a substantial pH change. Similarly, at the end of the test run, water having a conductivity of about 221 µS/cm was treated to produce lower conductivity water of about 164 µS/cm without a substantial pH change.

As similarly noted in Example 1, the lower conductivity of the feed stream at the end of the test run reflected the effect of circulation, which effectively removed undesirable species over several passes. Thus, this example shows that the treatment system of the present invention, schematically illustrated in FIG. 5, can treat water that is suitable for household or residential use.

TABLE 3

Stream properties at the start of the test run.

|  | Feed Stream | Reject Stream | Product Stream |
| --- | --- | --- | --- |
| pH | 8.19 | 8.3 | 8.02 |
| Conductivity (µS/cm) | 412 | 944.9 | 312.0 |

TABLE 4

Stream properties at the end of the test run.

|  | Feed Stream | Reject Stream | Product Stream |
| --- | --- | --- | --- |
| pH | 8.37 | 8.33 | 7.75 |
| Conductivity (µS/cm) | 221 | 833.8 | 164 |

Example 3

Figure 12:
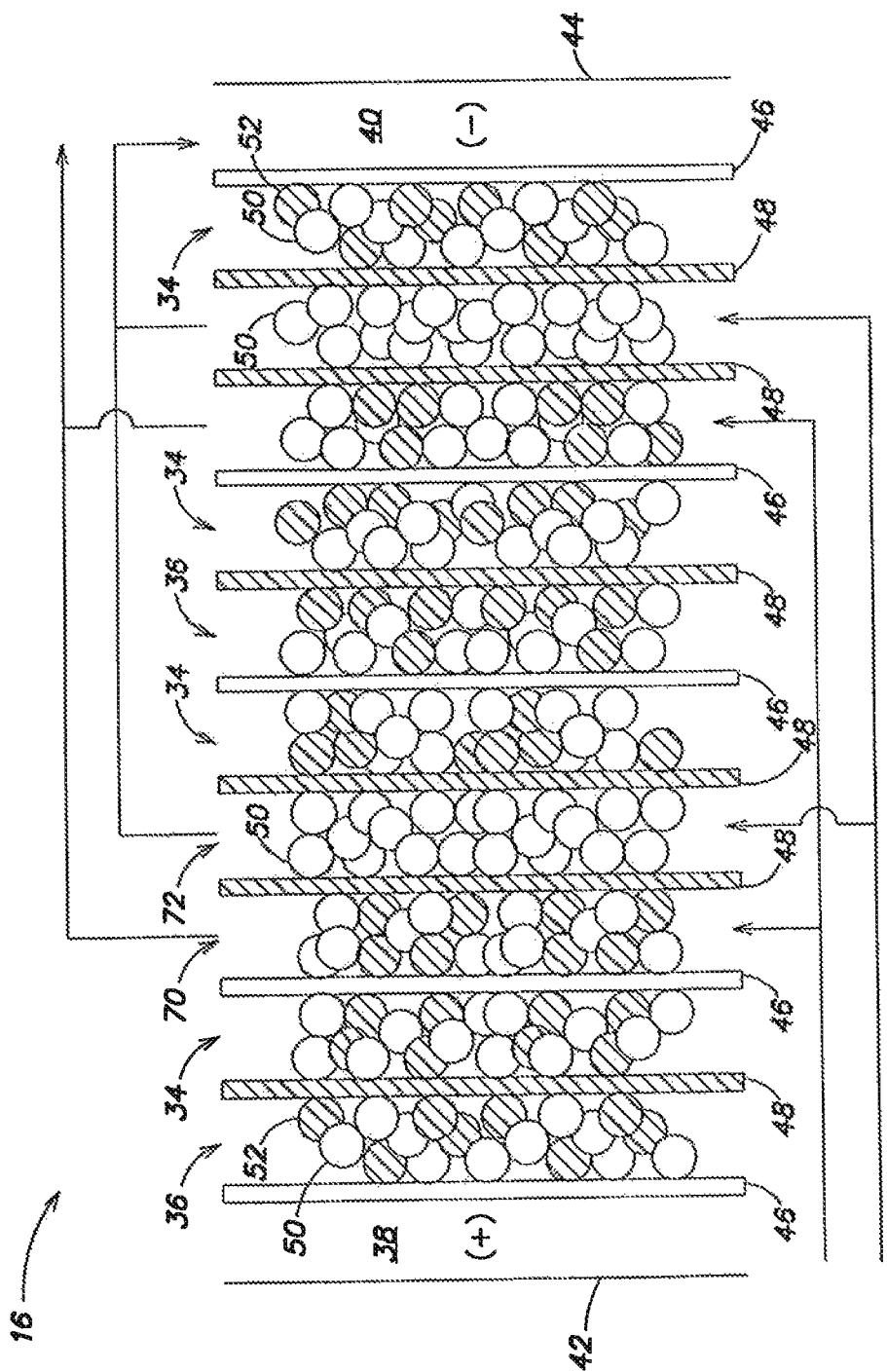
FIG. 12 is a schematic, sectional view through an electrodeionization device illustrating an ion-trapping compartment in accordance with one or more embodiments of the present invention.
Figure 13:
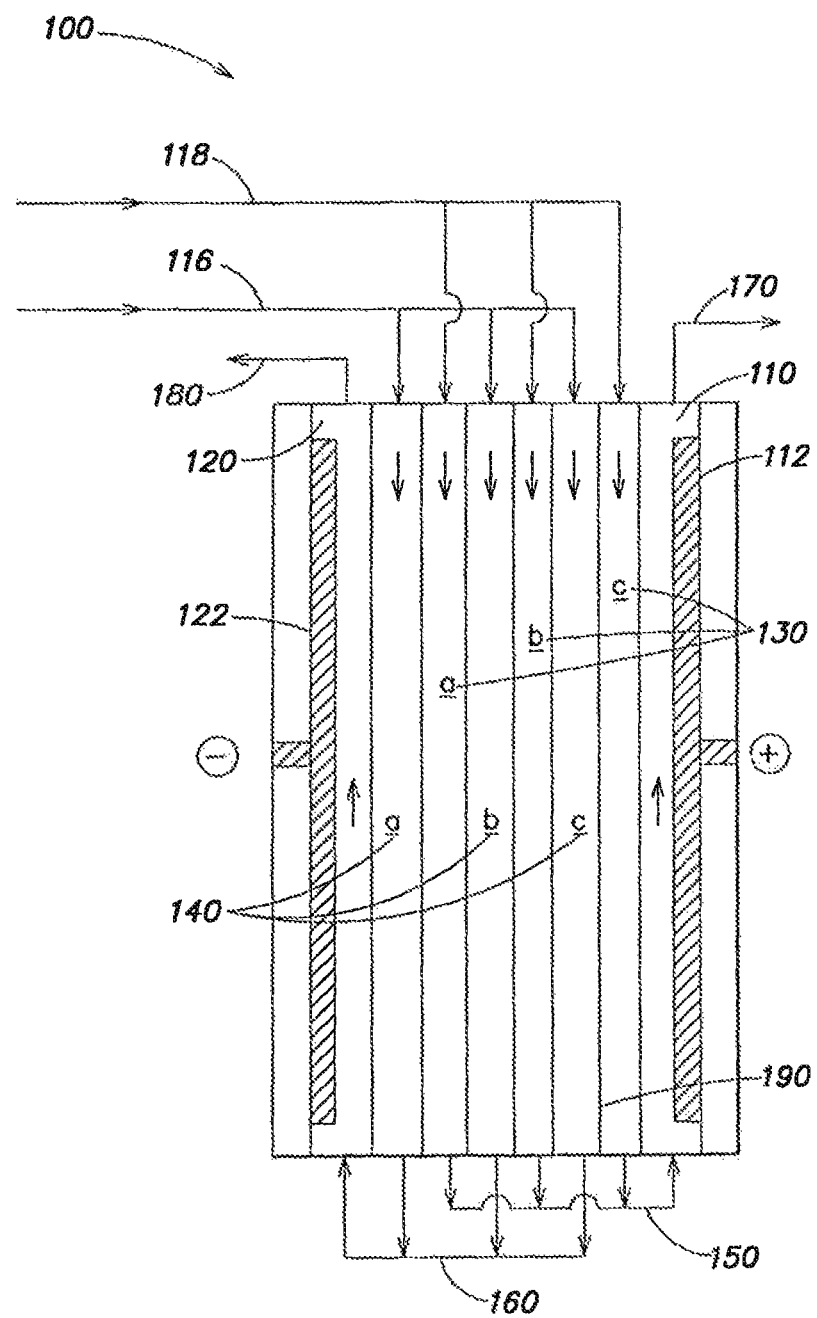
FIG. 13 is a schematic illustration of an electrochemical device or module in accordance with one or more embodiments of the invention.
Figure 14:
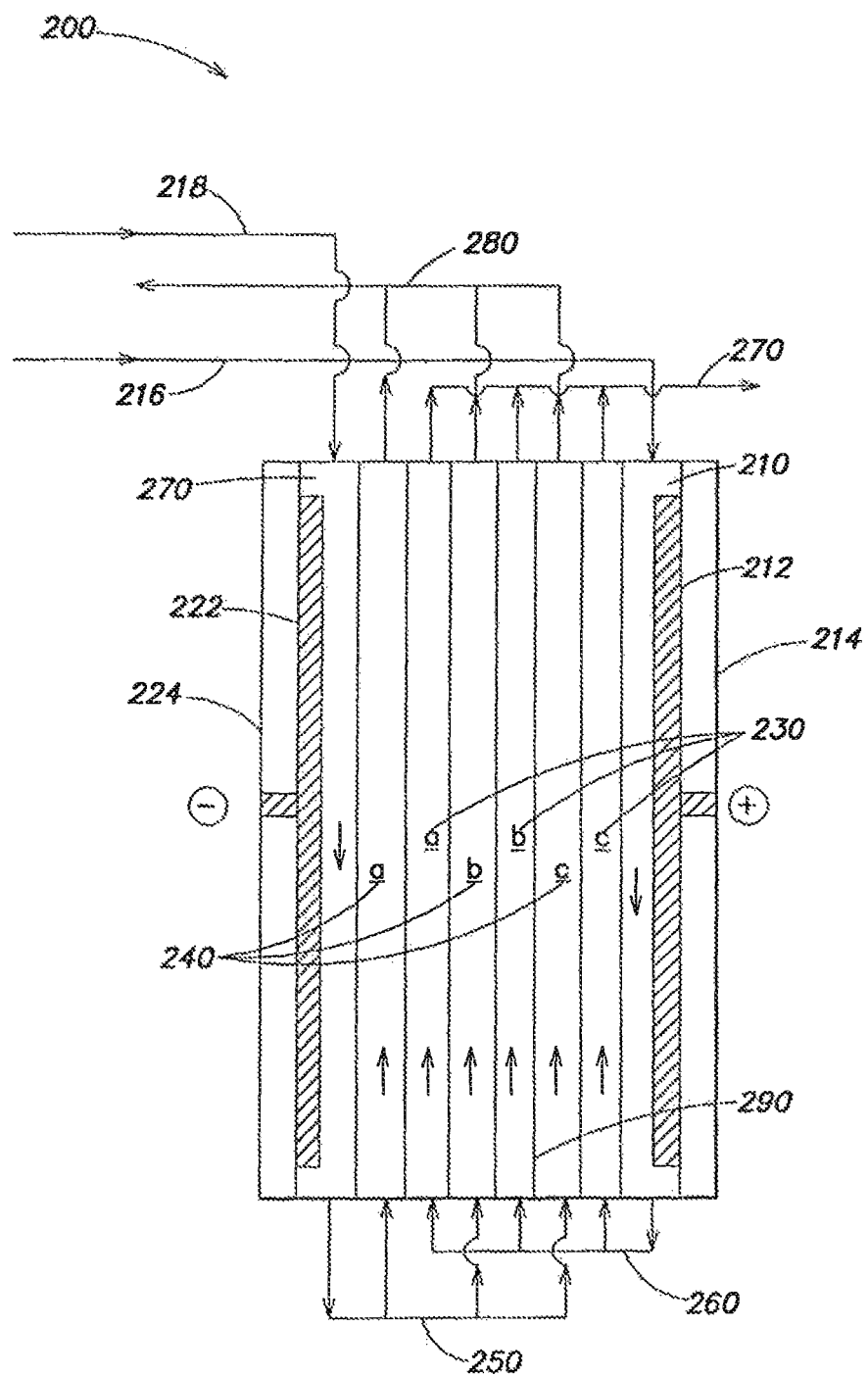
FIG. 14 is a schematic diagram of another electrochemical module in accordance with one or more embodiments of the invention.

This example demonstrates an electrodeionization device that can generate and accumulated hydrogen ions in a compartment. A section of the electrodeionization device used in this example is schematically illustrated in FIG. 12. The electrodeionization device 16 had five cell pairs totaling ten compartments between the electrode compartments 38 and 40. Cathode compartment 38 was bounded by a cation-selective membrane 46. An adjacent compartment, concentrating compartment 36, was filled with a mixture of cation-exchanged resin 50 and anion-exchange resin 52. Specifically, the electroactive media was a mixed bed of about 60% AMBERLITE® IRA 458 and about 40% AMBERLITE® SF 120 resin, both available from Rohm & Haas Company, Philadelphia, Pa. Concentrating compartment 36, immediately adjacent to cathode compartment 38, was bounded by cation-selective membrane 46 and an anion-selective membrane 48 opposite the cation-selective membrane. Immediately adjacent to concentrating compartment 36 was a depleting compartment 34, which was bounded by an anion-selective membrane 48 and a cation-selective membrane 46. Depleting compartment 34 comprised of a mixed bed resin similar in composition to the mixed bed resin comprising concentrating compartment 36. Positioned adjacent to compartment 34 were compartments 70 and 72. Compartment 72 was a trapping compartment that comprised of cation-exchange resin 50 bordered by anion-selective membranes 48. Compartment 70 comprised of a mixed bed of ion exchange resin with similar concentrations as the resins in compartments 34 and 36. On the other side of compartment 72 was a second depleting compartment 34 comprised of a mixed bed of ion exchange resin of similar composition as the first depleting compartment 34. The remaining compartments of electrodeionization device 16 comprised of depleting and concentrating compartments, as well as compartments 70 and 72 in the similar order as described above.

During operation, water to be treated was introduced into depleting compartments 34 and a flushing fluid, which was typically a concentrate stream, flowed in concentrating compartments 36. A second flushing fluid flowed into compartment 70 and was discharged as reject along with the fluid from the concentrating compartments. A separate fluid flowed into compartment 70, was commonly collected, and eventually was reintroduced into the anode compartment. The fluid from the anode compartment was discharged to drain. Under the influence of an applied electric field, water was split in compartment 72 into hydrogen and hydroxyl ions. Cation-exchange resin 50 in compartment 72 inhibited transport of the positively-charged hydrogen ions. Anion-selective membrane 48, forming the boundaries with compartment 72 further inhibited any migration of hydrogen ions from compartment 72. Over time, hydrogen ion concentration increased relative to the hydroxyl ion concentration because the arrangement of electroactive media in compartment 72, consisting essentially of cation-exchange resin and was bounded by anion-selective membrane, promoted migration of hydroxyl ions into adjacent compartment 70 while inhibiting hydrogen ion transport.

Electrodeionization device 16 was operated with an applied electric field of about 10 V to about 20 V. Water to be treated was introduced at a rate of about 0.03 liters per minute per cell at a pressure of about 12 psig. Tables 1 and 2 summarize the measured parameters of various streams during operation of the electrodeionization device at about 10 V with about 0.23 A and about 0.22 A, respectively, using feed water having a conductivity of about 784 µS/cm and about 775 µS/cm, respectively. Tables 3 and 4 summarize the measured parameters of various streams during operation of the electrodeionization device at about 20 V with about 0.35 A and about 0.32 A, respectively, using feed water having a conductivity of about 680 µS/cm and about 722 µS/cm, respectively.

The data presented in Tables 5-8 summarize measured properties of the various streams during the operation of electrodeionization device 16. In the last two columns of each table lists the measured fluid properties of water leaving the anode compartment. Specifically, in the next to last column of each table, feed water was introduced into the anode compartment and the measured physical properties of the stream leaving that anode compartment are listed. In comparison, in the last column, fluid from compartment 72 was introduced into the anode compartment and the properties of the fluid leaving that anode compartment are listed. The data shows that using fluid from compartment 72 wherein hydrogen was collected from water splitting and introduced into the electrode compartment, the measured LSI was lower than the LSI measured without using the fluid from compartment 72. This is significant because an LSI that is close to zero indicates a lesser likelihood of scaling. Thus, the Example shows that the use of the present invention can reduce the likelihood of scaling in an electrodeionization device.

TABLE 5

|  | Dilute | Concentrate | Reject | Electrode without Ion-trapping | Electrode with Ion-trapping |
|---|---|---|---|---|---|
| Conductivity (µS/cm) | 308 | 1195 | 1300 | 786 | 769 |
| pH | 7.9 | 7.8 | 8.5 | 9.1 | 8.4 |
| LSI | −0.51 | 0.38 | 1.09 | 1.47 | 0.64 |

TABLE 6

|  | Dilute | Concentrate | Reject | Electrode without Ion-trapping | Electrode with Ion-trapping |
|---|---|---|---|---|---|
| Conductivity (µS/cm) | 285 | 1192 | 1176 | 779 | 763 |
| pH | 8.0 | 7.8 | 8.4 | 9.4 | 8.3 |
| LSI | −0.48 | 0.42 | 1.09 | 1.48 | 0.55 |

TABLE 7

|  | Dilute | Concentrate | Reject | Electrode without Ion-trapping | Electrode with Ion-trapping |
|---|---|---|---|---|---|
| Conductivity (µS/cm) | 161 | 1255 | 1203 | 635 | 717 |
| pH | 7.4 | 7.1 | 8.7 | 9.7 | 8.2 |
| LSI | −1.46 | −0.21 | 1.48 | 1.72 | 0.48 |

TABLE 8

|  | Dilute | Concentrate | Reject | Electrode without Ion-trapping | Electrode with Ion-trapping |
|---|---|---|---|---|---|
| Conductivity (µS/cm) | 150 | 1398 | 1434 | 717 | 787 |
| pH | 7.2 | 6.8 | 8.6 | 9.8 | 7.9 |
| LSI | −1.79 | −0.55 | 1.47 | 1.77 | 0.11 |

Example 4

Figure 7:
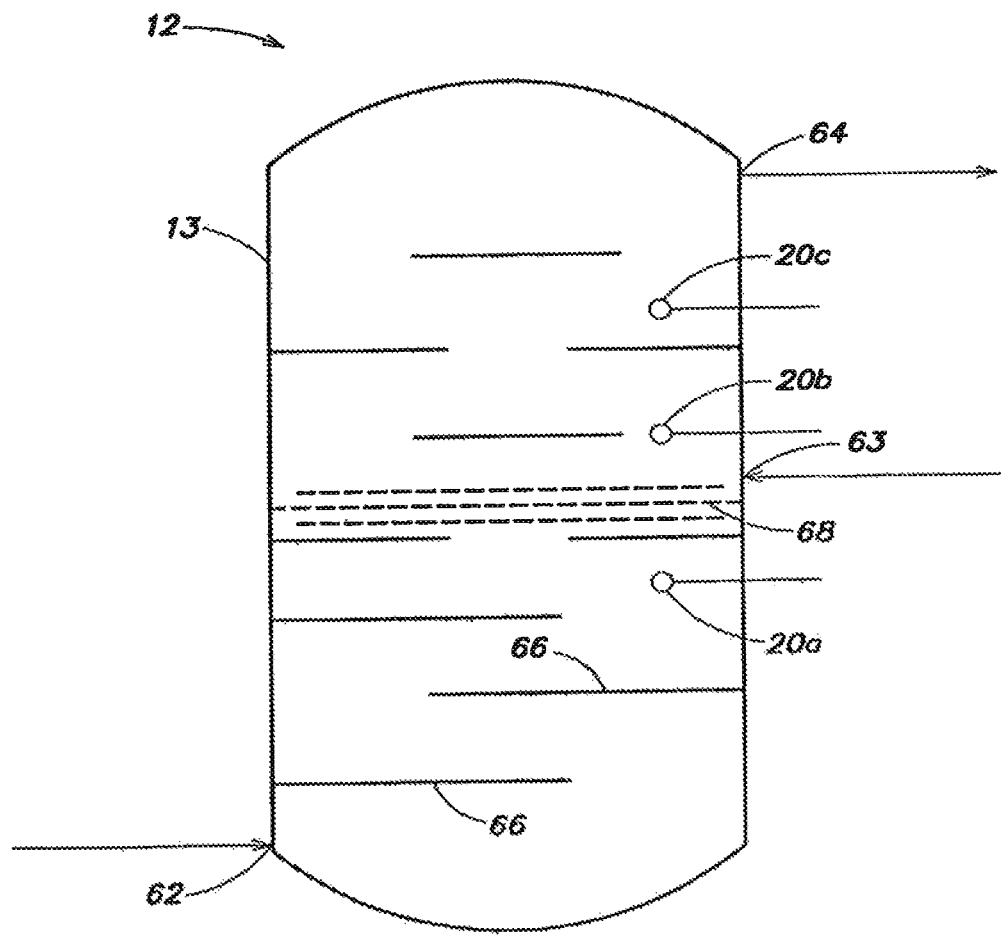
FIG. 7 is a schematic, sectional view through a vessel illustrating the use of baffle plates and sensors in accordance with one or more embodiments of the invention.
Figure 8:
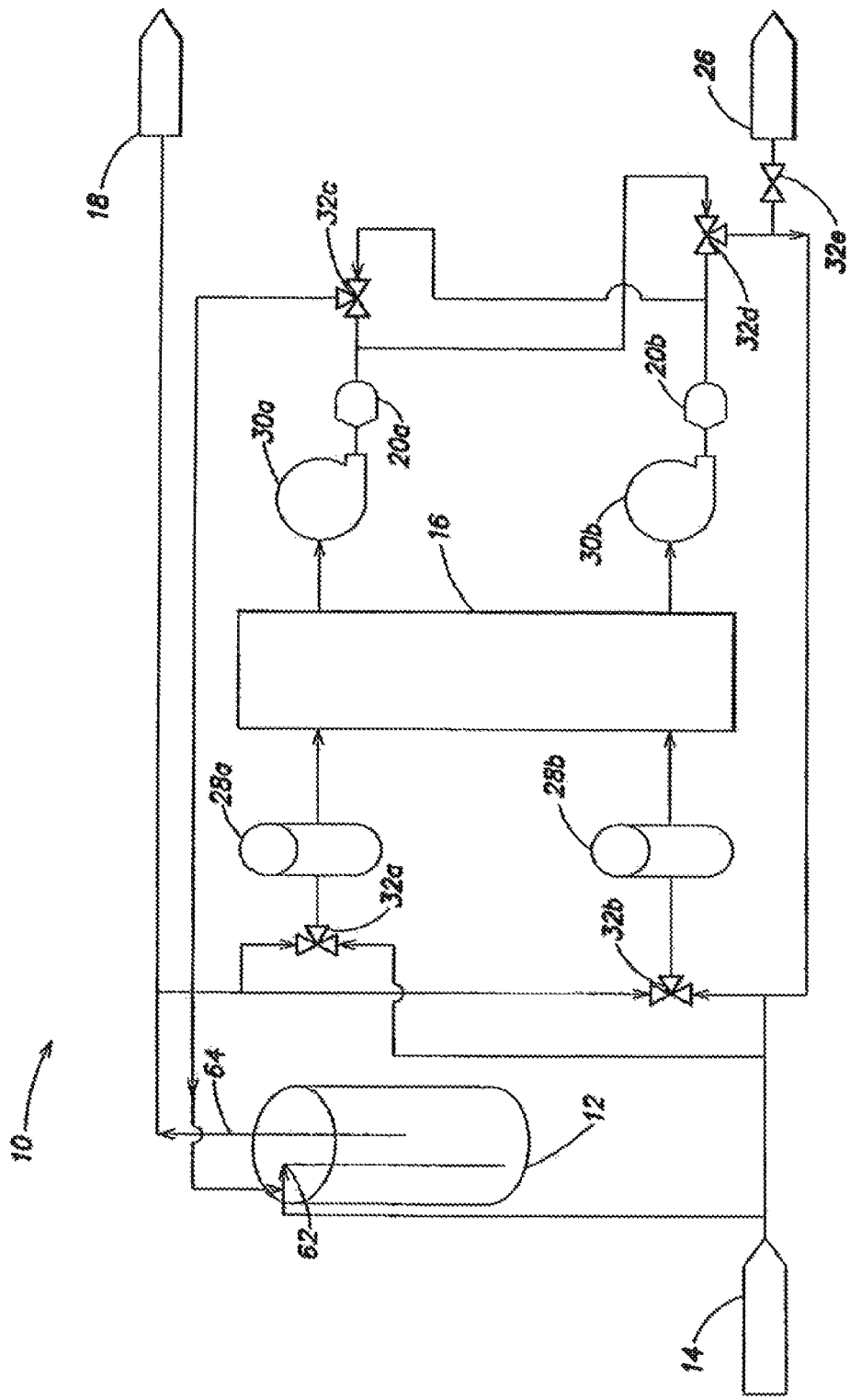
FIG. 8 is a schematic flow diagram of a water treatment system according to one embodiment of the invention.

This prophetic example describes a water treatment system that can be designed according to the present invention. FIG. 7 is a schematic illustration of a reservoir system that can be used in the water treatment system of the present invention. The reservoir system 12 has a vessel 13 with an inlet 62, typically fluidly connected to a point of entry (not shown), and an outlet 64, typically fluidly connected to a point of use (not shown).

Vessel 13 has a second inlet 63 that is fluidly connected to an electrodeionization device (not shown). Vessel 13 has at least one baffle 66, which can be arranged in a variety of configuration including, for example, offset and rotated arrangements or combinations thereof. Moreover, baffle 66 can be single, double or triple segmental baffles or combinations thereof. At least one water property sensor 20 can be installed on vessel 13 for measuring a water property such as, pressure, temperature, pH and conductivity. Sensor 20 can be installed in a variety of configurations. As illustrated, three sensors 20a, 20b and 20c that measure the conductivity of the water are installed along the height of vessel 13. In operation, each sensor 20a, 20b and 20c provides a signal to a controller (not shown), which corresponds to the measured water conductivity.

The controller can be configured to average the measurements or can monitor any difference in water conductivity. In the former, the controller regulates the operating parameters of the electrodeionization device, which softens the water flowing from outlet 64 to produce treated water returning into second inlet 63 based on the average measured conductivity. In the latter arrangement, the controller monitors the interface between the treated and raw water in vessel 13 and regulates the operation of the electrodeionization device as necessary to provide treated water to the point of use. For example, before the interface 68 between raw and treated water, as measured by the difference in conductivity, reaches sensor 20b, the controller regulates the operation of the electrodeionization device to treat water at a first operating condition. If demand for treated water results in bringing interface 68 between sensor 20b and 20c, then the controller can regulate the electrodeionization device at a second operating condition that treats water at a faster rate or removes undesirable species at a faster rate. In this way, constructive use of baffles and sensor arrangement can optimize the operation of the water treatment system and components thereof.

Example 5

A treatment system, schematically shown in FIG. 3, was designed and evaluated for performance. The treatment system 10 had an electrodeionization device 16 with a pretreatment system (not shown) and a pressurized vessel 12. Water, from point-of-entry 14, was introduced into pressurized vessel 12 and was re-circulated through electrodeionization device 16. The water treatment system was controlled by a programmable controller (not shown) based on the measured water conductivity, as measured by sensors 20b and 20c, upstream of an inlet 62 and downstream of an outlet 64 of pressurized vessel 12.

Electrodeionization device 16 comprised a 10-cell pair stack with 13 inch flow paths. Each cell was filled with AMBERLITE® SF 120 resin and AMBERLITE® IRA 458 resin, both available from Rohm & Haas Company, Philadelphia, Pa. The electrodeionization device utilized an expanded titanium electrode coated with ruthenium oxide.

Pressurized vessel 12 was a 10 inch diameter fiberglass vessel with about a 17 gallon capacity. The concentrate stream leaving the electrodeionization device was partially re-circulated and partially rejected to a drain 26 by regulating valves 32b, 32c, 32e, 32f, 32g, 32h, 32j and 32l. Make-up water, from point-of-entry 14, was fed into the recirculating stream to compensate for water rejected to drain 26 by regulating valves 32b, 32c and 32d in proper sequence.

The treated water exiting electrodeionization device 16 was transferred to vessel 12 by actuating valves 32i and 32k. The flow rate of treated water to a point of use 18 from outlet 64 of pressurized vessel 12 was regulated by adjusting valve 32a. Several sensors measuring operating conditions and water properties were installed throughout the water treatment system 10 including pressure indicators 20d, 20f, 20g, 20h and 20i, flow rate indicators 20a, 20e, 20j and 20k and conductivity sensors 20b, 20c and 20l.

The controller comprised a MicroLogix™ 1000 programmable controller, available from Allen-Bradley Company, Inc., Milwaukee, Wis. The electrodeionization device was set to start up by a flow switch signal or when the water conductivity of the outlet stream leaving the pressurized vessel was detected to be higher than a set point. The feed to the electrodeionization device was circulated from the pressurized vessel via a second feed pump. The polarity of the electric field applied to the electrodeionization device was reversed as necessary.

Valves 32j and 32l was an "on-off" type valve that provided a fully open or a fully closed flow path to drain 26. Valves 32j and 32l comprised of a needle valve or a ball valve. Valves 32j and 32l was actuated by a controller (not shown) and opened and closed according to a predetermined schedule. In addition, valves 32j and 32l had an applied positive charge that was sufficient to produce hydrogen ions to lower the pH of the surrounding fluid.

Example 6

An in-line water treatment system, schematically shown in FIG. 5, was designed, operated and evaluated for performance. The water treatment system 10 had an electrodeionization device 16 and a pressurized storage vessel 12. Water, from point-of-entry 14, was introduced into pressurized storage vessel 12 through inlet 62 and was circulated using pumps 30a and 30b and treated through pretreatment units 28a and 28b and electrodeionization device 16. The water treatment system was controlled by a programmable controller (not shown) based on the measured water conductivity, as measured by sensors any of 20a, 20b and 20c.

Electrodeionization device 16 was comprised of a 10-cell pair stack with flow paths that were about 7.5 inches long and about 2.5 inches wide. Each cell was filled with about 40% AMBERLITE® SF 120 resin and about 60% AMBERLITE® IRA 458 resin, both available from Rohm & Haas Company, Philadelphia, Pa. The electrodeionization device had an expanded titanium electrode coated with ruthenium oxide.

The controller was a MICROLOGIX™ 1000 programmable controller available from Allen-Bradley Company, Inc., Milwaukee, Wis. The electrodeionization device was set to start up by a flow switch signal or when the water conductivity of the outlet stream leaving the pressurized vessel was higher than a set point. The electrodeionization device operated until the conductivity reached the set point. The feed from the electrodeionization device was circulated from the pressurized vessel via a second feed pump. The polarity of the electric field applied to the electrodeionization device was reversed about every 15 minutes. In addition to controlling the components of electrodeionization device 16, the PLC collected, stored and transmitted measured data from sensors 20a, 20b, 20c and 20d.

Pressurized vessel 12 was a 10 inch diameter fiberglass vessel with about a 30 gallon capacity. Pressurized vessel 12 was fitted with a valve head and a center manifold pipe. The concentrate stream leaving the electrodeionization device was partially circulated and partially rejected to a drain 26 by regulating valves 32c, 32d, 32e, 32f and 32g. Make-up water, from point-of-entry 14, was fed into the circulating stream to compensate for any water that was rejected to drain 26.

The pretreatment system comprised of an aeration iron-filter with a 25-micron rating, a 20 inch×4 inch sediment filter and a 20 inch×4 inch carbon block filter.

In the one flow direction, water from pressure vessel 12 was pumped by pump 30a, from pressure vessel 12 through valve 32c, to pretreatment unit 28a before being introduced to the depleting compartments (not shown) of electrodeionization device 16. Treated water from electrodeionization device 16 was directed by valve 32f to storage in pressure vessel 12. Fluid collecting removed ionic species was circulated by pump 30b through pretreatment unit 28b, the concentrating and electrode compartments (not shown) of electrodeionization device 16 and valve 32e. When the direction of the applied electric field was reversed, the flow directions were correspondingly adjusted so that pump 30a, pretreatment unit 28a, and valves 32c and 32f circulated the fluid, which was accumulating ionic species, while flowing through the concentrating and electrode compartments of electrodeionization device 16. Similarly, water to be treated was pumped from pressure vessel 12 using pump 30b through valve 32d to pretreatment unit 28b before being introduced and treated in the depleting compartments of electrodeionization device 16. Treated water was directed by valve 32e to pressure vessel 12.

The flow rate of treated water, as measured by flow indicator 20d, to a point of use 18 from outlet 64 of pressurized vessel 12 was regulated by adjusting valves 32a and 32b. To discharge concentrate or waste stream, valve 32g was operated as necessary. Water from point-of-entry 14 was used to restore and replace fluid that was discharged to drain 26. Valve 32g was a diaphragm valve.

The water treatment system was operated until a target set point of about 220 µS/cm was reached and stable for about one minute. The applied voltage to the electrodeionization device was about 46 volts. The flow rates into the depleting and concentrating compartments were maintained at about 4.4 liters per minute. The reject flow rate was controlled to discharge about 270 mL every about 30 seconds. The pressure in the vessel was about 15 psig to about 20 psig. Discharge valve 32g was disassembled after the run and was found to have minimal scaling.

Example 7

An in-line water treatment system, schematically shown in FIG. 5, was designed, operated and evaluated for performance. The water treatment system 10 had an electrodeionization device 16 and a vessel 12. Water from point-of-entry 14 was introduced into pressure vessel 12 through inlet 62. Water to be treated was withdrawn from pressurized storage vessel 12 and introduced into electrodeionization device 16 through either of valves 32a or 32b. The water treatment system also had pretreatment systems 28a and 28b upstream of electrodeionization device 16. Streams exiting electrodeionization device 16 was transferred through pumps 30a and 30b into either of pressurized storage vessel 12 or circulated back into electrodeionization device 16, depending on the service of valves 32c and 32d. Discharge to drain 26 of a concentrate stream was controlled by actuating valve 32e. Treated water was withdrawn from pressurized storage vessel 12 through outlet 64 and introduced as the product point of use 18. The water treatment system was controlled by a programmable controller (not shown) based on the measured water conductivity. The water treatment system was operated until a conductivity of about 220 µS/cm was achieved. Treated water from the water treatment system was withdrawn from pressurized storage vessel 12 and delivered to point of use 18 at a rate of between about 11 to about 14 gallons about every 3 hours. The flow rate through pumps 30a and 30b was monitored through flow meters 20a and 20b, respectively.

Electrodeionization device 16 was comprised of a 25 cell pair stack between expanded mesh ruthenium oxide electrodes. Electrodeionization device 16 was configured so that treated water or product flowed from the depleting compartments to the cathode compartments and the concentrate stream from the concentrating compartments circulated through the anode compartment. Each cell of the electrodeionization device was filled with about 40% AMBERLITE® SF 120 resin and about 60% AMBERLITE® IRA 458 resin, both available from Rohm & Haas Company, Philadelphia, Pa.

The programmable controller was a MICROLOGIX™ and 1000 programmable controller available from Allen-Bradley Company, Inc., Milwaukee, Wis.

An electric field was applied across the electrodeionization device and was reversed about every 15 minutes. The applied electric field across electrodeionization device 16 was initially operated at about 40 V and was changed to about 52 V.

Vessel 12 was about a 10 inch diameter fiberglass tank containing about 17 gallons. The feed pressure from point-of-entry 14 was about 30 psig. Flow rates in the diluting and concentrating streams was maintained at about 1.3 to about 1.4 liters per minute.

Pretreatment systems 28a and 28b was comprised of 5 inch carbon block filters with about a 0.5 micron rating. Additionally, a pretreatment system comprised of one depth filter and one 1 inch sediment filter was used to remove heavy particulates before introducing the water to be treated in vessel 12.

In one liquid circuit, water from vessel 12 was introduced through valve 32a into electrodeionization device 16 where it was treated. The treated water was returned to vessel 12 through pump 30a and valve 32c. In another liquid circuit, a concentrating stream flowing in a concentrating compartment of electrodeionization device 16 was circulated through pump 30b and directed by valves 32d and 32b. In another liquid circuit, water to be treated was withdrawn from outlet 64 of vessel 12 and introduced into a second depleting compartment of electrodeionization device 16 through valve 32b. The treated water exiting electrodeionization device 16 was then transferred back into vessel 12 by pump 30b and valve 32c. A fourth liquid circuit, comprising a concentrating stream from a second concentrating compartment of electrodeionization device 16, was circulated by operating pump 30a and directing the flow through valve 32c, 32d and 32a.

The water treatment system was operated under varying conditions and the operating parameters were measured and illustrated on FIGS. 9A, 9B, 10A, 10B, 11A and 11B. In each of the figures, an operating parameter was varied to evaluate the efficiency and performance of the water treatment system.

Figure 9A:
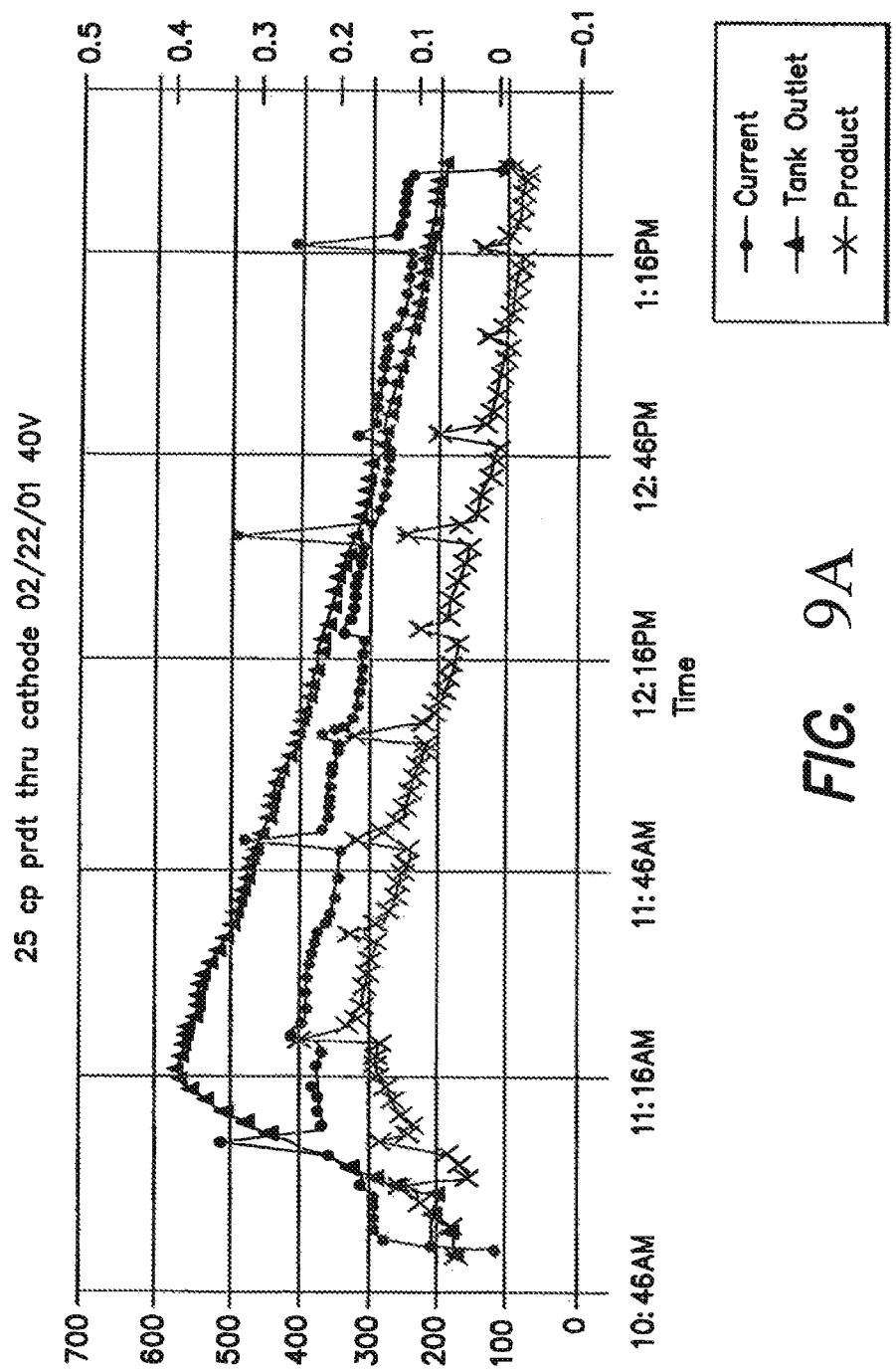
Figure 9B:
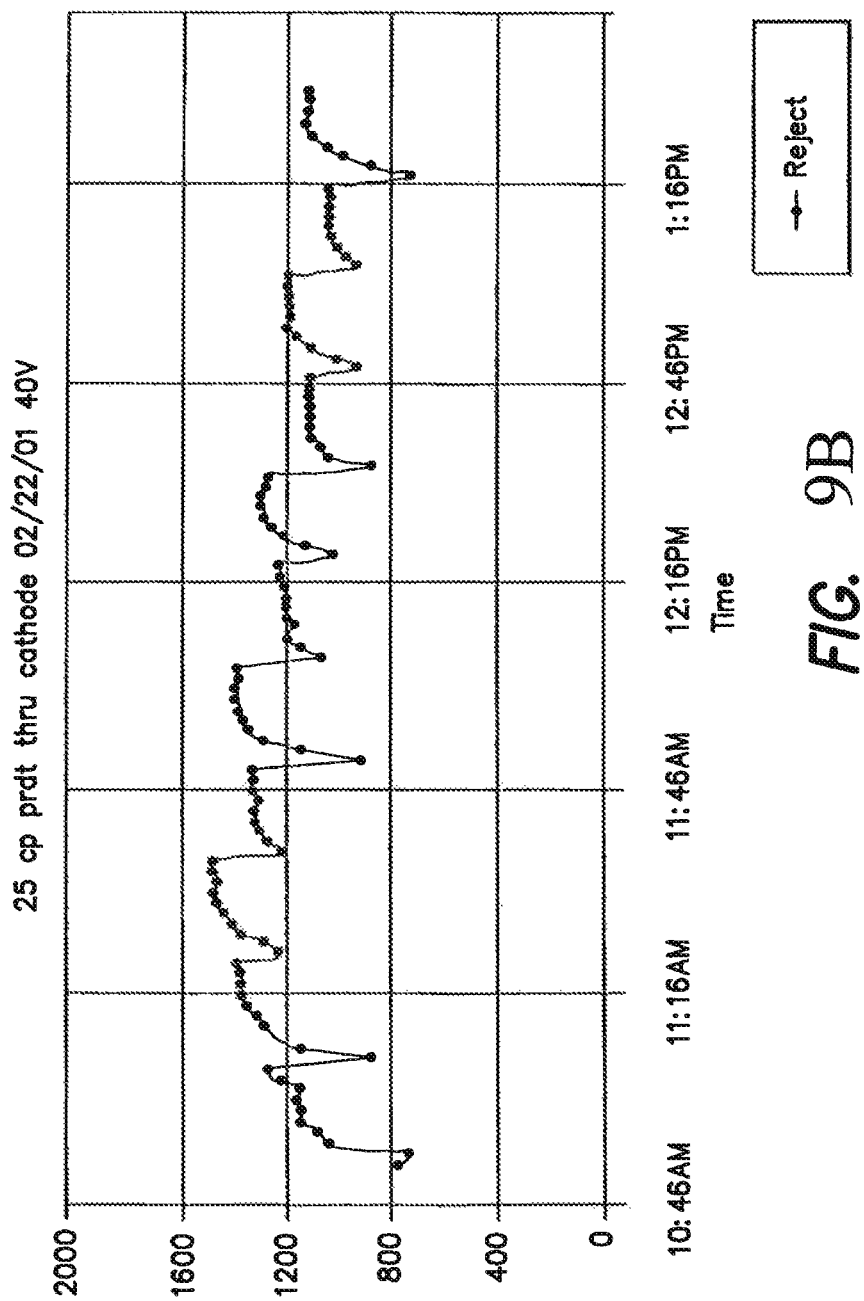

The water treatment system was operated so that an intermittent flushing or discharge of the concentrate stream to drain 26 occurred for about 6 seconds every 24 seconds. The volume discharged to drain was about 300 milliliters per minute. Product water was withdrawn from vessel 12 at a rate of about 12.5 gallons every three hours. At an applied electric potential of about 40 V, the electrodeionization device automatically shut down, after reaching the set point, and remained shut down for 25 minutes before the next product withdrawal, to point of use 18. The duration of the shutdown time represents the efficiency of the system in operation. FIGS. 9A and 9B show that under an applied potential of about 40 V, the water treatment system can be operated to produce softened water having a conductivity of about 220 µS/cm and a reject to drain cycle that drains intermittently.

Figure 10A:
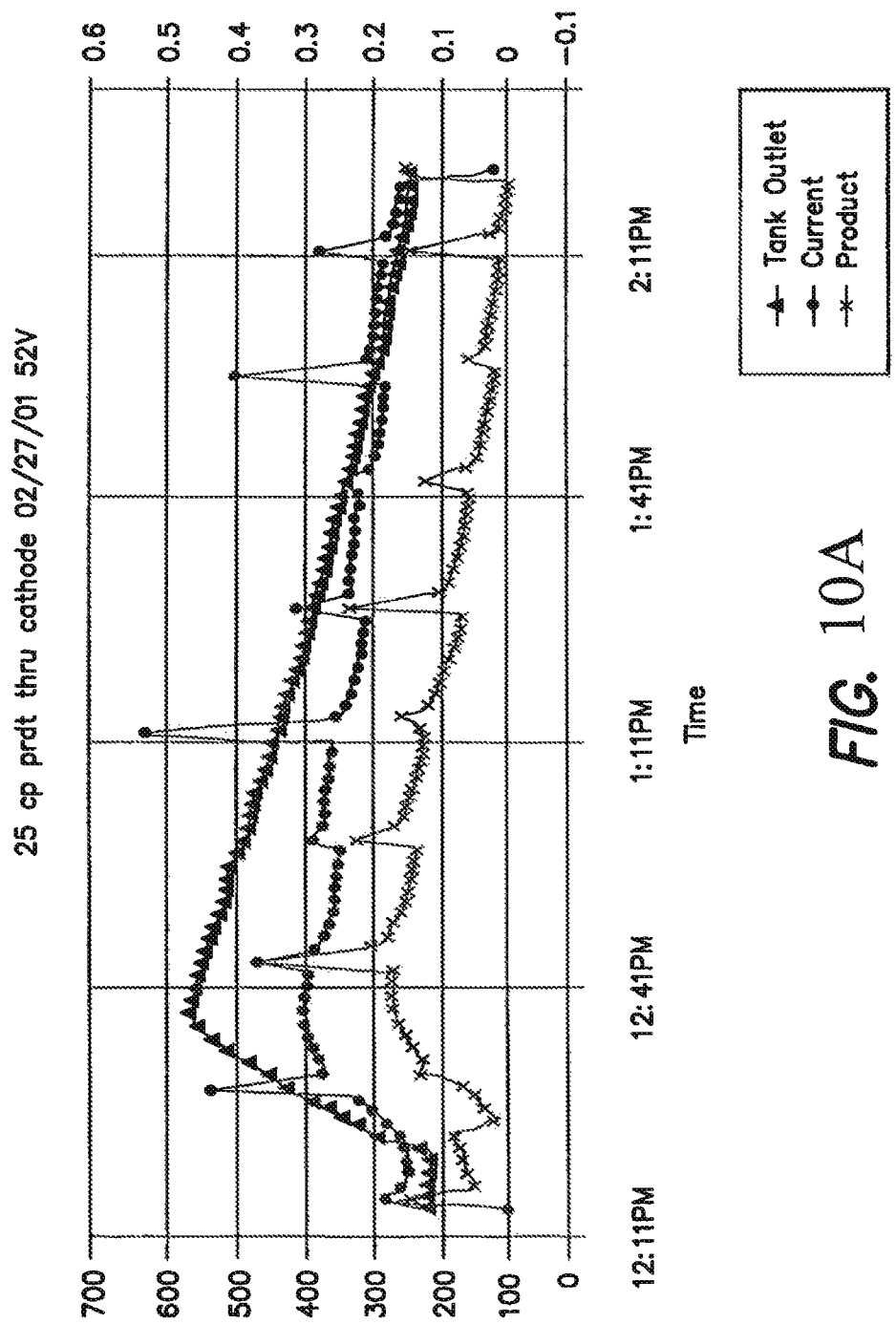
Figure 10B:
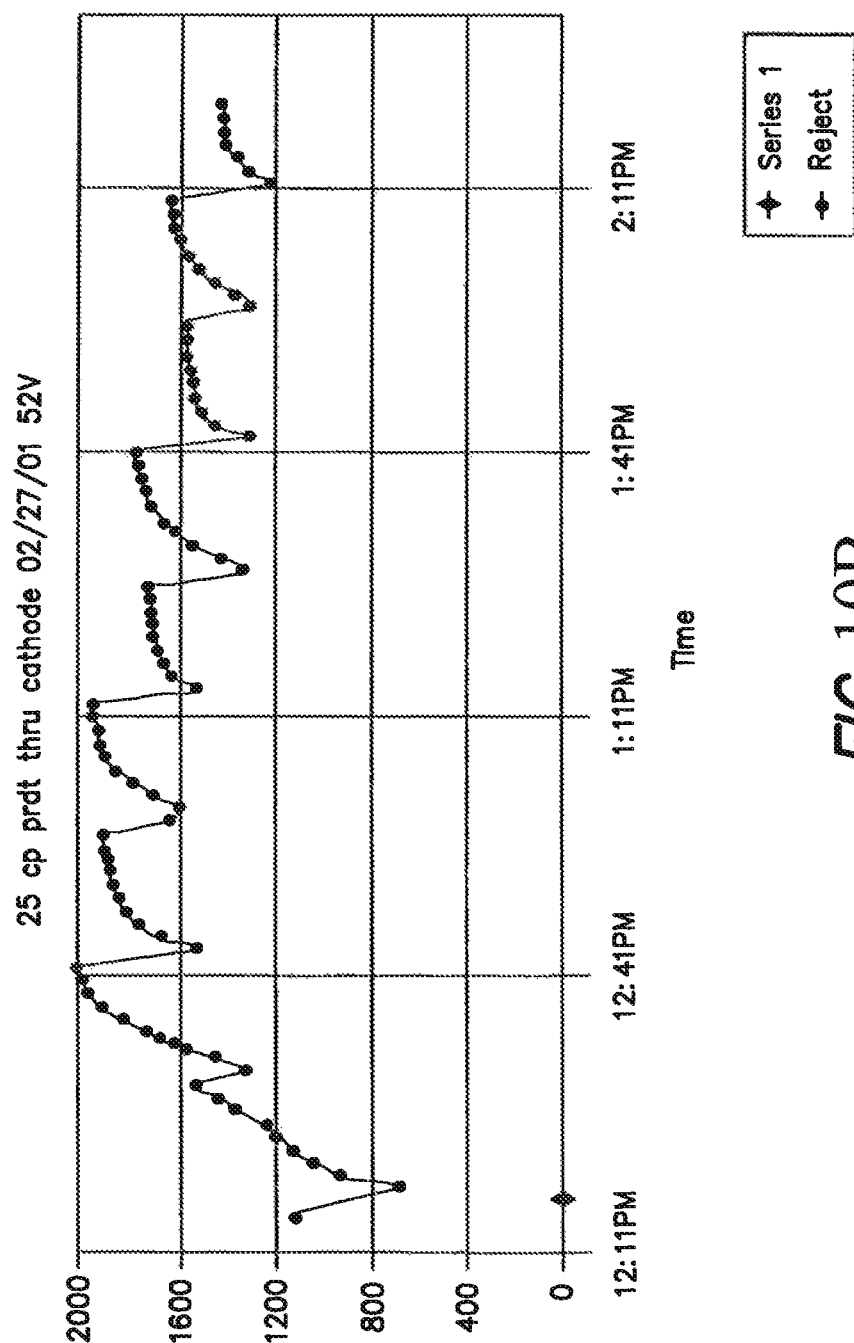

FIGS. 10A and 10B show operating data of the water treatment system operated under a higher potential of about 52 V and with a decreased flushing cycle of about 4 seconds about every 26 seconds. During operation, the electrodeionization device had a shutdown period of about 57 minutes.

Product water was withdrawn from vessel 12 at a rate of about 11.7 gallons every about three hours. FIGS. 10A and 10B show that the water treatment system can be operated to produce treated water with a decrease in the amount of flushing time without a decrease in performance and water quality. Also, as shown in FIG. 10B and compared to FIG. 9B, the conductivity of the reject stream increased at the same time the duration of shutdown increased. Thus, FIGS. 10A and 10B show that the water treatment system can be operated to produce treated water at a higher efficiency as compared to the operating conditions associated with FIGS. 9A and 9B.

Figure 11A:
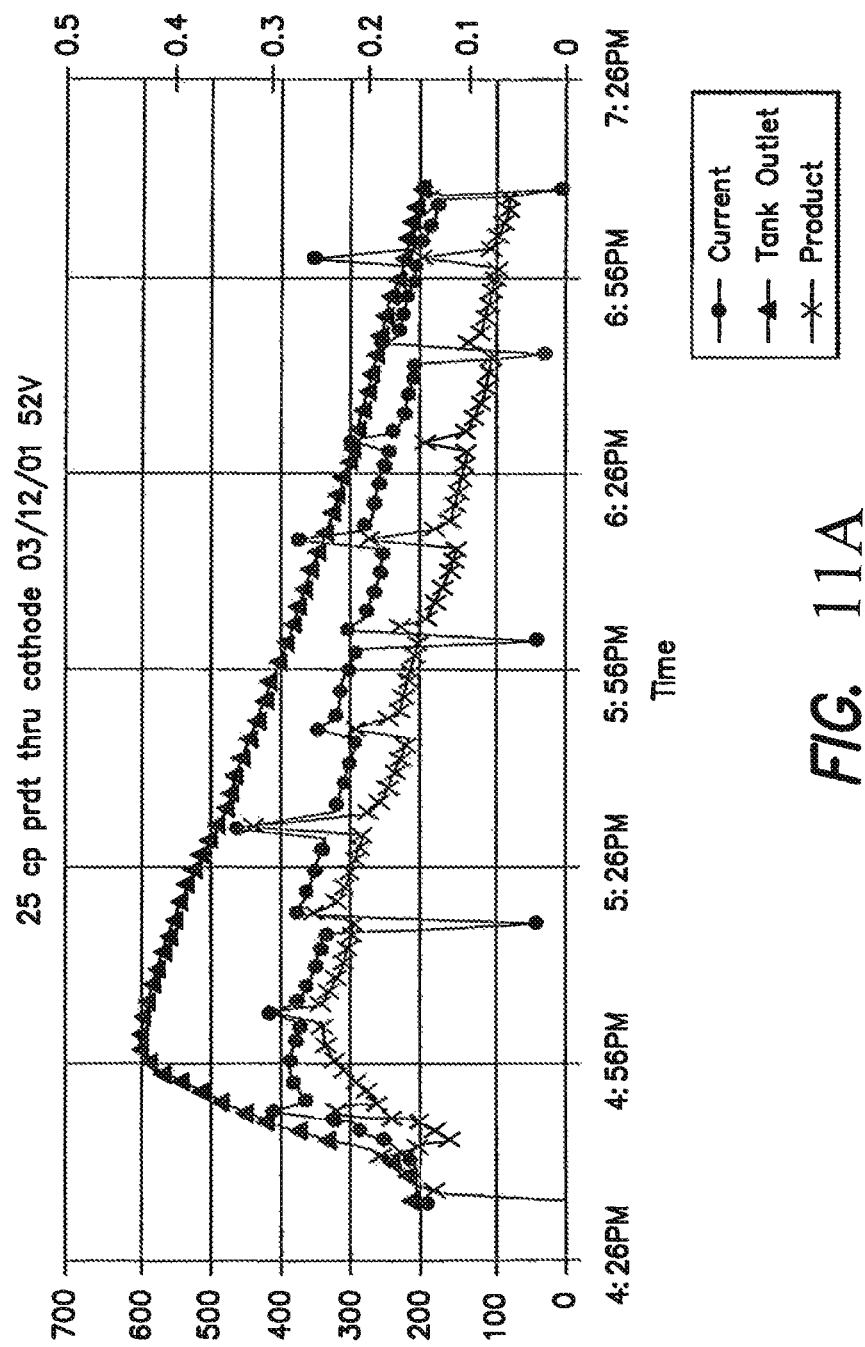
Figure 11B:
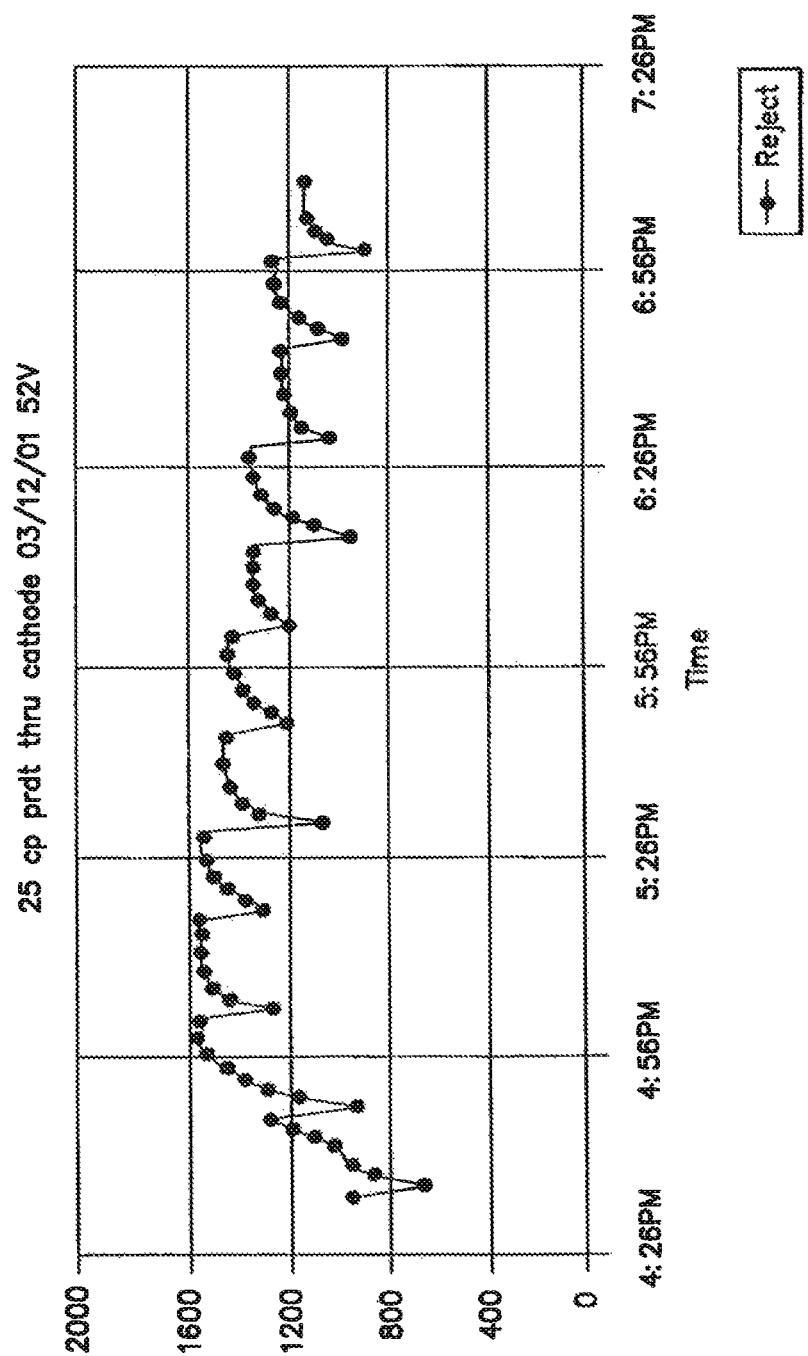

FIGS. 11A and 11B show the influence of an increased load on the water treatment system. The volume of the product to point of use 18 was increased to about 14 gallons every three hours. Under these operating conditions, the duration of shutdown time of the electrodeionization device decreased to about 30 minutes, as expected, because of the increased load. FIGS. 11A and 11B show that the system can still be operated with an increased load.

Example 8

FIG. 5 is a schematic flow diagram of a water treatment system built, operated, and evaluated according to one or more embodiments of the present invention. The water treatment system 10 had a reservoir system 12, which comprised a vessel 13 with an inlet 62 and an outlet 64. Inlet 62 was fluidly connected to a point of entry 14 through which water to be treated was introduced. Outlet 64 was fluidly connected to a point of use 18 through a distribution system (not shown). Water treatment system 10 also had an electrodeionization module 16.

Water, from point of entry 14, was introduced into reservoir system 12 and was re-circulated through electrodeionization module 16. The water treatment system was controlled by a programmable controller (not shown) based on the measured water conductivity, as measured by sensors 20b and 20c, upstream of an inlet 62 and downstream of an outlet 64 of pressurized vessel 12. The flow rate to reservoir system 12 was monitored by sensor 20a. Electrodeionization device 16 was comprised of a 10-cell pair stack with about 7½ inch flow paths. Each cell was filled with AMBERLITE® SF 120 resin and AMBERLITE® IRA 458 resin, both available from Rohm & Haas Company, Philadelphia, Pa.

Electrodeionization device 16 used an expanded titanium electrode coated with ruthenium oxide. Vessel 12 was a 10 inch diameter fiberglass vessel with about a 17 gallon capacity. The concentrate stream leaving electrodeionization device 16 was partially circulated and partially rejected to a drain 26 by regulating valves 32b, 32c, 32e, 32f, 32g, 32h, 32j and 32l. Treated water was returned to vessel 12 by regulating valves 32k, 32g and 32f. Fluid flow to the electrode compartments was controlled by actuating valves 32i, 32h and 32e.

Make-up water, from point of entry 14, was fed into the re-circulating stream to compensate for waste rejected to drain 26 by regulating valves 32b, 32c and 32d in proper sequence. The flow rate of treated water to a point of use 18 from outlet 64 of vessel 13 was regulated by adjusting valve 32a. Several sensors measuring operating conditions and water properties were installed throughout water treatment system 10 including pressure indicators 20d, 20f, 20g, 20h and 20i, flow rate indicators 20a, 20e, 20j and 20k and conductivity sensors 20b, 20c and 20l. The controller was a MicroLogix™ 1000 programmable controller available from Allen-Bradley Company, Inc., Milwaukee, Wis. The electrodeionization device was set to start up by a flow switch signal or when the water conductivity of the outlet stream leaving the pressurized vessel reached a set point. The feed from the electrodeionization device was re-circulated through vessel 13 and electrodeionization device 16 via a second feed pump. In operation, each sensor 20b, 20c and 20l provided a signal to a controller (not shown), which corresponds to the measured water conductivity.

Electrodeionization device 16 was operated under a normal applied current and a reduced current. Table 1 shows the operating and performance of the electrodeionization device under the normal and reduced current operating parameters. The direction of the applied electrical current was reversed for each flow rate test run. The efficiency of the electrodeionization device was empirically determined based on the removal rate, which is calculated by measuring the conductivity difference between the in outlet and inlet or feed streams relative to the inlet conductivity.

Table 1 shows that the efficiency of the electrodeionization device at the higher flow rate/higher applied current was comparable to the efficiency at the lower flow rate/lower applied current. However, the measured LSI of the stream flowing through the cathode compartment was significantly lower when the electrodeionization device was operated at the lower flow rate/lower applied current conditions. LSI can provide an indication of the degree of saturation of water, with respect to calcium carbonate, and can be used to predict whether scaling will occur. LSI can be related to the driving force for scale formation and depends on, at least, the pH, total alkalinity, calcium hardness, temperature and total dissolved solids in the fluid.

Table 9 also shows that the stream flowing through the cathode compartment, when the electrodeionization device was operated at the lower current, at a current that was below the limiting current density, had a lower likelihood of scaling, as measured by the LSI, without any loss in operating efficiency, as measured by the removal rate. The system operated at the lower flow rate, about 0.02 liter per minute per cell, with a lower applied voltage and current, produced water that was comparable in quality compared to the system operated at the higher flow rate and applied voltage and current.

TABLE 9

Operating Conditions of the electrodeionization device for well water.

| Flow rate (liter per minute per cell) | Applied Voltage (V) | Applied Current (Amp) | Conductivity at Inlet (μS/cm) | Conductivity at Outlet (μS/cm) | Removal (%) | LSI |
|---|---|---|---|---|---|---|
| 0.04 | 40 | 0.46 | 785 | 134 | 83 | 1.0 |
|  | 40 | 0.44 | 754 | 139 | 82 |  |
| 0.04 | 40 | 0.46 | 809 | 156 | 81 | 1.19 |
|  | 40 | 0.40 | 801 | 209 | 74 |  |
| 0.02 | 20 | 0.22 | 725 | 120 | 83 | 0.02 |
|  | 19 | 0.20 | 710 | 112 | 84 |  |

TABLE 9-continued

Operating Conditions of the electrodeionization device for well water.

| Flow rate (liter per minute per cell) | Applied Voltage (V) | Applied Current (Amp) | Conductivity at Inlet (μS/cm) | Conductivity at Outlet (μS/cm) | Removal (%) | LSI |
|---|---|---|---|---|---|---|
| 0.02 | 19 | 0.22 | 824 | 165 | 80 | 0.01 |
|  | 19 | 0.23 | 821 | 158 | 81 |  |

Example 9

As water treated with a CEDI system may contain reduced levels of TDS, pH and LSI when compared to untreated water, CEDI treated water was tested to determine how corrosive the product water might be. These results may be of particular importance when the CEDI treated water is to be used in a system including copper plumbing, such as many residential water systems. Specifically, water treated according to one embodiment of the invention was tested for copper corrosivity side-by-side with untreated water, CEDI treated water, and water treated by a conventional softening system. The corrosion, or leach, test was performed on 1" diameter×2" long copper pipes as coupons. The samples included CEDI treated water (2 configurations) as the challenge water with untreated water and softened water as two controls.

The untreated water (HARD) was well-water from Northbrook, Ill. having a TDS level of about 490 ppm, a hardness of about 18 gpg and a pH of about 7.8. The LSI of the untreated water ranged from 0.8 to 1.0. Conventionally softened water (SOFT) was obtained by treating the well-water with a 9" softener containing 1 cu.ft. of standard CULLEX® resin available from Culligan Corporation, Northbrook, Ill. CEDI water was produced in trial 1 with a system that did not include an inline reservoir. In trial 2, CEDI treated water (PRODUCT) was obtained at the tank outlet of the inline reservoir of the CEDI system illustrated in FIG. 5. Thus, trial 2 included passing CEDI product water through the depleting compartments and then through the cathode compartment of the CEDI module. The test coupons were prepared by cutting a 1 inch diameter copper pipe into 2 inch long pieces and trimming them to remove all burrs. The coupons were rinsed in acetone followed by RO water to remove any grease and metal shavings from the cutting operation. The coupons were each cleaned in 150 mLs of 2N HCl solution for one minute and sequestered in a neutralizing solution. They were then stored in a dessicator overnight after being rinsed again in RO water and wiped clean. A total of 12 coupons were prepared for trial 2. Each category of water was set aside into five 500 mL beakers. Each of the samples of water were sampled periodically and in similar patterns. The samples were tested as follows:

Trial 1—
The first trial included fewer samples than Trial 2 and corrosion analysis was performed under stagnant conditions. The product water samples were taken from the system and analyzed at day 1, day 4 and day 12. Water was treated in a low flow CEDI system without an inline reservoir. The water was passed once through the depleting compartments (not through the cathode) under the following conditions:
    25 cell pairs—low flow small stack with continuous duty, once through operation
    Compartment size: 7.5 inch×1.2 inch wide
    Resin filling: 60% IRA-458 Anion Resin, 40% SF-120 Cation Resin
    Concentrate re-circulation and product discharge flow rate: ~1 L/min
    Waste/reject continuous discharge flow rate: ~500 mL/min
    Electrode continuous flow rate: ~300 mL/min per electrode. Fresh feed water sent to electrode compartments
    Applied voltage=36 V, or 1.45 V/cell
    Feed Conductivity=740 μS
    Product obtained from a once through operation
    Corrosion results from Trial 1 are reported in FIGS. 16 and 18 and provide a comparison of raw water, conventionally softened water and the water produced by the CEDI system, as described above.

Trial 2—
    A—Stagnant water was used as a control (control) without any coupons. Samples of stagnant water not containing a coupon were analyzed on the $1^{st}$, $5^{th}$ and $12^{th}$ day, as were samples C, D and E (see below).
    B—Each of the three waters (changing) was placed in a separate beaker and the water was changed periodically to allow the coupon immersed to come into contact with fresh water. This was done to observe the effect of fresh water on leaching. The exchanged water was analyzed each time the water was changed. The water in these samples was changed on the $1^{st}$, $5^{th}$, $9^{th}$ and the $12^{th}$ day.
    C—A coupon was immersed in each of the three waters (stagnant) for exactly one day. The water was sent for analysis after one day.
    D—A coupon was immersed in each of the three waters (stagnant) for 5 days. The water was sent for analyses after five days of stagnation.
    E—A coupon was immersed in each of the three waters (stagnant) for 12 days. The water was sent for analyses after 12 days of stagnation.

Trial 2 was performed with a CEDI system using an inline reservoir and product-through-cathode technology under the following conditions:
    25 cell pairs—product through cathode stack with inline reservoir/tank system
    Compartment size: 7.5 inch×1.2 inch wide
    Resin filling: 60% IRA-458 Anion Resin, 40% SF-120 Cation Resin
    Concentrate re-circulation and product re-circulation flow rate: ~1.4 L/min
    Waste/reject flush (flushed periodically) flow rate: ~200 mL/min
    Product water through cathode, concentrate re-circ. flow through anode
    Applied voltage=51 V, or 2.04 V/cell
    Feed Conductivity=740 μS
    Sample of product water collected from tank at set point of about 220 microsiemens.

Data from Trial 2 are presented below in FIG. 19. A comparison of the copper concentration, pH, LSI and alkalinity of the water treated by the CEDI system (PRODUCT), conventionally treated soft water (SOFT) and untreated hard water (HARD) is provided in Tables 10-13 below.

TABLE 10

Cu Concentration in ppm

| | PRODUCT | | | SOFT | | | HARD | | |
|---|---|---|---|---|---|---|---|---|---|
| Day | Control | Stagnant | Changing | Control | Stagnant | Changing | Control | Stagnant | Changing |
| 0 | 0 | | | 0 | | | 0.004 | | |
| 1 | 0 | 0.17 | 0.142 | 0 | 0.289 | 0.318 | 0.005 | 0.309 | 0.273 |
| 5 | 0 | 0.538 | 0.493 | 0 | 0.685 | 0.752 | 0.006 | 0.764 | 0.741 |
| 9 | | | 0.418 | | | 0.703 | | | 0.922 |
| 12 | 0 | 0.529 | 0.489 | 0 | 0.843 | 0.725 | 0 | 0.867 | 1.101 |

TABLE 11 pH

| | PRODUCT | | | SOFT | | | HARD | | |
|---|---|---|---|---|---|---|---|---|---|
| Day | Control | Stagnant | Changing | Control | Stagnant | Changing | Control | Stagnant | Changing |
| 0 | 7.3 | | | 8 | | | 7.9 | | |
| 1 | 7.8 | 7.7 | 7.7 | 8.2 | 8.3 | 8.1 | 8.2 | 8.2 | 8.2 |
| 5 | 8.2 | 8 | 7.9 | 8.7 | 8.7 | 8.5 | 8.2 | 8.5 | 8.5 |
| 9 | | | 8 | | | 8.6 | | | 8.4 |
| 12 | 8.2 | 8.2 | 8 | 8.8 | 8.8 | 8.6 | 8.4 | 8.7 | 8.5 |

TABLE 12

LSI @ 22 deg. C.

| | PRODUCT | | | SOFT | | | HARD | | |
|---|---|---|---|---|---|---|---|---|---|
| Day | Control | Stagnant | Changing | Control | Stagnant | Changing | Control | Stagnant | Changing |
| 0 | −1.3 | | | −1.7 | | | 0.6 | | |
| 1 | −0.7 | −0.8 | −0.8 | −1.4 | −1.3 | −1.5 | 1 | 0.9 | 0.9 |
| 5 | −0.4 | −0.6 | −0.7 | −0.9 | −1 | −0.8 | 0.8 | 1.2 | 1.2 |
| 9 | | | −0.7 | | | −1.6 | | | 1.1 |
| 12 | −0.4 | −0.4 | −0.6 | −0.9 | −0.9 | −0.5 | 0.4 | 1.4 | 1.2 |

TABLE 13

Alkalinity @ 22 deg. C.

| | PRODUCT | | | SOFT | | | HARD | | |
|---|---|---|---|---|---|---|---|---|---|
| Day | Control | Stagnant | Changing | Control | Stagnant | Changing | Control | Stagnant | Changing |
| 0 | 47 | | | 197 | | | 198 | | |
| 1 | 48 | 48 | 48 | 201.3 | 202 | 198 | 196.3 | 198 | 198 |
| 5 | 48 | 48 | 47 | 217 | 212 | 198 | 165 | 208 | 207 |
| 9 | | | 44 | | | 218 | | | 207 |
| 12 | 49 | 48 | 47 | 217 | 216 | 207 | 104 | 220 | 211 |

TDS levels: CDI treated water—about 135 ppm, Soft water—about 480 ppm, Hard water—about 490 ppm.

Figure 15:
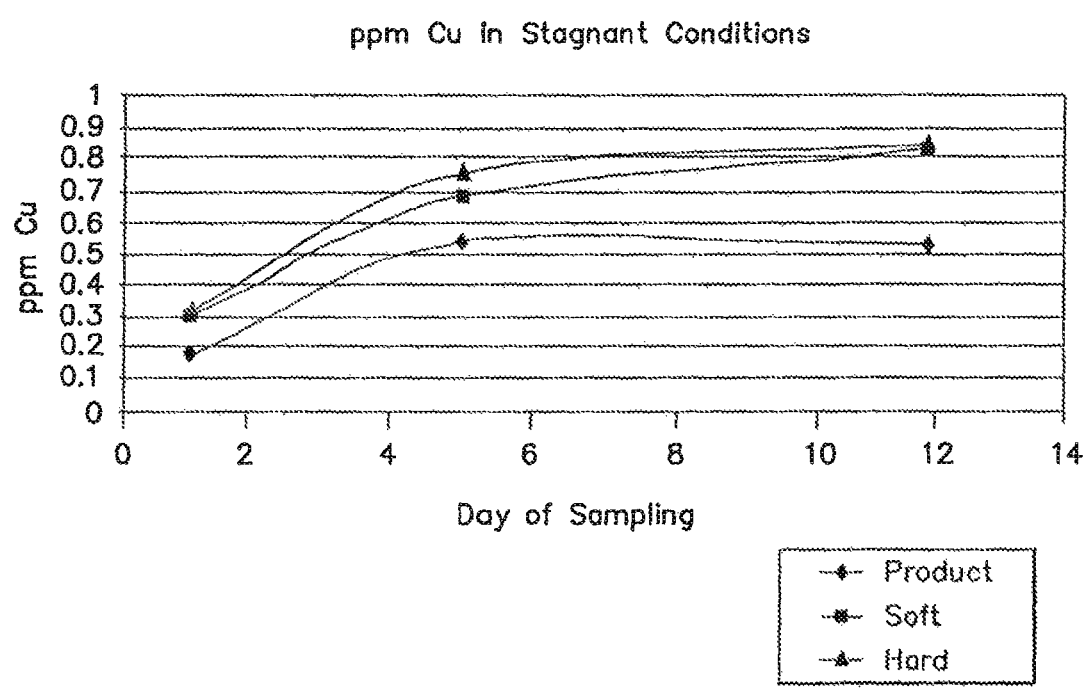
FIG. 15 is a graph showing copper extracted from a copper coupon by three different water samples.
Figure 16:
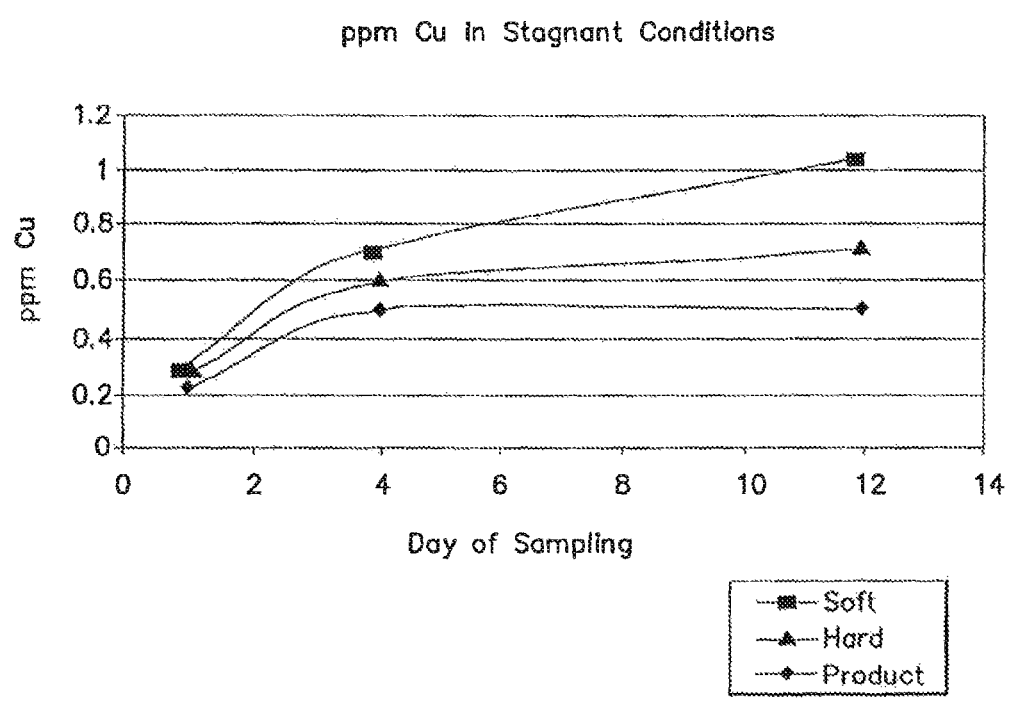
FIG. 16 is a graph showing copper extracted from a copper coupon after exposure to three different waters for various lengths of time.

FIG. 15 illustrates graphically the results under stagnant conditions from Trial 2. FIG. 16 illustrates graphically the results under stagnant conditions from Trial 1. Both FIGS. 15 and 16 show that the CEDI treated water is less corrosive than both the feed water and the conventionally softened water.

Figure 17:
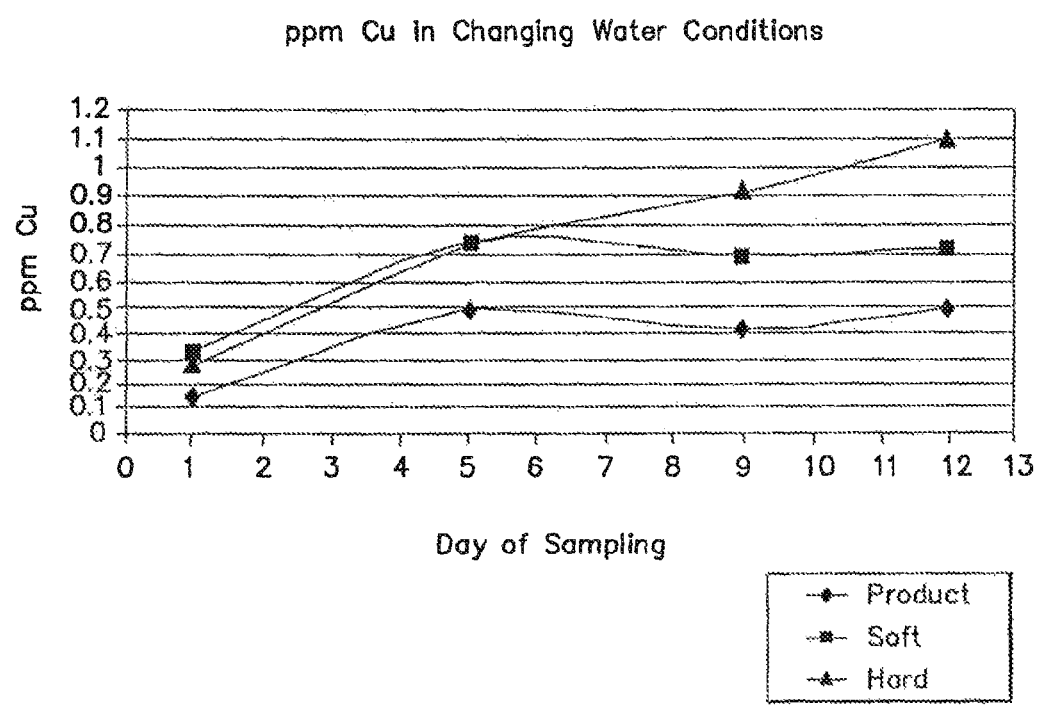
FIG. 17 is a graph showing the amount of copper extracted from copper coupons after exposure to three different waters where the water is being changed out at various intervals.
Figure 18:
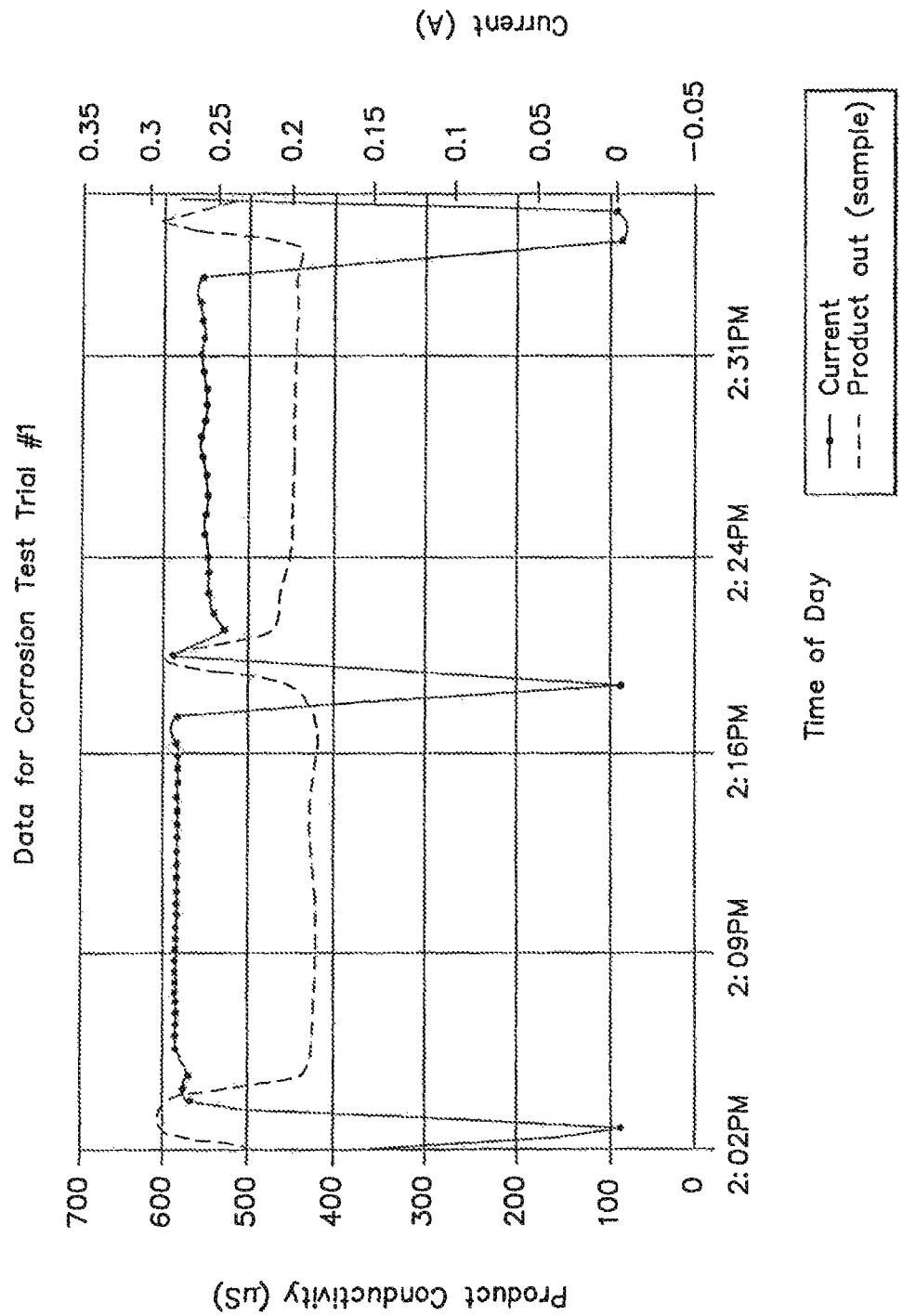
FIG. 18 graphically illustrates product water conductivity and current applied in accordance with one or more embodiments of the invention.

FIG. 17 illustrates graphically the results from Trial 2 when the water samples where intermittently changed. Again, the CEDI product water of the present invention was consistently less corrosive than both the feed water and the conventionally softened water. FIG. 18 illustrates the current used and the conductivity of the water produced in trial 1. FIG. 19 illustrates the current used and the conductivity of the water produced in trial 2 and shows improved water quality over that achieved in trial 1 (FIG. 18).

The results show that the concentration of copper leached in all trials and under all conditions was the lowest in the CEDI treated samples. The CEDI water had lower pH values than both the conventionally softened and the hard water. As expected, the pH, alkalinity and LSI values in the conventionally softened and the CEDI treated water samples increased with stagnation. The LSI and alkalinity values for untreated hard water decreased with stagnation. The concentration of copper leached increased with stagnation except in the CEDI treated water samples where the level of copper leached stabilized out after 5 days, as shown in FIG. 15.

Thus, the water treated using the apparatus of FIG. 5 (product through cathode) resulted in reduced copper leaching despite exhibiting a lower pH, a lower (negative) LSI and a lower alkalinity than either the hard feed water or the conventionally softened water. In addition, the CEDI water of trial 2 was significantly less conductive (purer) than that of trial 1, yet was as non-corrosive as was the higher conductivity water. This means the method and apparatus of trial 2 may be particularly suitable for use in a water supply system presenting copper pipes or other materials where corrosion may be a concern. As defined herein, a water is considered to be less corrosive if it exhibits a lower copper concentration when subjected to one or more of the testing procedures described above. The product water of the present invention therefore may be less corrosive than either the feed water or the conventionally softened water.

Example 10

An in-line pressurized treatment system, schematically shown in FIG. 20 was assembled and evaluated. The treatment system 10 comprised an electrodeionization module 16 and a pressurized storage vessel 12. Water, from point of entry 16, was introduced into pressurized storage vessel 12 through inlet 58 and was circulated using pumps 20a and 20b and passed through pretreatment units 24a and 24b and electrodeionization device 16. The treatment system was controlled by a programmable controller (not shown) based on the measured water conductivity, as measured by any of sensors 28a, 28b, 28c, and 28d.

Electrodeionization device 16 comprised of a 10-cell pair stack with flow paths that were about 7.5 inches long and about 2.5 inches wide. Each cell was filled with about 40% AMBERLITE® SF 120 resin and about 60% AMBERLITE® IRA 458 resin, both available from Rohm & Haas Company, Philadelphia, Pa. The electrodeionization device had an expanded titanium electrode coated with ruthenium oxide.

The controller was a MICROLOGIX™ 1000 programmable controller available from Allen-Bradley Company, Inc., Milwaukee, Wis. The electrodeionization device was set to start up either by a flow switch signal or when the water conductivity of the outlet stream leaving the pressurized vessel was higher than a set point. The electrodeionization device operated until the conductivity reached the set point. The feed from the electrodeionization device was circulated from the pressurized vessel via a second feed pump. The polarity of the electric field applied to the electrodeionization device was reversed about every 15 minutes. In addition to controlling the components of electrodeionization device 16, the PLC collected, stored and transmitted measured data from sensors 28a, 28b, 28c, and 28d.

Pressurized vessel 12 was a 10 inch diameter fiberglass vessel with about a 30 gallon capacity. Pressurized vessel 12 was fitted with a valve head and a center manifold pipe. The concentrate stream leaving the electrodeionization device was partially circulated and partially rejected to a drain 30 by actuating valves 22c, 22d, and 22e. Make-up water, from point of entry 16, was fed into the circulating stream to compensate for any water that was rejected to drain 30.

The pretreatment units 24a and 24b each comprised of an aeration iron-filter with a 25-micron rating, a 20 inch×4 inch sediment filter and a 20 inch×4 inch carbon block filter.

In one flow direction, water from pressure vessel 12 was pumped by pump 20a, through valve 22a, to pretreatment unit 24a before being introduced to the depleting compartments of electrodeionization device 16. Treated water from electrodeionization device 12 was directed by valve 22a to storage in pressure vessel 12. Fluid collecting removed ionic species was circulated by pump 20b through pretreatment unit 24b, and the concentrating and electrode compartments of electrodeionization device 16 by activating valves 22d and 22b. When the polarity of the applied electric field was reversed, the flow directions were correspondingly adjusted so that pump 20a, pretreatment unit 24a, and valve 22a circulated the liquid accumulating ionic species. Similarly, water to be treated was pumped from pressure vessel 12 using pump 20b through valve 22d to pretreatment unit 24b before being introduced and treated in the depleting compartments of electrodeionization device 12. Treated water was directed by valve 22d to pressure vessel 12.

The flow rate of treated water, as measured by flow indicator 28c, to a point of use 18 from outlet 60 of pressurized vessel 12 was regulated by adjusting valves 22f and 22g. To discharge concentrate or waste stream, valve 22e was operated as necessary. Water from point of entry 16 was used to restore and replace fluid that was discharged to drain 30 or consumed in point of use 18.

The treatment system was operated until a target set point of about 220 µS/cm was reached and stable for about one minute. The applied voltage to the electrodeionization device was about 46 volts. The flow rates into the depleting and concentrating compartments were maintained at about 4.4 liters per minute. The reject flow rate was controlled to discharge about 270 mL about every 30 seconds. The pressure in the vessel was about 15 psig to about 20 psig.

Figure 19:
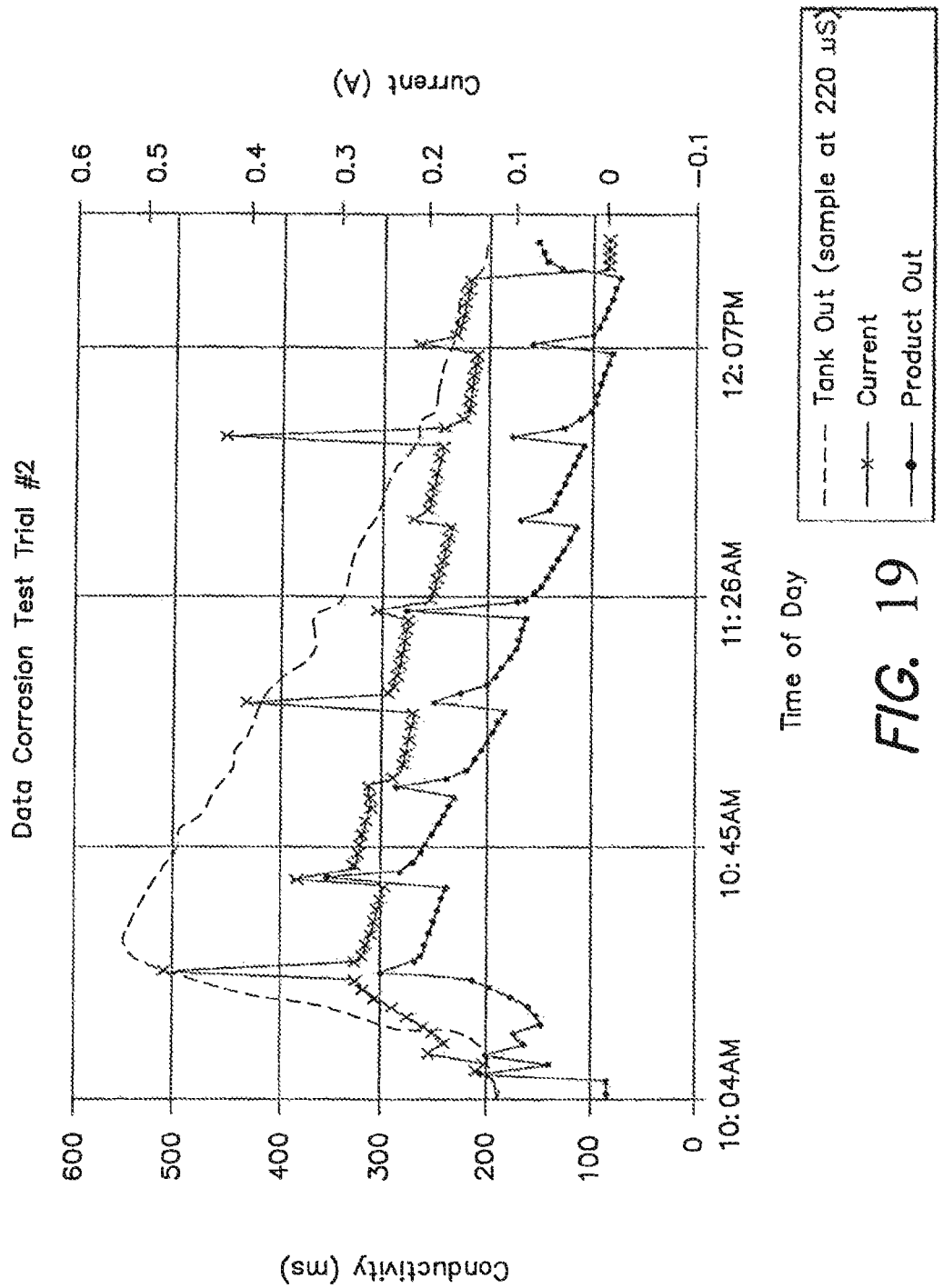
FIG. 19 graphically illustrates water conductivity out of a stack and out of a tank, as well as the current applied during operation in accordance with one or more embodiments of the invention.

FIG. 19 shows the measured conductivity, of the various streams in the treatment system as a function of run time. Tables 14 and 15 summarize the measured properties of the various streams of the treatment system at the start and end of the test, respectively. The data presented in Table 11 showed that the initial feed stream, labeled as tankout conductivity in FIG. 19, into electrodeionization device 16, with a conductivity of about 412 µS/cm, was treated to produce an initial dilute stream, labeled as stackout conductivity in FIG. 19, having a conductivity of about 312 µS/cm, without a substantial pH change. Similarly, at the end of the test run, water, having a conductivity of about 221 µS/cm, was treated to produce lower conductivity water, of about 164 µS/cm, without a substantial pH change. It is believed that the lower conductivity of the feed stream at the end of the test run reflected the effect of circulation, which effectively removed undesirable species over several passes. Thus, the data shows that the system schematically illustrated in FIG. 4 can treat or soften water that is suitable for household or residential use.

TABLE 14

Stream properties at the start of the test run.

|  | Feed Stream | Reject Stream | Product Stream |
|---|---|---|---|
| pH | 8.19 | 8.3 | 8.02 |
| Conductivity (µS/cm) | 412 | 944.9 | 312.0 |

TABLE 15

Stream properties at the end of the test run.

|  | Feed Stream | Reject Stream | Product Stream |
|---|---|---|---|
| pH | 8.37 | 8.33 | 7.75 |
| Conductivity (µS/cm) | 221 | 833.8 | 164 |

Each of U.S. Pat. Nos. 7,582,198; 7,604,725; 7,083,733, and 7,563,351 is entirely incorporated herein by reference for all purposes.

Those skilled in the art would readily appreciate that all parameters and configurations described herein are meant to be exemplary and that actual parameters and configurations will depend upon the specific application for which the systems and methods of the present invention are used. Those skilled in the art will recognize, or be able to ascertain using no more than routine experimentation, many equivalents to the specific embodiments of the invention described herein. For example, those skilled in the art may recognize that the present invention may further comprise a network of systems or be a component of a system such as a household or residential management system. It is, therefore, to be understood that the foregoing embodiments are presented by way of example only and that, within the scope of the appended claims and equivalents thereto, the invention may be practiced otherwise than as specifically described. The present invention is directed to each individual feature, system, or method described herein. In addition, any combination of two or more such features, systems, or methods, if such features, systems, or methods are not mutually inconsistent, is included within the scope of the present invention.

What is claimed is:

1. A household water treatment system, comprising:
   a pressurized vessel fluidly connected to a point of entry;
   an electrochemical water treatment device fluidly connected to the pressurized vessel, the electrochemical water treatment device comprising:
      a depleting compartment in fluid communication with the pressurized vessel;
      a concentrating compartment in fluid communication with the point of entry; and
      a concentrate stream recirculation line fluidly connecting an outlet of the concentrating compartment to an inlet of the concentrating compartment;
   a controller configured to:
      calculate a Langelier Saturation Index (LSI) of treated water produced by the electrochemical water treatment device based on a continuous or intermittent measurement of at least one water property sensor;
      adjustably maintain an operating parameter of the electrochemical water treatment device based on a difference between the calculated LSI and a set point LSI to produce treated water having an LSI of less than about 2;
      discharge a portion of the concentrate stream to drain; and
      deliver make-up water from the point of entry to the concentrating compartment in an amount sufficient to compensate for the discharged portion of the concentrate stream;
   a water distribution system fluidly connected to the pressurized vessel; and
   at least one point of use fluidly connected to the water distribution system.

2. The household water treatment system of claim 1, wherein the at least one water property sensor is selected from the group consisting of a conductivity sensor, a flow rate sensor, a temperature sensor, pressure sensor, a pH sensor, a turbidity sensor, a composition analyzer and combinations thereof.

3. The household water treatment system of claim 1, wherein the controller regulates at least one of an applied current and an applied voltage to the electrochemical water treatment device.

4. The household water treatment system of claim 1 wherein water in the water storage vessel comprises chlorine.

5. The household water treatment system of claim 1 further comprising a household irrigation system fluidly connected downstream from a waste outlet of the water treatment device.

6. The household water treatment system of claim 1 wherein the electrochemical water treatment device comprises an electrodeionization device.

7. The household water treatment system of claim 1, wherein the electrochemical water treatment device comprises an electrodialysis device.

8. The household water treatment system of claim 1, wherein the electrochemical water treatment device comprises a capacitive deionization device.

9. The household water treatment system of claim 1, wherein the pressurized vessel comprises at least one partition or baffle.

10. The system of claim 1, wherein the controller is configured to adjust an operating parameter of the electrochemical water treatment device to produce treated water having an LSI of less than about 1.

11. A method for treating water, comprising:
   introducing water from a point of entry to a pressurized vessel;
   transferring a portion of the water from the pressurized vessel to an electrochemical water treatment device;
   removing at least a portion of any undesirable species from the water from the pressurized vessel in the electrochemical water treatment device to produce treated household water;
   calculating a Langelier Saturation Index (LSI) of treated water produced by the electrochemical water treatment device based on a continuous or intermittent measurement of at least one water property sensor;
   adjustably maintaining an operating parameter of the electrochemical water treatment device based on a difference between the calculated LSI and a set point LSI to produce treated water having an LSI of less than about 2;
   transferring the treated household water from a diluting compartment of the electrochemical water treatment device to the pressurized vessel;
   recirculating at least a portion of a concentrate stream in a concentrating compartment of the electrochemical water treatment device;
   discharging a portion of the concentrate stream to drain;
   introducing make-up water from the point of entry to the concentrating compartment of the electrochemical water treatment device in an amount sufficient to compensate for the discharged portion of the concentrate stream; and
   distributing a portion of the treated household water from the pressurized vessel to a household point of use.

12. The method of claim 11 wherein the undesirable species is a hardness ion species.

13. The method of claim 11 further comprising pretreating the water before transferring the water to the electrochemical water treatment device.

14. The method of claim 11 further comprising measuring any of a turbidity, alkalinity, composition, conductivity, pH, pressure and temperature of the water.

15. The method of claim 11 further comprising adjusting at least one of an applied current and an applied voltage on the electrochemical water treatment device.

16. The method of claim 11 further comprising adjusting an operating cycle of the electrochemical water treatment device.

17. The method of claim 11 wherein the electrochemical water treatment device comprises an electrodeionization device.

18. The method of claim 11 further comprising cleaning the electrochemical water treatment device to remove or inactivate at least a portion of any contaminant organisms therein.

19. The method of claim 18 wherein cleaning the electrochemical water treatment device comprises exposing at least a portion of a wetted surface of the electrochemical water treatment device to a cleaning agent.

20. The method of claim 11, further comprising promoting zone formation within the pressurized vessel.

21. The method of claim 11, wherein the electrochemical water treatment device comprises an electrodialysis device.

22. The method of claim 11, wherein the electrochemical water treatment device comprises a capacitive deionization device.

23. The method of claim 11, wherein the treated household water has an LSI of less than about 1.

* * * * *